United States Patent
Al-Yami et al.

(10) Patent No.: US 9,202,175 B2
(45) Date of Patent: Dec. 1, 2015

(54) SYSTEMS AND METHODS FOR AN EXPERT SYSTEM FOR WELL CONTROL USING BAYESIAN INTELLIGENCE

(71) Applicants: Saudi Arabian Oil Company, Dhahran (SA); Texas A&M University, College Station, TX (US)

(72) Inventors: Abdullah Saleh Hussain Al-Yami, Dhahran (SA); Jerome Schubert, College Station, TX (US)

(73) Assignees: The Texas A&M University System, College Station, TX (US); Saudi Arabian Oil Company, Dhahran (SA)

( * ) Notice: Subject to any disclaimer, the term of this patent is extended or adjusted under 35 U.S.C. 154(b) by 231 days.

(21) Appl. No.: 13/827,794

(22) Filed: Mar. 14, 2013

(65) Prior Publication Data
US 2014/0129506 A1    May 8, 2014

Related U.S. Application Data

(60) Provisional application No. 61/721,996, filed on Nov. 2, 2012.

(51) Int. Cl.
| | | |
|---|---|---|
| G06N 5/02 | (2006.01) | |
| E21B 44/00 | (2006.01) | |
| G06N 5/04 | (2006.01) | |
| E21B 47/10 | (2012.01) | |

(Continued)

(52) U.S. Cl.
CPC ............ *G06N 5/048* (2013.01); *E21B 44/00* (2013.01); *E21B 47/1025* (2013.01); *G06N 5/02* (2013.01); *G06N 7/005* (2013.01); *E21B 47/12* (2013.01)

(58) Field of Classification Search
USPC .......................................................... 706/52
See application file for complete search history.

(56) References Cited

U.S. PATENT DOCUMENTS

| | | |
|---|---|---|
| 4,460,045 A | 7/1984 | Elson et al. |
| 5,749,419 A | 5/1998 | Coronado et al. |

(Continued)

FOREIGN PATENT DOCUMENTS

| | | |
|---|---|---|
| EP | 2090742 A1 | 8/2009 |
| WO | 2006112864 A2 | 10/2006 |

OTHER PUBLICATIONS

G.M. Lloyd, et al., Practical Application of Real-Time Expert System for Automatic Well Control [online], Society of Petroleum Engineers, Inc., International Association of Drilling Contractors, 1990, [retrieved on Feb. 2, 2015]. Retrieved from the Internet:<URL:https://www.onepetro.org/limitedDownload?id=conference-paper%2FSPE-19919-MS>.*

(Continued)

*Primary Examiner* — Jeffrey A Gaffin
*Assistant Examiner* — Nathan Brown, Jr.
(74) *Attorney, Agent, or Firm* — Bracewell & Giuliani LLP; Constance Gall Rhebergen; Brian H. Tompkins

(57) ABSTRACT

Systems and methods are provided for a well control expert system that provides well control recommendations for a drilling system. The well control expert system includes a well control Bayesian decision network (BDN) model that receives inputs and outputs recommendations based on Bayesian probability determinations. The well control BDN model includes a circulation section, a well control practices section, and a troubleshooting section.

20 Claims, 44 Drawing Sheets

(51) Int. Cl.
*G06N 7/00* (2006.01)
*E21B 47/12* (2012.01)

(56) References Cited

U.S. PATENT DOCUMENTS

| | | |
|---|---|---|
| 6,826,486 B1 | 11/2004 | Malinverno |
| 7,028,586 B2 | 4/2006 | Robichaux |
| 7,092,928 B1 | 8/2006 | Elad et al. |
| 7,509,297 B2 | 3/2009 | Kerisit |
| 7,650,321 B2 | 1/2010 | Krishnan et al. |
| 2003/0116887 A1 | 6/2003 | Scott |
| 2004/0113061 A1 | 6/2004 | Valant-Spaight |
| 2004/0154801 A1 | 8/2004 | Pandey |
| 2005/0091012 A1 | 4/2005 | Przytula et al. |
| 2005/0192855 A1 | 9/2005 | Chitty et al. |
| 2005/0241679 A1 | 11/2005 | Rauch et al. |
| 2009/0076873 A1 | 3/2009 | Johnson et al. |
| 2009/0132458 A1 | 5/2009 | Edwards et al. |
| 2009/0182572 A1 | 7/2009 | Mendoza Garrido |
| 2009/0327207 A1 | 12/2009 | Anderson et al. |
| 2010/0084191 A1 | 4/2010 | Chapman et al. |
| 2010/0112217 A1 | 5/2010 | Pawlik et al. |
| 2011/0155462 A1 | 6/2011 | Du Castel et al. |
| 2011/0225111 A1 | 9/2011 | Ringer |
| 2012/0069131 A1 | 3/2012 | Abelow |

OTHER PUBLICATIONS

Basseville, Detecting Changes in Signals and Systems—A Survey [online], Automation, vol. 2, No. 3, pp. 309-326, 1988, [retrieved on Feb. 2, 2015]. Retrieved from the Internet:<http://www.google.com/url?sa=t&rct=j&q=&esrc=s&source=web&cd=2&cad=rja&uact=8&ved=0CCkQFjAB&url=http%3A%2F%2Fwww.das.ufsc.br%2F~moreno%2520dinamicos%2Fbas88.pdf>.*

Al-Yami et al. "Expert System for the Optimal Design and Execution of Successful Completion Practices Using Artificial Bayesian Intelligence" SPE 143826, Brasil Offshore Conference and Exhibition, Macaé, Brazil, Jun. 14-17, 2011, pp. 1-24, XP055127773.

Al-Yami et al. "Guidelines for Optimum Underbalanced Drilling Practices Using Artificial Bayesian Intelligence" OTC 22883, Offshore Technology Conference, Houston, Texas, Apr. 30, 2012-May 3, 2012, pp. 1-57, XP055128243.

Al-Yami et al. "Underbalanced Drilling Expert System Development" SPE 152101, SPE Western Regional Meeting, Bakersfield, California, Mar. 19-23, 2012, pp. 1-41, XP055128240.

International Search Report and Written Opinion, PCT/US2013/067639, dated Jul. 21, 2014.

International Search Report and Written Opinion, PCT/US2013/067644, dated Jul. 17, 2014.

Office Action for co-pending U.S. Appl. No. 13/827,581 dated Oct. 24, 2014.

'Building Bayesian Networks from Basin Modeling Scenarios for Improved Geological Decision Making', Gabriele Martinelli et al., Petroleum Geoscience Jul. 30, 2012, pp. 1-27.

'Development of a Drilling Expert System for Designing and Applying Successful Cement Jobs', A.S. Al-Yami et al., IADC/SPE 135183, Asia Pacific Drilling Technology Conference and Exhibition Nov. 2010, pp. 1-23.

'Using Bayesian Network to Develop Drilling Expert Systems', http://repository.tamu.edu/handle/1969.1/ETD-TAMU-2012-08-11454, pp. 1-3.

'SeTES, A Self-Teaching Expert System for the Analysis, Design, and Prediction of Gas Production from Unconventional Gas Resources', Research Partners to Secure Energy for America, George J. Moridis et al., Nov. 28, 2011, pp. 1-116.

Al-Yami et al. "The Use of Artificial Bayesian Intelligence in Practical Well Control" SPE Russian Oil & Gas Exploration & Production Technical Conference and Exhibition, Moscow, Russia, Oct. 16-18, 2012, SPE 160662, pp. 1-24, XP055127770.

International Search Report and Written Opinion, PCT/US2013/067387, mailed Sep. 23, 2014.

International Search Report and Written Opinion, PCT/US2013/067653, mailed Oct. 1, 2014.

Written Opinion of International Preliminary Examining Authority in PCT/US2013/067639 mailed Nov. 25, 2014.

Written Opinion of International Preliminary Examining Authority in PCT/US2013/067644 mailed Nov. 25, 2014.

Garrouch et al. "Development of an expert system for underbalanced drilling using fuzzy logic" Journal of Petroleum Science & Engineering, vol. 31, 2001, pp. 23-39.

MacArthur "Coiled tubing provides advantages for UB operations" Drilling Contractor, Jul./Aug. 2003, pp. 40-41.

Martin "Managed Pressure Drilling Techniques and Tools" Thesis for Master of Science degree, Petroleum Engineering, Texas A&M University, May 2006, 65 pages.

Muir "Managed Pressure Drilling (MPD) Systems & Applications" retrieved at http://www.drillsafe.org.au/06-08_pres/DrillSafe_Forum_Jun08_KEEP_DRILLING_Ken_Muir_Managed_Pressure_Drilling_Talk.pdf, 2011, 36 pages.

Office Action for co-pending U.S. Appl. No. 13/827,408 dated Apr. 6, 2015.

Office Action for co-pending U.S. Appl. No. 13/827,746 dated Feb. 13, 2015.

Thomson et al. "Plan Recommendation for Well Engineering" Springer-Verlag Berlin Heidelberg, IEA/AIE, Part II, LNAI 6704, 2011, pp. 436-445.

International Preliminary Report on Patentability for PCT/US2013/067639 dated Feb. 25, 2015.

International Preliminary Report on Patentability for PCT/US2013/067644 dated Feb. 25, 2015.

International Preliminary Report on Patentability for PCT/US2013/067387 dated Apr. 21, 2015.

International Preliminary Report on Patentability for PCT/US2013/067653 dated Apr. 21, 2015.

* cited by examiner

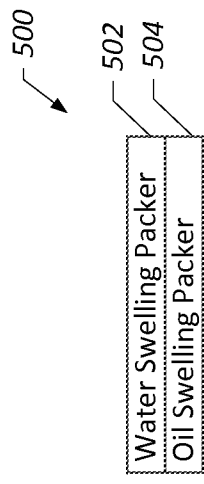

| Swelling packer | Water Swelling Packer | | | | Oil Swelling Packer | | | |
|---|---|---|---|---|---|---|---|---|
| Drilling fluid | Formate drilling fluid | | CaCO₃ drilling fluid | | Formate drilling fluid | | CaCO₃ drilling fluid | |
| Treating fluid | Lactic acid | HCL acid | Lactic acid | HCL acid | Lactic acid | HCL acid | Lactic acid | HCL acid |
| Recommended | 0 | 0 | 1 | 0 | 1 | 0 | 0 | 1 |
| Not recommended | 1 | 1 | 0 | 1 | 0 | 1 | 1 | 0 |

FIG. 8

| Consequences | Recommended | Not Recommended |
|---|---|---|
| Value | 1 | 0 |

FIG. 9

| Swelling packer | Water Swelling Packer | Oil Swelling Packer |
|---|---|---|
| Formate drilling fluid | 0.74 | 0.5 |
| CaCO$_3$ drilling fluid | 0.26 | 0.5 |

| Swelling packer | Water Swelling | Oil Swelling |
|---|---|---|
| Treating Fluid | | |
| Lactic acid | 0.9729 | 0.2 |
| HCl acid | 0.027 | 0.8 |
| Drilling fluid | | |
| Formate drilling fluid | Selected by user | Selected by user |
| CaCO$_3$ drilling fluid | | |
| | 0.6923 | 0.8 |
| | 0.3076 | 0.2 |
| | Selected by user | Selected by user |

| Swelling packer | Water Swelling Packer | Oil Swelling Packer |
|---|---|---|
| Recommended | 0.6923 | 0.8 |
| Not Recommended | 0.3076 | 0.2 |

(1200, 1202, 1204, 1206, 1208)

| Swelling packer | Water Swelling | Oil Swelling |
|---|---|---|
| Expected utility | 0.6923 | 0.8 |

FIG. 13

| Swelling packer | Water Swelling Packers | Oil Swelling Packers |
|---|---|---|
| Recommended | 0 | 1 |
| Not Recommended | 1 | 0 |

FIG. 14

SYSTEMS AND METHODS FOR AN EXPERT SYSTEM FOR WELL CONTROL USING BAYESIAN INTELLIGENCE

PRIORITY CLAIM

This application claims priority to U.S. Provisional Patent Application No. 61/721,996 filed on Nov. 2, 2012, entitled "Systems and Methods for an Expert System for Well Control Using Bayesian Intelligence," the disclosure of which is hereby incorporated by reference in its entirety.

BACKGROUND OF THE INVENTION

1. Field of the Invention

This invention relates generally to the drilling and extraction of oil, natural gas, and other resources, and more particularly to evaluation and selection of well control operations.

2. Description of the Related Art

Oil, gas, and other natural resources are used for numerous energy and material purposes. The search for extraction of oil, natural gas, and other subterranean resources from the earth may cost significant amounts of time and money. Once a resource is located, drilling systems may be used to access the resources, such as by drilling into various geological formations to access deposits of such resources. The drilling systems rely on numerous components and operational techniques to reduce cost and time and maximize effectiveness. For example, drill strings, drill bits, drilling fluids, and other components may be selected to achieve maximum effectiveness for a formation and other parameters that affect the drilling system. Typically, many years of field experience and laboratory work are used to develop and select the appropriate components and operational practices for a drilling system. However, these techniques may be time-consuming and expensive. Moreover, such techniques may produce inconsistent results and may not incorporate recent changes in practices and opinions regarding the drilling systems.

SUMMARY OF THE INVENTION

Various embodiments of methods and systems for a well control expert system having a well control Bayesian decision network (BDN) model. In some embodiments, a system is provided having one or more processors and a non-transitory tangible computer-readable memory. The memory includes a well control expert system executable by the one or more processors and configured to provide one or more well control recommendations based on one or more inputs. The well control expert system includes a well control Bayesian decision network (BDN) model. The well control BDN model includes a kick indicators uncertainty node configured to receive one or more kick indicators from the one or more inputs and a kick verifications uncertainty node dependent on the kick indicators uncertainty node and configured to receive one or more kick verifications from the one or more inputs. The well control BDN model also includes a kick details uncertainty node dependent on the kick verifications uncertainty node and configured to receive one or more kick details from the one or more inputs a circulations decision node configured to receive one or more circulations from the one or more inputs. Finally, the well control BDN model also includes a circulations consequences node dependent on the kick details uncertainty node and the circulations decision node and configured to output the one or more well control recommendations based on one or more Bayesian probabilities calculated from one or more kick details and the one or more circulations.

In some embodiments, a computer-implemented method for a well control expert system having a well control Bayesian decision network (BDN) model. The method includes receiving one or more inputs and providing the one or more inputs to one or more nodes of a well control BDN model. The one or more nodes include a kick indicators uncertainty node, a kick verifications uncertainty node dependent on the kick indicators uncertainty node, a kick details uncertainty node dependent on the kick verifications uncertainty node and a circulations decision node. The method also includes determining one or more well control recommendations at a consequences node of the well control BDN model by calculating one or more Bayesian probabilities based on the one or more inputs and providing the one or more well control recommendations to a user.

Additionally, in some embodiments a system is provided that includes having one or more processors and a non-transitory tangible computer-readable memory. The memory includes a well control expert system executable by the one or more processors and configured to provide one or more well control recommendations based on one or more inputs. The well control expert system includes a well control Bayesian decision network (BDN) model. The well control BDN model includes a well control scenarios uncertainty node configured to receive one or more well control scenarios from the one or more inputs and a well control operations uncertainty node dependent on the well control scenarios uncertainty node and configured to receive one or more well control operations from the one or more inputs. The well control BDN model also includes a recommended practices decision node configured to receive one or more recommended practices from the one or more inputs and well control practices consequences node dependent on the well control scenarios uncertainty node, the well control operations uncertainty node, and the recommended practices decision node and configured to output the one or more well control recommendations based on one or more Bayesian probabilities calculated from the one or more well control scenarios, the one or more well control operations, and the one or more recommended practices.

In some embodiments, a computer-implemented method for a well control expert system having a well control Bayesian decision network (BDN) model. The method includes receiving one or more inputs and providing the one or more inputs to one or more nodes of a well control BDN model. The one or more nodes include a well control scenarios uncertainty node, a well control operations uncertainty node dependent on the well control scenarios uncertainty node, a kick details uncertainty node dependent on the kick verifications uncertainty node, and a recommended practices decision node. The method also includes determining one or more well control recommendations at a consequences node of the well control BDN model by calculating one or more Bayesian probabilities based on the one or more inputs and providing the one or more well control recommendations to a user.

Further, in some embodiments a system is provided that includes having one or more processors and a non-transitory tangible computer-readable memory. The memory includes a well control expert system executable by the one or more processors and configured to provide one or more well control recommendations based on one or more inputs. The well control expert system includes a well control Bayesian decision network (BDN) model. The well control BDN model includes a troubleshooting checklists uncertainty node configured to receive one or more troubleshooting checklists from the one or more inputs and an actions and results uncertainty node dependent on the troubleshooting checklists uncertainty node and configured to receive one or more actions and results from the one or more inputs. The well control BDN model also includes a well control problems uncertainty node dependent on the actions and results uncertainty node and configured to receive one or more well control problems from the one or more inputs and a troubleshooting solutions decision node configured to receive one or more troubleshooting solutions from the one or more inputs. Additionally, the well control BDN model also includes a troubleshooting solutions consequences node dependent on the well control problems uncertainty node and the troubleshooting solutions decision node and configured to output the one or more well control recommendations based on one or more Bayesian probabilities calculated from the one or more well control problems and the one or more troubleshooting solutions.

Finally, in some embodiments, a computer-implemented method for a well control expert system having a well control Bayesian decision network (BDN) model. The method includes receiving one or more inputs and providing the one or more inputs to one or more nodes of a well control BDN model. The one or more nodes include a troubleshooting checklists uncertainty node, an actions and results uncertainty node dependent on the troubleshooting checklists uncertainty node, a well control problems uncertainty node dependent on the actions and results uncertainty node, and a troubleshooting solutions decision node. The method also includes determining one or more well control recommendations at a consequences node of the well control BDN model by calculating one or more Bayesian probabilities based on the one or more inputs and providing the one or more well control recommendations to a user.

BRIEF DESCRIPTION OF THE DRAWINGS

FIGS. 5-8 are tables of the probability states associated with the nodes of the Bayesian decision network model of FIG. 4;

FIG. 9 is a table of input utility values assigned to a consequences node of the Bayesian decision network model of FIG. 4;

FIG. 10 is a table of total probability calculations for drilling fluid types of the Bayesian decision network model of FIG. 4;

FIG. 11 is a table of Bayesian probability determinations for the Bayesian decision network model of FIG. 4;

FIG. 12 is a table of consequences based on the Bayesian probability determinations depicted in FIG. 11;

FIG. 13 is a table of expected utilities based on the consequences depicted in FIG. 12;

FIG. 14 is a table of consequences based on the probability states depicted in FIG. 8;

Figure 1:
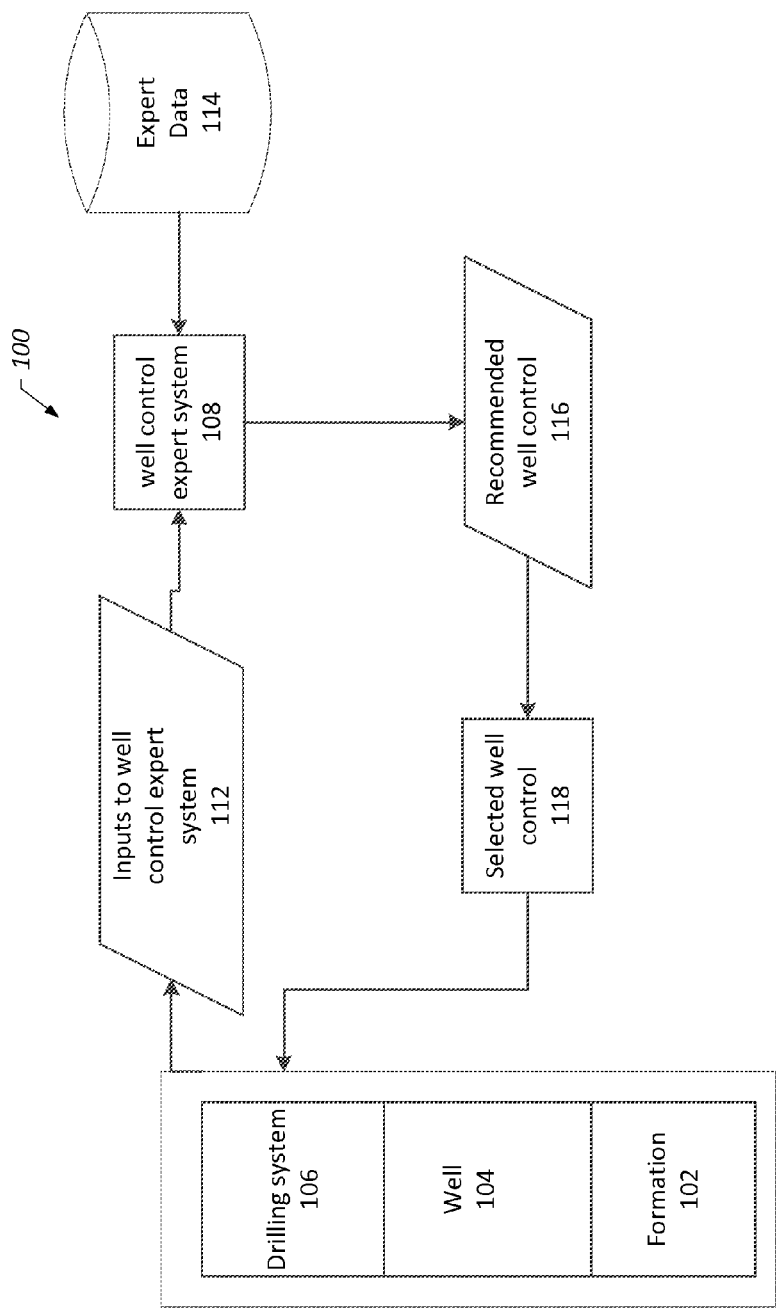
FIG. 1 is a block diagram that illustrates a system in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for a well control expert system based on a Bayesian decision network model. In some embodiments, the well control expert system includes a user interface and probability data based on expert opinions. The well control expert system includes a well control Bayesian decision network model having three sections: a circulation section, a well control practices section, and a troubleshooting section. Each section includes uncertainty nodes and decision nodes that receive inputs, and the consequences node form each section may output a recommendation based on the inputs and Bayesian probability determinations.

FIG. 1 is a block diagram that illustrates a system 100 in accordance with an embodiment of the present invention. The system 100 includes a formation 102, a well 104, and a drilling system 106. The system 100 also includes a well control expert system 108 for use with the drilling system 106. As described further below, the well control expert system 108 may be implemented on a computer and may include a Bayesian decision network to evaluate inputs and output recommended well control operations for use with the drilling system 106. As will be appreciated, the well 104 may be formed on the formation 102 to provide for extraction of various resources, such as hydrocarbons (e.g., oil and/or natural gas), from the formation 102. In some embodiments, the well 104 is land-based (e.g., a surface system) or subsea (e.g., a subsea system). The formation 102 may include The drilling system 106 may develop the well 104 by drilling a hole into the formation 102 using a drill bit, e.g., a roller cone bits, drag bits, etc. The drilling system 106 may generally include, for example, a wellhead, pipes, bodies, valves, seals and so on that enable drilling of the well 104, provide for regulating pressure in the well 16, and provide for the injection of chemicals into the well 104. During operation, various well conditions may occur that require different well control operations to prevent or stop blowouts, reduce pressures, regain control of the well, and so on. Well control operations may include fluid circulation techniques, recommended practices for the operations and the specific conditions (scenarios), and troubleshooting specific problem, such as by using a check list. In some embodiments, the well 104, drilling system 106 and other components may include sensors, such as temperature sensors, pressure sensors, and the like, to monitor the drilling process and enable a user to gather information about well conditions.

The drilling system 106, well 104, and formation 102 may provide a basis for various inputs 112 to the well control expert system 108. For example, as described below, temperature ranges, the formation 102, and potential hole problems may be provided as inputs 112 to the well control expert system 08. The well control expert system 108 may access an expert data repository 114 that includes expert data, such as probability data used by the well control expert system 108. The expert data may be derived from best practices, expert opinions, research papers, and the like. As described further below, based on the inputs 112, the well control expert system 108 may output well control recommendations 116 for use in the drilling system 106. For example, the well control expert system 108 may provide the one or more well control operations based on inputs associated with the drilling system 106. Based on these recommendations, a well control recommendation may be selected and the well control recommendation 118 may be applied to the drilling system.

Figure 2:
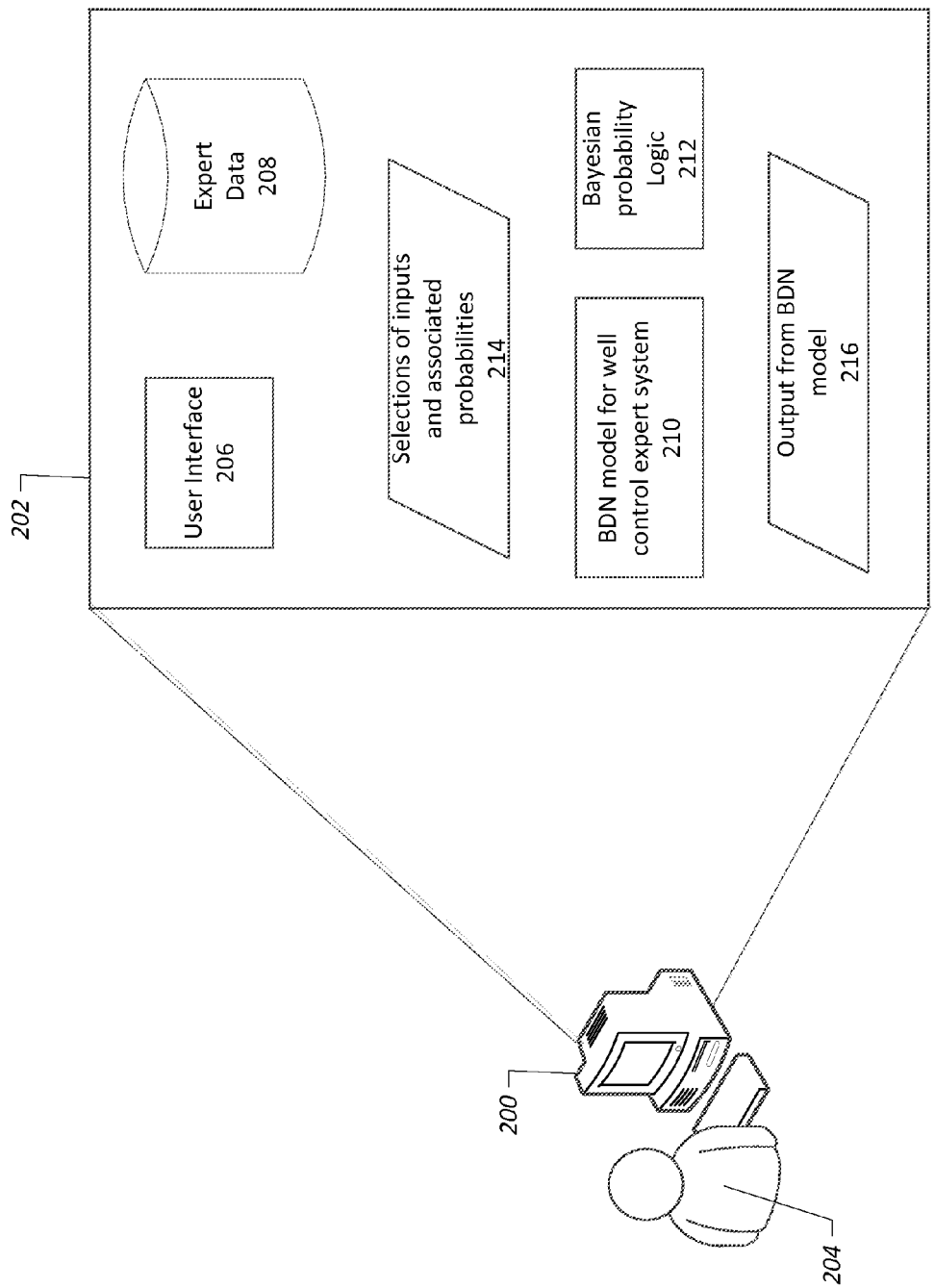
FIG. 2 is a schematic diagram of a computer and a well control expert system in accordance with an embodiment of the present invention.

FIG. 2 depicts a computer 200 implementing a well control expert system 202 in accordance with an embodiment of the present invention. As shown in FIG. 2, a user 204 may interact with the computer 200 and the well control expert system 202. In some embodiments, as shown in FIG. 2, the well control expert system 202 may be implemented in a single computer 200. However, in other embodiments, the well control expert system 202 may be implemented on multiple computers in communication with each other over a network. Such embodiments may include, for example, a client/server arrangement of computer, a peer-to-peer arrangement of computers, or any other suitable arrangement that enables execution of the well control expert system 202. In some embodiments, the well control expert system 202 may implemented as a computer program stored on a memory of the computer 200 and executed by a process of the computer 200.

In some embodiments, the well control expert system 202 may include a user interface 206 and an expert data repository 208. The user interface 206 may be implemented using any suitable elements, such as windows, menus, buttons, web pages, and so on. As described in detail below, the well control expert system 202 may include a Bayesian decision network (BDN) model 210 that implemented Bayesian probability logic 212. The BDN model 210 may evaluate selections of inputs and associated probabilities 214 and output a decision 216 from the BDN model. In the embodiments described herein, the BDN model 210 may include three sections related to well control: proposed circulation process, optimum practice based on scenarios and operations, and a troubleshooting checklist. The inputs to the proposed circulation process may include kick indicators, verification of the kick, and details of the kick. The inputs to the well control practice may include possible well control scenarios and possible operations. Additionally, the inputs to the troubleshooting checklist may include checklists for troubleshooting, actions taken and results, and problems. The BDN model 210 may then calculate Bayesian probabilities for the consequences resulting from the selected inputs, and then output recommended well control operations. The output may include an expected utility value for each well control operation to enable to user to evaluate and select the well control operation having the optimal expected utility for the selected inputs.

As described below, a user 204 may use the user interface 206 to enter selections 210 of inputs for the BDN model 210. The associated probabilities for the inputs may be obtained from the expert data repository 208. Based on the inputs 210, a user 204 may receive the outputs 212 from the BDN model 210, such as recommended well control operations and expected utility value. The output 212 may be provided for viewing in the user interface 206. Further, as explained below, a user may return to the well control expert system 202 to add or change the inputs 214. The BDN model 210 may recalculate the outputs 216 based on the added or changed inputs 214 and the Bayesian probability logic 212. The recalculated outputs 216 may then provide additional or changed well control recommendations and expected utility values. Here again, the outputs 216 may be provided to the user in the user interface 206.

Figure 3A:
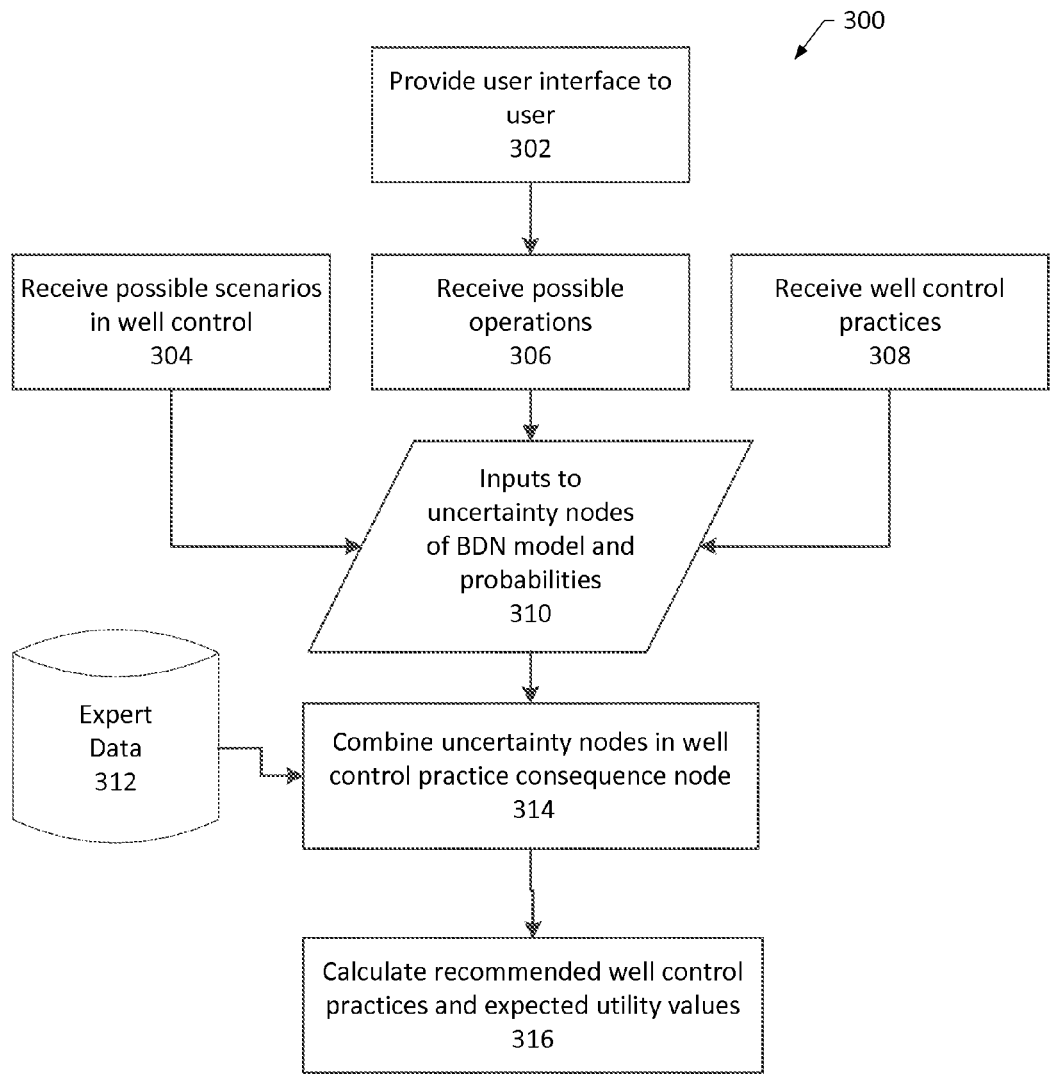
FIGS. 3A-3C are block diagrams of processes of a well control expert system in accordance with an embodiment of the present invention.

FIG. 3A depicts a process 300 of the operation of a portion of a well control expert system in accordance with an embodiment of the present invention. The process 300 illustrates a process for a proper well control practice portion of the well control expert system, as illustrated further below. Initially, a user interface for a well control expert system may be provided to a user (block 302). From the user interface, various selections of inputs may be received. For example, selections of possible scenarios may be received (block 304) by the well control expert system. As explained below, a user may enter a selection of one or more possible scenarios into the well control expert system. Additionally, selections of possible operations may be received (block 306) by the well control expert system. As illustrated below, the possible operations may be dependent on the inputs of the possible scenarios. As explained below, inputs may be provided at any node of a BDN of the well control expert system. Additionally, in some embodiments, well control practices may also be selected and received by the well control expert system (block 308). Any one of or combination of these selections may be received. As described below, the well control expert system enables a user to enter inputs at any node of the well control BDN model.

Next, the received selections may be provided as inputs to uncertainty nodes of a well control BDN model of the well control expert system (block 310), and the inputs may include associated probability states, as determined from expert data 312. Next, the data from the uncertainly nodes may be combined (i.e., propagated to) a consequence node of the well control BDN model based on the expert data (block 312). The propagation and determination of consequences is based on the Bayesian logic described below in FIGS. 2-15 and implemented in the well control BDN model. Next, recommended well control practices and expected utility values may be calculated by the BDN model (block 316). In some embodiments, the recommended well control practices, expected utility values, or both may be output in a user interface of the well control expert system.

Figure 3B:
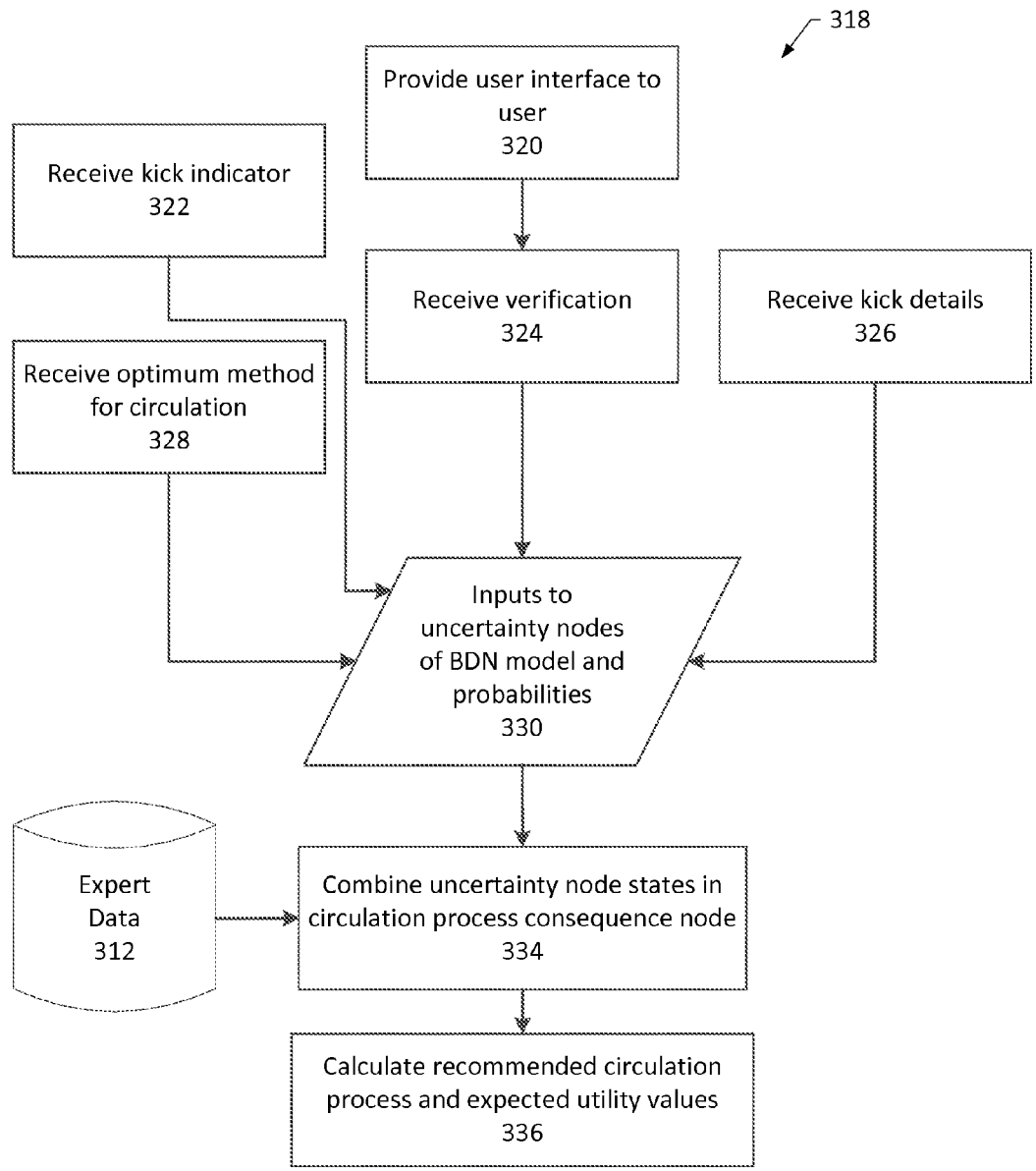

FIG. 3B depicts a process 318 of the operation of another section of a well control expert system in accordance with an embodiment of the present invention. The process 318 illustrates a process for a circulation section of the well control expert system, as illustrated further below. Initially, a user interface for a well control expert system may be provided to a user (block 320). From the user interface, various selections of inputs may be received. For example, selections of kick indicators may be received (block 322) by the well control expert system. As explained below, a user may enter a selection of one or more possible kick indicators into the well control expert system. Additionally, kick verifications may be received (block 324) by the well control expert system, such as by a user selecting one or more of the kick verifications. As illustrated below, the kick verifications may be dependent on the inputs of the kick indicators. In some instances, kick details may also be input to and received by the well control expert system (block 326). Finally, circulation processes may also input to and received by the well control expert system (block 328). Any one of or combination of these selections may be received. As described below, the well control expert system enables a user to enter inputs at any node of a well control BDN model. Moreover, as also illustrated below in FIG. 16, the possible operations used in the well control expert system are dependent on the possible scenarios of the BDN model.

Next, the received selections may be provided as inputs to uncertainty nodes of a well control BDN model of the well control expert system (block 330), and the inputs may include associated probability states, as determined from expert data 312. Next, the data from the uncertainly nodes may be combined (i.e., propagated to) a consequence node of the well control BDN model based on the expert data (block 334). The propagation and determination of consequences is based on the Bayesian logic described below in FIGS. 4-15 and implemented in the well control BDN model. Next, recommended circulation processes and expected utility values may be calculated by the BDN model (block 336). In some embodiments, the recommended circulation processes, expected utility values, or both may be output in a user interface of the well control expert system.

Figure 3C:
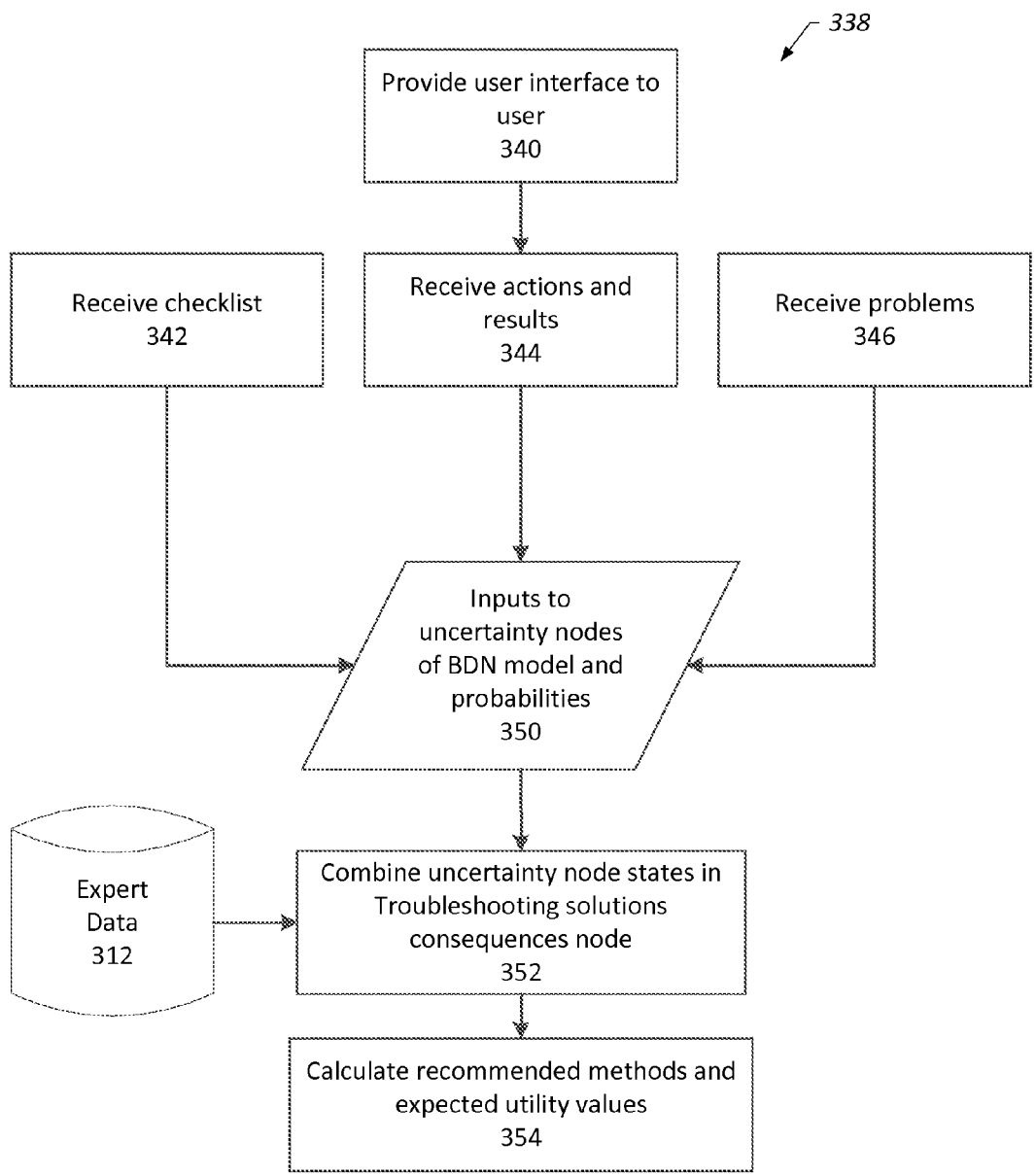

FIG. 3C depicts a process 338 of the operation of another section of a well control expert system in accordance with an embodiment of the present invention. The process 338 illustrates a troubleshooting section of the well control expert system, as illustrated further below. Initially, a user interface for a well control expert system may be provided to a user (block 340). From the user interface, various selections of inputs may be received. For example, one or more checklists for troubleshooting may be received (block 342) by the well control expert system. As explained below, a user may enter a selection of one or more possible troubleshooting checklists into the well control expert system. Additionally, actions and corresponding results may be input to and received by the well control expert system (block 344). As illustrated below, the actions taken and corresponding results may be dependent on the troubleshooting checklists input to the well control expert system. In some instances, well control problems may also be input to and received by the well control expert system (block 346). Any one of or combination of these inputs may be selected by a user for input to the well control expert system. As described below, the well control expert system enables a user to enter inputs at any node of a well control BDN model.

Next, the received inputs may be provided to uncertainty nodes of a well control BDN model of the well control expert system (block 350), and the inputs may include associated probability states, as determined from expert data 312. Next, the data from the uncertainly nodes may be combined (i.e., propagated to) a consequence node of the well control BDN model (block 354). The propagation and determination of consequences is based on the Bayesian logic described below in FIGS. 2-15 and implemented in the well control BDN model. Next, recommended troubleshooting solutions and expected utility values may be calculated by the well control BDN model (block 354). Finally, the recommended troubleshooting solutions, expected utility values, or both may be output in a user interface of the well control expert system.

FIGS. 4-15 depict an example of a BDN model simulating the decision-making process of the selection of a swelling packer. The model described below in FIGS. 4-15 is illustrative of the application of a Bayesian decision network to the selection of a swelling packer for use in a drilling system. Based on the techniques illustrated in FIGS. 4-15 and described below, a well control BDN model associated with a well control expert system, such as that described above in FIGS. 1 and 2 may be implemented. The well control BDN model is illustrated in detail in FIGS. 16-29 and described below. Thus, the techniques and implementation described in FIGS. 4-15 may be applied to the more detailed BDN model and operation illustrated in FIGS. 16-29.

Figure 4:
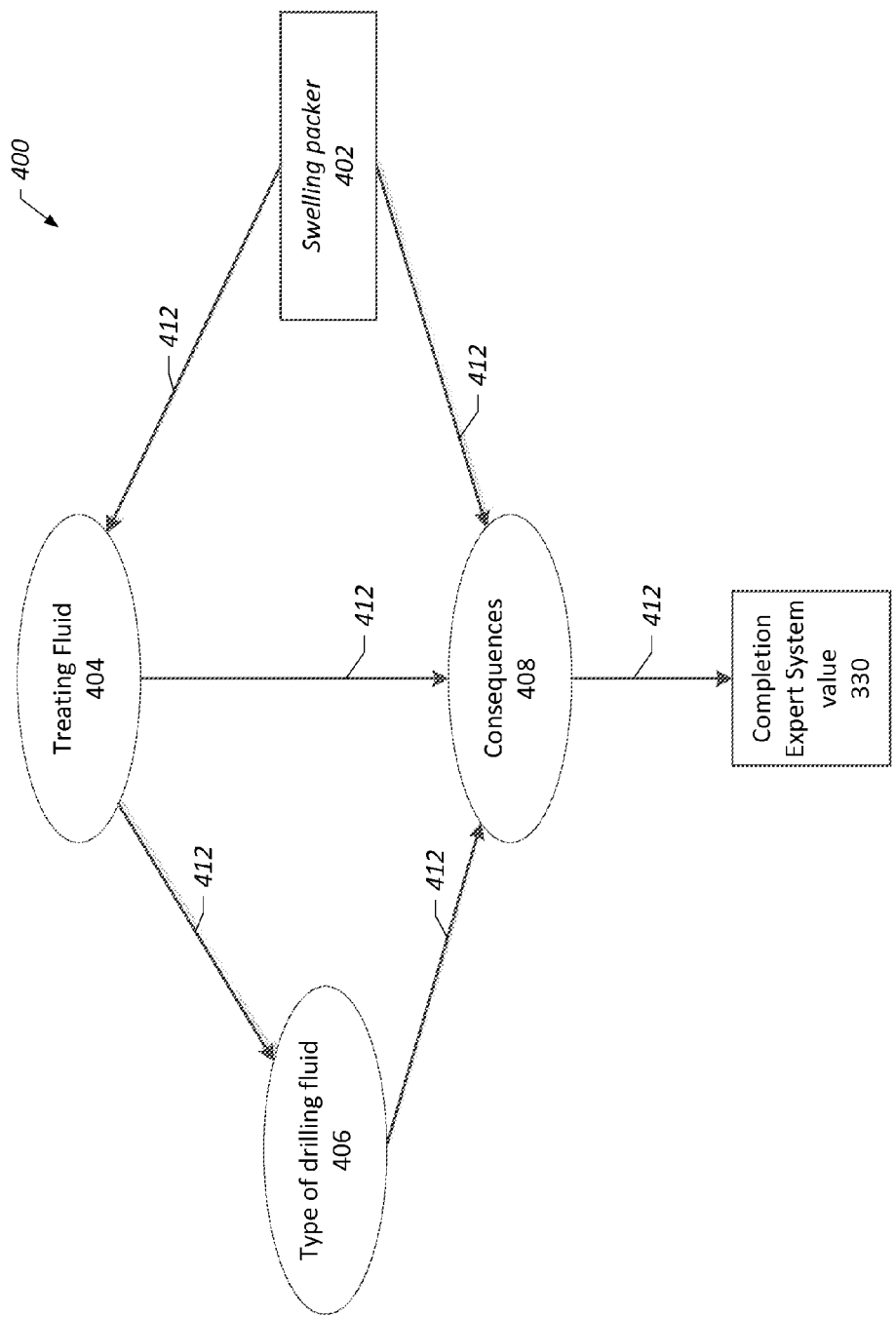
FIG. 4 is a schematic diagram of an example of a Bayesian decision network model for the selection of a swelling packer in accordance with an embodiment of the present invention.

FIG. 4 depicts a BDN model 400 for the selection of a swelling packer in accordance with an embodiment of the present invention. The BDN model 400 depicted in FIG. 4 includes a swelling packer decision node 402, a treating fluid uncertainty node 404, a drilling fluid type uncertainty node 406, a consequences node 408, and a completion expert system value node 410. As will be appreciated, the selection of a swelling packer may be relevant in the completion of a well to production status. In the illustrated BDN model 400, the various connection lines 412 indicate direct dependencies between the different nodes. Accordingly, the consequences node may be dependent on the inputs to the uncertainty nodes 404 and 406 and the decision node 402. Similarly, the treating fluid uncertainty node 404 may be dependent on the swelling packer decision node 402.

After defining the BDN model 400, the probability states associated with each node may be defined. FIGS. 5-7 depict various tables illustrating the states, such as probability states, associated with each node of the BDN model 400. The probability distributions may be defined based on expert data entered in the BDN model 400. FIG. 5 depicts a table 500 illustrating the states associated with the swelling packer decision node 402. As shown in table 500, the swelling packer decision node 402 may have a first probability state 502 of "water swelling packer" and a second probability state 504 of "oil swelling packer." Next, FIG. 6 depicts a table 600 illustrating the probability states associated with the treating fluid uncertainty node 404. The probability states associated with the treating fluid uncertainty node 404 are dependent on the dependency on the swelling packer decision node 402. As shown in table 600, the probability states for two treating fluids 602 ("Lactic acid") and 604 ("HCl acid") are shown. For example, for a lactic acid treating fluid 602, the probability state for a water swelling packer 606 is 0.9 and the probability state for an oil swelling packer 608 is 0.5. Similarly, for an HCl acid treating fluid 604, the probability state for the water swelling packer 606 is 0.1 and the probability state for the oil swelling packer 608 is 0.5.

FIG. 7 depicts a table 700 illustrating the probability states associated with the drilling fluid type uncertainty node 406. As shown in the BDN model 400 depicted in FIG. 4, the drilling fluid type uncertainty node 406 is dependent on the dependency on the treating fluid uncertainty node 404 and the swelling packer decision node 406. In the table 700, the probably states associated with two drilling fluid types 702 ("Formate drilling fluid") and 704 ("CaCO₃ drilling fluid") are depicted for combinations of a water swelling packer 706, an oil swelling packer 708, a lactic acid treating fluid 710, and an HCl acid treating fluid 712. For example, as shown in FIG. 7, for the formate drilling fluid type 702, the probability state for the water swelling packer 706 and lactic acid treating fluid 710 is 0.8 and the probability state for the water swelling packer 706 and HCl acid treating fluid 712 is 0.2. Similarly, for the CaCO₃ drilling fluid type 704, the probability state for the water swelling packer 706 and lactic acid treating fluid 710 is 0.2 and the probability state for the water swelling packer 706 and HCl acid treating fluid 712 is 0.8. In a similar manner, the table 700 of FIG. 7 depicts the probability states for the oil swelling packer 708 and the various combinations of lactic acid treating fluid 710 and the HCl acid treating fluid 712, and the formate drilling fluid type 702 and the CaCO₃ drilling fluid type 704.

FIG. 8 depicts a table 800 illustrating the probability states of the consequences node 408. The consequences node 408 is dependent on its dependency on the swelling packer decision node 402, treating fluid uncertainty node 404, and the drilling fluid type uncertainty node 406. As shown in table 800, the probability states associated with two consequences 802 ("Recommended") and 804 ("Not recommended") are depicted for various combinations of a water swelling packer 806 or an oil swelling packer 808, a formate drilling fluid type 810 or a CaCO₃ drilling fluid type 812, and a lactic acid treating fluid 814 or an HCl acid treating fluid 816. For example, for the Recommended consequence 802, the probability state for the combination of water swelling packer 806, the formate drilling fluid 810, and lactic acid treating fluid 814 is 0 and the probability state for the combination of the water swelling packer 806, the formate drilling fluid 810, and HCl acid treating fluid 816 is 1. In another example, as shown in table 800, for the Not recommended consequence 804, the probability state for combination of the water swelling packer 806, the formate drilling fluid 810, and lactic acid treating fluid 814 is 1 and the probability state for the combination of the water swelling packer 806, the formate drilling fluid 810, and HCl acid treating fluid 816 is 0.

In the BDN model 400, the consequences associated with the consequences utility node 408 may be assigned input utility values. FIG. 9 depicts a table 900 illustrating the input utility values assigned to the consequences from the consequences utility node 408. As shown in table 900, a value 902 may be assigned to each consequence of the consequence node 408. For a consequence 904 of Recommended, an input utility value of 1 may be assigned. Similarly, for a consequence 906 of Not Recommended, an input utility value of 0 may be assigned. As described below, after the probability states for the consequences are determined in the BDN model 400, the input utility values assigned to each consequence may be Using the model and probabilities described above, the functionality of the BDN model 400 will be described. After receiving inputs to the model 400, the model 400 may simulate the uncertainty propagation based on the evidence, e.g., the probability states, at each node, using Bayesian probability determinations. A Bayesian probability may be determined according to Equation 1:

$$p(\text{hypothesis} | \text{evidence}) = \left( \frac{p(\text{evidence} | \text{hypothesis}) p(\text{hypothesis})}{p(\text{evidence})} \right) \quad (1)$$

Where:

p(hypothesis|evidence) is the probability of a hypothesis conditioned upon evidence;

p(evidence|hypothesis) is the probability the evidence is plausible based on the hypothesis;

p(hypothesis) is the degree of certainty of the hypothesis; and p(evidence) is the degree of certainty of the evidence.

Referring again to the BDN model 400 discussed above, the model 400 illustrates that a selection of drilling fluid affects the treating fluid and the swelling packer, as illustrated by the dependencies in the model 400. First, the total probability for a drilling fluid type may be calculated based on the evidence from the uncertainty nodes by Equation 2:

$$\sum_{i=1}^{m} P(B | A_i) P(A_i) \quad (2)$$

Where:

$P(B|A_i)$ is the probability based on B in view of $A_i$;

$P(A_i)$ is the probability of $A_i$; and m is the total number of evidence items.

Using Equation 2, the total probability for a drilling fluid type and lactic acid treating fluid may be calculated according to Equation 3:

$$\sum_{i=1}^{m} p(formatedrillingfluid \mid lacticacid_i) P(lacticacid_i) \quad (3)$$

For example, using the probability data illustrated in FIGS. 6 and 7, the total probability for a formate drilling fluid type may be calculated as the sum of 0.9 (probability for a lactic acid treating fluid and water swelling packer) multiplied by 0.8 (probability for a formate drilling fluid type, lactic acid treating fluid, and water swelling packer) and 0.1 (probability for a lactic acid treating fluid and water swelling packer) multiplied by 0.2 (probability for a lactic acid treating fluid and water swelling packer).

The results of the total probability calculations for drilling fluid types are illustrated in table 1000 depicted in FIG. 10. Table 1000 depicts the total probabilities for various combinations of drilling fluids 1002 ("Formate drilling fluid) and 1004 ("CaCO3 drilling fluid") and a water swelling packer 1006 and an oil swelling packer 1008. As explained above, the total probabilities at the drilling fluid uncertainty node are dependent on the evidence from the treating fluid uncertainty node and the swelling packer decision node. As shown in table 1000 of FIG. 10, the total probability for a formate drilling fluid 1002 and the water swelling packer 1006 is 0.74, and the total probability for a formate drilling fluid 1002 and the oil swelling packer 1008 is 0.5. Similarly, total probabilities for the $CaCO_3$ drilling fluid type 1004 are also depicted in table 1000.

Using the total probabilities determined above, the Bayesian probability determination of Equation 1 may be used to calculate the Bayesian probability of a treating fluid used with a specific drilling fluid type and a particular swelling packer. Accordingly, a Bayesian probability may be derived by combining the Bayesian probability of Equation 1 with the total probability calculation of Equation 2, resulting in Equation 4:

$$P(A_j \mid B) = \frac{p(B \mid A_j) P(A_j)}{\sum_{i=1}^{m} P(B \mid A_i)(P(A_i)} \quad (4)$$

Thus, based on Equation 4, the Bayesian probability determination for a lactic acid treating fluid and a formate drilling fluid type for a water swelling packer may be determined according to Equation 5, using the total probabilities depicted in the table 700 of FIG. 7 and the table 1000 of FIG. 10:

$$P\left(lacticacid \mid formate\right) = \left(\frac{P(formate \mid lacticacid) P(lacticacid)}{P(formate)}\right) \quad (5)$$
$$= \frac{0.8 \times 0.9}{0.74}$$
$$= 0.9729$$

As depicted above in FIG. 7, the probability associated with a formate drilling fluid type conditioned on lactic acid treating fluid is 0.8 and the probability of lactic acid for a water swelling packer is 0.9. Additionally, as calculated above in FIG. 10, the total probability associated with a formate drilling fluid and a water swelling packer is 0.74. Using these probabilities, the Bayesian probability for a lactic acid treating fluid and a formate drilling fluid type may be calculated as shown in Equation 5. Similarly, Equation 6 depicts the Bayesian probability determination for an HCl treating fluid and a formate drilling fluid type, as shown below:

$$P\left(HClacid \mid formate\right) = \left(\frac{P(formate \mid HClacid) P(HClacid)}{P(formate)}\right) \quad (6)$$
$$= \frac{0.2 \times 0.1}{0.74}$$
$$= 0.0270$$

As noted above, the values for the probabilities depicted in Equation 6 may be obtained from the probability states depicted in tables 600 and 700 of FIGS. 6 and 7 and the total probability calculations depicted in table 1000 of FIG. 10. In a similar manner, Equations 7 and 8 depict the Bayesian probability determinations for a $CaCO_3$ drilling fluid type:

$$P\left(lacticacid \mid CaCo_3\right) = \left(\frac{P(CaCo_3 \mid lacticacid) P(lacticacid)}{P(CaCo_3)}\right) \quad (7)$$
$$= \frac{0.2 \times 0.9}{0.26}$$
$$= 0.6923$$

$$P\left(HClacid \mid CaCo_3\right) = \left(\frac{P(CaCo_3 \mid HClacid) P(HClacid)}{P(CaCo_3)}\right) \quad (8)$$
$$= \frac{0.8 \times 0.1}{0.26}$$
$$= 0.3076$$

The Bayesian probability determinations may also be performed for an oil swelling packer for the various combinations of treating fluid and drilling fluid types. Using the probability states depicted in tables 600 and 700 of FIGS. 6 and 7 and the total probability calculations depicted in table 1000 of FIG. 10, these Bayesian probability determinations are shown below in Equations 9-12:

$$P\left(lacticacid \mid formate\right) = \left(\frac{P(formate \mid lacticacid) P(lacticacid)}{P(formate)}\right) \quad (9)$$
$$= \frac{0.8 \times 0.5}{0.5}$$
$$= 0.8$$

$$P\left(HClacid \mid formate\right) = \left(\frac{P(formate \mid HClacid)}{P(formate)}\right) \quad (10)$$
$$= \frac{0.2 \times 0.5}{0.5}$$
$$= 0.02$$

$$P\left(lacticacid \mid CaCo_3\right) = \left(\frac{P(CaCo_3 \mid lacticacid) P(lacticacid)}{P(CaCo_3)}\right) \quad (11)$$
$$= \frac{0.8 \times 0.5}{0.5}$$
$$= 0.8$$

$$P\left(HClacid \mid CaCo_3\right) = \left(\frac{P(CaCo_3 \mid HClacid) P(HClacid)}{P(CaCo_3)}\right) \quad (12)$$
$$= \frac{0.2 \times 0.5}{0.5}$$
$$= 0.2$$

The results of the calculations shown above in Equations 5-12 are depicted in table 1100 in FIG. 11. Table 1100 depicts the Bayesian probability determinations for treating fluids 1102 ("Lactic acid") and 1104 ("HCl acid") and swelling packers 1106 ("water swelling packer") and 1108 ("oil swelling packer"). The Bayesian probability determinations are shown for both a formate drilling fluid type 1110 and $CaCO_3$ drilling fluid type 1112.

After determining the Bayesian probabilities described above, the BDN model 400 may be used to select a swelling packer based on the inputs provided to the uncertainty nodes of the model 400. For example, the BDN model 400 may be used with two different interpretations of the output to provide the optimal swelling packer for the inputs provided to the model 400. In one interpretation, the model 400 may receive a user selection of an input for one uncertainty node, and an optimal swelling packer may be determined based on the possible inputs to the other uncertainty node. Thus, as shown table 1100 and FIG. 11, the drilling types 1110 and 1112 may be "Selected by user." By specifying a type of drilling fluid, the respective Bayesian probability determinations may be read from the table 1100.

FIG. 12 depicts a table 1200 illustrating the consequences for a user selection of a $CaCO_3$ drilling fluid type based on the Bayesian probability determinations depicted in FIG. 11. For example, if a $CaCO_3$ drilling fluid type is used to drill a well, the consequences of using a water swelling packer 1202 or an oil swelling packer 1204 are depicted in table 1200. The consequences illustrated in table 1200 may include a "Recommended" consequence 1206 and a "Not Recommended" consequence 1208. Accordingly, for a user selection of a $CaCO_3$ drilling fluid type, the Bayesian probabilities read from table 1100 for a water swelling packer are 0.6923 for a lactic acid and 0.3076 for an HCl acid treating fluid. Similarly, values for a user selection of a $CaCO_3$ drilling fluid type and an oil swelling packer are 0.8 and 0.2. As shown in FIG. 12, the Bayesian probability determinations greater than 50% (0.5) may be provided as Recommended consequences 1206 and the Bayesian probability determinations less than 50% (0.5) may be included as Non Recommended consequences 1208.

As mentioned above, table 900 of FIG. 9 depicts input utility values associated with Recommended and Not Recommended consequences. As shown in this table, a Recommended consequence has an input utility value of 1 and a Not Recommended consequence has an input utility value of 0. By combining the input utility values and the Bayesian probabilities depicted in FIG. 12, the expected utility may be calculated according to Equation 13:

$$Expectedutility = \sum_{i=1}^{n} consequenceresult \times inpututilityvalue \quad (13)$$

Where:
Expectedutility is the expected utility value;
Consequence result is the Bayesian probability value associated with a consequence;
Inpututilityvalue is the input utility value associated with a consequence; and
n is the total number of consequences.

Accordingly, based on the input utility values depicted in FIG. 9 and the Bayesian probabilities depicted in FIG. 12, the expected utility value may be calculated using Equation 13. For example, for a user selection of a $CaCO_3$ drilling fluid type, the Bayesian probability associated with the Recommended consequence is 0.6923 (table 1100 in FIG. 11) and the input utility value associated with the Recommended consequence is 1 (table 900 in FIG. 9). Similarly, for a user selection of a $CaCO_3$ drilling fluid type, the Bayesian probability associated with the Recommended consequence is 0.3076 (table 1100 in FIG. 11) and the input utility value associated with the Recommended consequence is 0 (table 900 in FIG. 9). The calculation of the expected utility for a water swelling packer and a user selection of a $CaCO_3$ drilling fluid type is illustrated below in Equation 14:

$$Expectedutility = \sum_{i=1}^{n} consequenceresult \times inpututilityvalue = \quad (14)$$
$$0.6923 \times 1 + 0.3076 \times 0 = 0.6923$$

The calculation the expected utility of the expected utility for an oil swelling packer and a user selection of a $CaCO_3$ drilling fluid type is illustrated below in Equation 15:

$$Expectedutility = \quad (15)$$
$$\sum_{i=1}^{n} consequenceresult \times inpututilityvalue = 0.8 \times 1 + 0.2 \times 0 = 0.8$$

The results of the calculations performed in Equations 14 and 15 are summarized in FIG. 13. FIG. 13 depicts a table 1300 showing the expected utility 1302 calculated above. As shown in this figure, the expected utility 1302 for a water swelling packer 1304 is 0.6293 (Equation 14), and the expected utility 1302 for an oil swelling packer 1306 is 0.8 (Equation 15). Thus, after inputting a drilling fluid type in the drilling fluid uncertainty node 406 in the BDN model 400, the BDN model 400 may output these expected utility values for the swelling packers associated with the swelling packer decision node 402. Based on these expected utility values, a user may select an optimal swelling packer for use with the selected drilling fluid type. For example, a user may select the swelling packer with the higher expected utility value, i.e., the oil swelling packer. That is, as shown in table 1300 of FIG. 13, the expected utility value of 0.8 associated with the oil swelling packer is greater than the expected utility value of 0.6923 associated with the water swelling packer.

In other interpretations, a user may input values for all of the uncertainty nodes of the BDN model 400 to determine the optimal selection of a swelling packer. In such instances, the consequences may be determined directly from the consequences node 408 of the BDN model 400, as depicted above in table 800 of FIG. 8. For example, a user may select inputs for the treating fluid uncertainty node 404 and the drilling fluid type uncertainty node 406 of the BDN model 400. Accordingly, FIG. 14 depicts a table 1400 showing the consequences for different swelling packers based on a user selection of a formate drilling fluid type and a lactic acid treating fluid. As shown in FIG. 14, the consequences may include a "Recommended" consequence 1402 and a "Not Recommended" consequence 1404 for both a water swelling packer 1406 and an oil swelling packer 1408. For a user selection of a formate drilling fluid type and a lactic acid treating fluid, table 800 of FIG. 8 shows a Recommended consequence value of 0 Not Recommended consequence value of 1 for a water swelling packer. Accordingly, the table 1400 shows that the water swelling packer 1406 has a Recommended consequence value of 0 and a Not Recommended consequence value of 1. Similarly, for a user selection of a formate drilling fluid type and a lactic acid treating fluid, table 800 of FIG. 8 shows a Recommended consequence value of 1 and a Not Recommended consequence value of 0 for an oil swelling packer. Thus, the table 1400 shows that the oil swelling packer 1408 has a Recommended consequence value of 1 and a Not Recommended consequence value of 0.

Based on the consequences described above, the expected utility for the different swelling packers may be determined using Equation 13 described above. For example, based on table 1400 of FIG. 14, the calculation of the expected utility for a water swelling packer is illustrated below in Equation 16:

$$Expectedutiilty = \sum_{i=1}^{n} consequenceresult \times inpututilityvalue = 0 \times 1 + 1 \times 0 = 0 \quad (16)$$

Similarly, the calculation of the expected utility for an oil swelling packer, using the values for consequences shown in table 1400 of FIG. 14, is illustrated below in Equation 17:

$$Expectedutiilty = \sum_{i=1}^{n} consequenceresult \times inpututilityvalue = 1 \times 1 + 0 \times 0 = 0 \quad (17)$$

Figure 15:
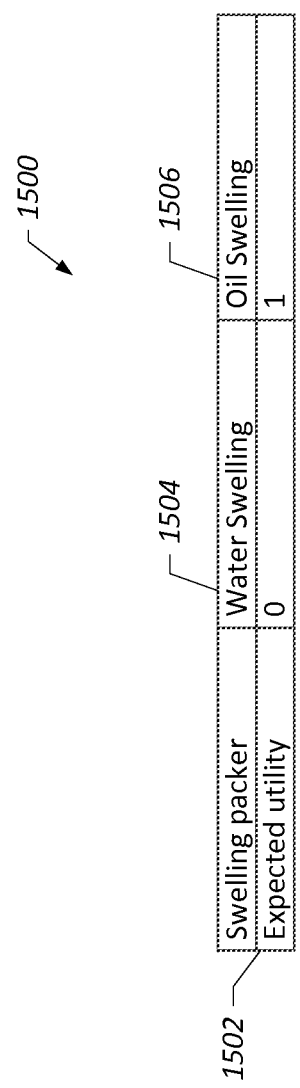
FIG. 15 is a table of expected utilities based on the consequences depicted in FIG. 14.

FIG. 15 depicts a table 1500 illustrated the results of the calculations performed above in Equations 16 and 17. An expected utility 1502 for a water swelling packer 1504 and an oil swelling packer 1506 is illustrated in table 1500. Based on a user selection of a formate drilling fluid type and a lactic acid treating fluid, an expected utility value for the water swelling packer 1504 is 0 and the expected utility value for the oil swelling packer 1506 is 1. Based on these values, a user may select a swelling packer for use based on the BDN model 400. For example, a user may select the swelling packer with the higher expected utility value in table 1500, i.e., an oil swelling packer. Here again, a user may select an optimal swelling packer for use with the inputs, i.e., a selected treating fluid and drilling fluid type, provided to the BDN model 400. For example, a user may select the swelling packer with the higher expected utility value, i.e., the oil swelling packer. That is, as shown in table 1500 of FIG. 15, the expected utility value of 1 associated with the oil swelling packer is greater than the expected utility value of 0 associated with the water swelling packer.

Figure 16:
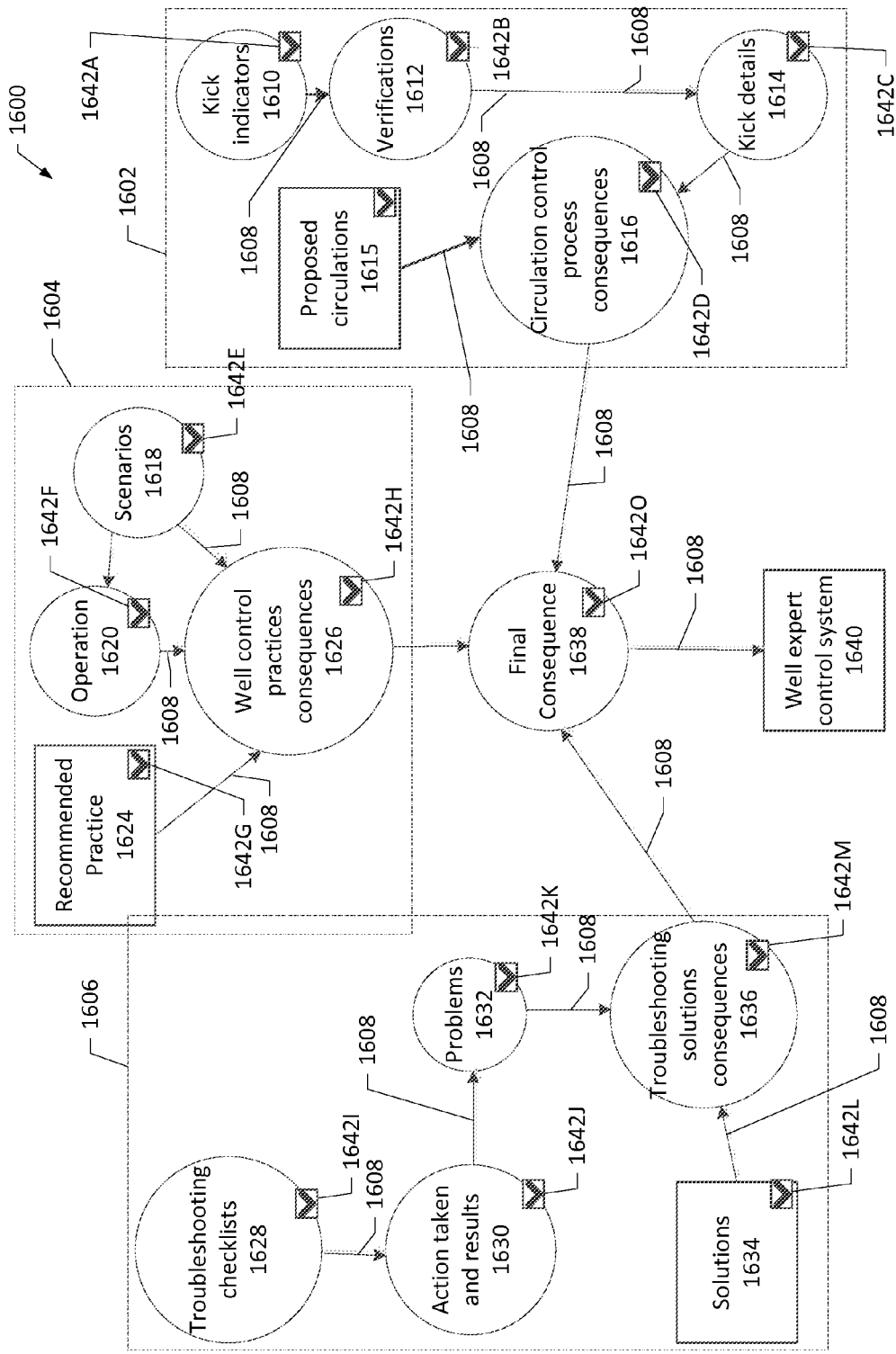
FIG. 16 is a schematic diagram depicting a well control Bayesian decision network (BDN) model in accordance with an embodiment of the present invention.

With the above concepts in mind, the BDN modeling techniques described above may be applied to more complicated models. Such models may serve as a training tool or a guide to aid engineers, scientists, or other users in selecting and executing operations of a drilling system. In some embodiments, a BDN model may be used for selecting a drilling fluid for use in a drilling system, as described above in FIGS. 1-3. FIG. 16 depicts an example of a well control BDN model 1600 for recommending well control operations in a well control expert system, such as the well control expert system 108 described above. The well control BDN model 1600 may be divided into three sections related to well control: a circulation section 1602, a well control practices section 1604, and a troubleshooting section 1606. The nodes of each section of the well control BDN model 1600 are described further below. The connection lines 1608 indicate the dependencies between each node of the model 1600.

The proposed circulation 1602 of the well control BDN model 1600 includes a kick indicator uncertainty node 1610, a kick verification uncertainty node 1612, a kick details uncertainty node 1614, a circulations decision node 1615, and a circulation control process consequences node 1616. As shown in the BDN model 1600, the kick verification node 1612 is dependent on the kick indicator uncertainty node 1610, the kick details uncertainty node 1614 is dependent on the kick verification uncertainty node 1612, and the circulation control process consequences node 1616 is dependent on the kick details uncertainty node 1614 and the circulations decision node 1615.

The well control practice section 1604 of the well control BDN model 1600 includes a well control scenarios uncertainty node 1618, a well control operations uncertainty node 1620, a recommended practice decision node 1624, and a well control practices consequences node 1626. As shown in the well control BDN model 1600, the possible operation node 1620 is dependent on the possible scenarios uncertainty node 1618, and the consequences node 1626 is dependent on the recommended practice decision node 1614 and the uncertainty nodes 1618 and 1620.

Finally, the troubleshooting section 1606 of the well control BDN model 1600 includes a troubleshooting checklists uncertainty node 1628, an actions and results uncertainty node 1630, a well control problems uncertainty node 1632, a solutions decision node 1634, and a troubleshooting solutions consequences node 1636. As shown in the well control BDN model 1600, the actions and results uncertainty node 1630 is dependent on the troubleshooting checklists uncertainty node 1628 and the problems uncertainty node 1632 is dependent on the actions and results uncertainty node 1630. Additionally, the troubleshooting solutions consequences node 1636 is dependent on the problems uncertainty node 1632 and the solutions decision node 1634. The output from each section 1602, 1604, and 1606 of the well control BDN model 1600 is propagated to a final consequence node 1638 and, then, to a well control expert system 1640. Accordingly, the final consequence uncertainty node 1638 is dependent on the consequences nodes 1616, 1626, and 1636.

In some embodiments, the BDN model 1600 may be implemented in a user interface similar to the depiction of the model 1600 in FIG. 16. In such embodiments, for example, each node of the model 1600 may include a button 1642 that enables a user to select a value for the node or see the determinations performed by a node. For example, as described below, a user may select (e.g., click) the button 1642A to select a kick indicator input for the uncertainty node 1610, select the button 1642E to select (e.g., click) a well control scenario input for the uncertainty node 1620, and so on.

FIGS. 17-23 depict the inputs for each node of the well control BDN model in further detail. For example, FIGS. 17A-17D depict the inputs for the circulation section 1602 of the BDN model 1600. FIG. 17A depicts inputs 1700 for the kick indicator node 1610 in accordance with an embodiment of the present invention. As shown in FIG. 17A, the inputs 1700 may include well control kick indicators and may have N number of inputs from "kick_indicator_1" through "kick_indicator_N." As will be appreciated, in some embodiments the inputs 1700 may include associated probabilities, such as probabilities p__1 through p_N. The inputs 1700 may include indicators of kicks that occur during drilling operations in a drilling system. For example, in some embodiments the inputs 1700 may include the following: "Slower_drilling_with_PDC_bit_or_faster_drilling_with_tricone_bit", "Increase in flow rate and pit gain", "Pump_speed_increase_and_circulation_pressure_decrease", "Change_in_drillingstring_weight", "Mud_cut_and_salinity_changes", and "MWD_and_sonic_kick_detection."

Figure 17A:
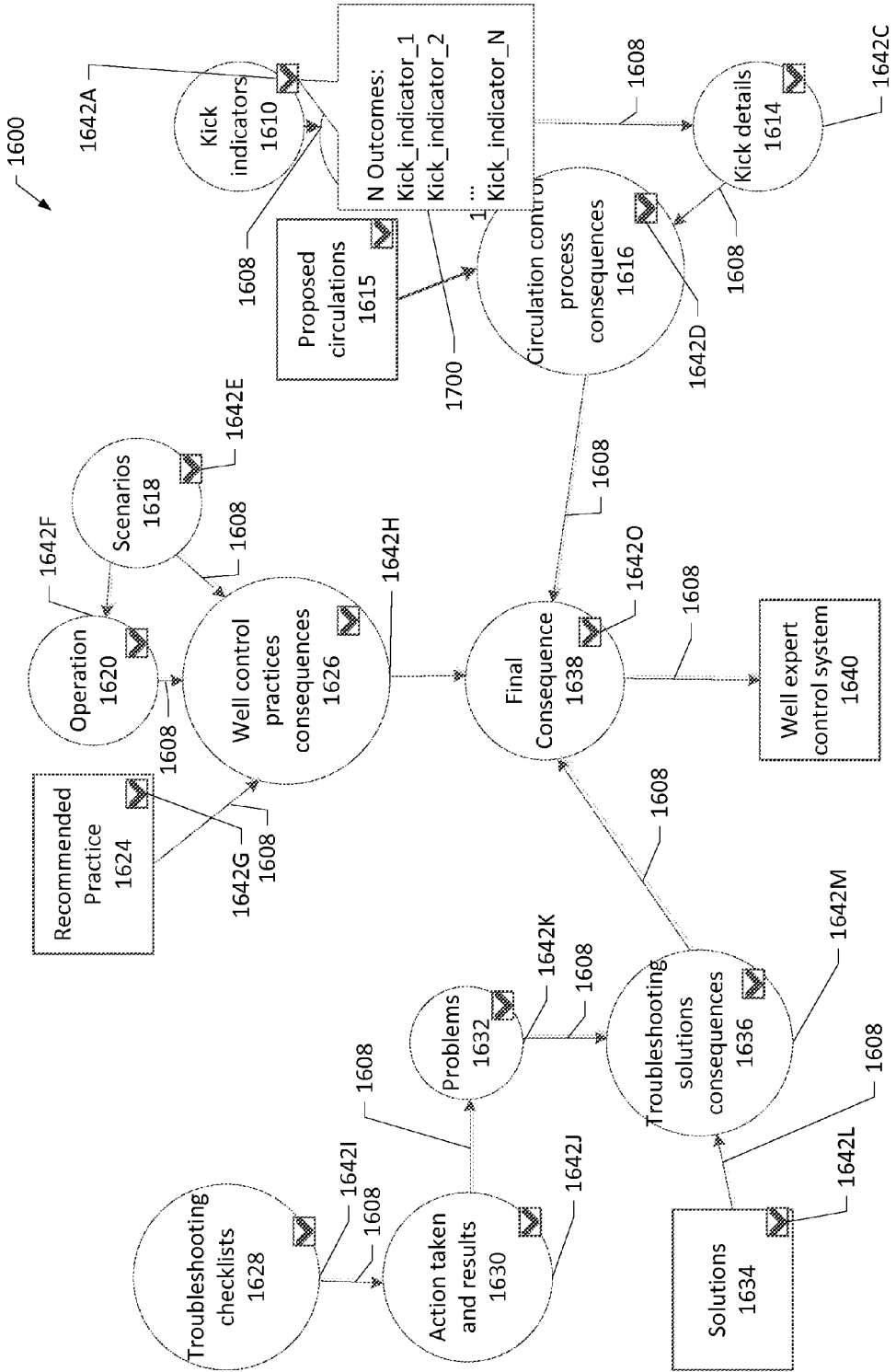
FIGS. 17A-17D are schematic diagrams depicting inputs for a circulation section of the well control BDN model of FIG. 16 in accordance with an embodiment of the present invention.
Figure 17B:
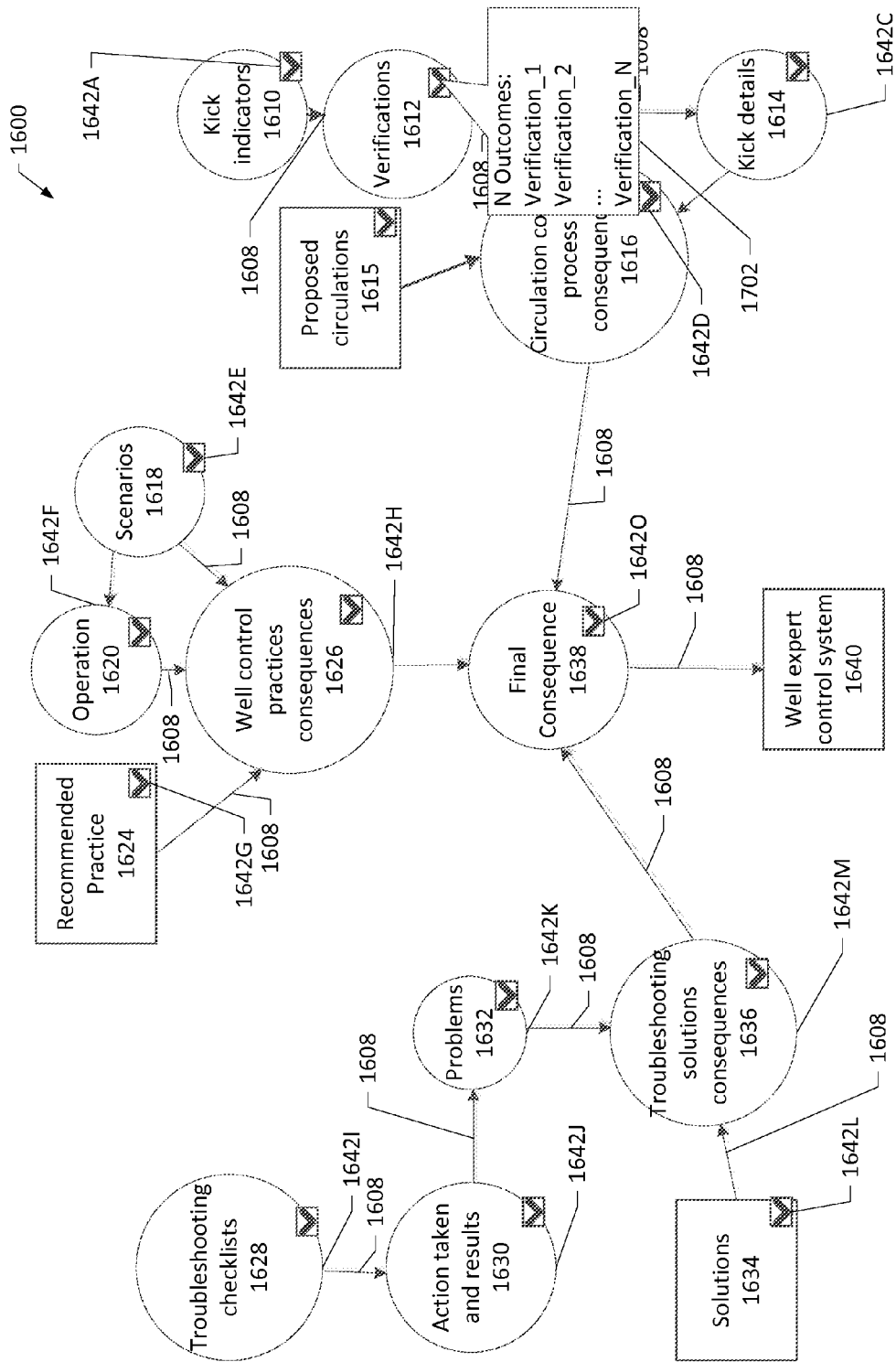

FIG. 17B depicts inputs 1702 for the kick verifications node 1612 in accordance with an embodiment of the present invention. As shown in FIG. 17B, the inputs 1702 may include N kick verifications and may have N number of inputs from "kick_verification_1" through "kick_verification_N." As will be appreciated, in some embodiments the inputs 1702 may include associated probabilities, such as probabilities p_1 through p_N. The inputs 1702 may correspond to possible verifications of kicks based on the kick indicators input into the model 1600. Accordingly, the inputs 1702 (and associated probabilities) are dependent on the kick indicators uncertainty node 1610. For example, in some embodiments the inputs 1702 may include the following: "Flow_when_pump_are_off" and "No_Flow_when_pump_are_off"

Figure 17C:
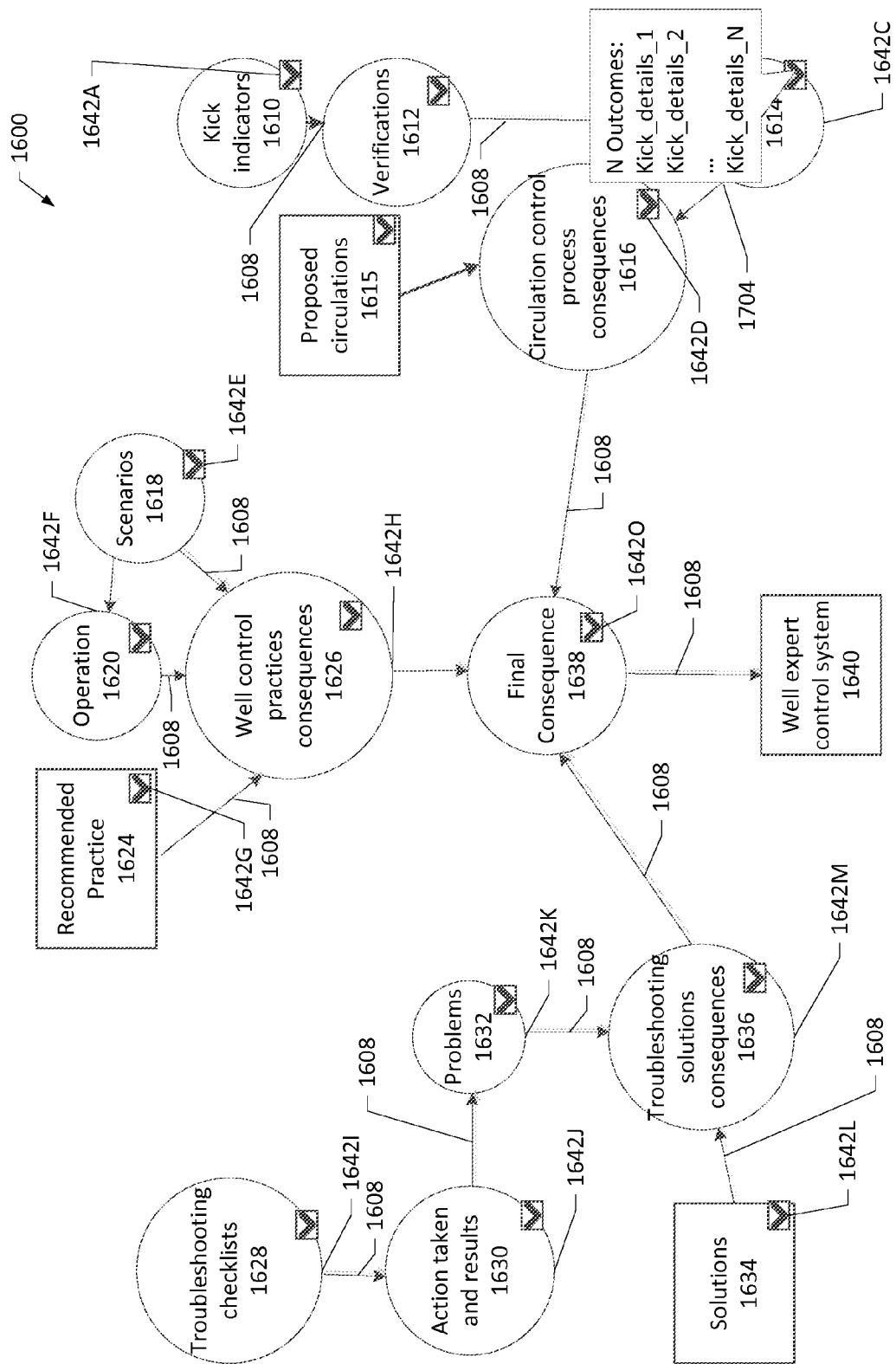

FIG. 17C depicts inputs 1704 for the kick details uncertainty node 1614 in accordance with an embodiment of the present invention. The kick details uncertainty node 1614 may provide for the input of details describing a kick that has been verified by the verification uncertainty node 1612. As shown in FIG. 17C, the inputs 1704 may include kick details and may have N number of inputs from "kick_detail_1" through "kick_detail_N." For example, in some embodiments the inputs 1704 may include: "Ballooning," "Shallow_flows," "Pipe_off_bottom_or_out_of_the_hole," "From_horizontal_or_deviated_well," "Circulation_is_not_possible," "Surface_pressure_too_close_to_wellhead_equipment," "Well_is_already_blowing_out," "Experienced_crew," and "Not_experienced_crew." As will be appreciated, in some embodiments the inputs 1704 may include associated probabilities, such as probabilities p_1 through p_N.

Figure 17D:
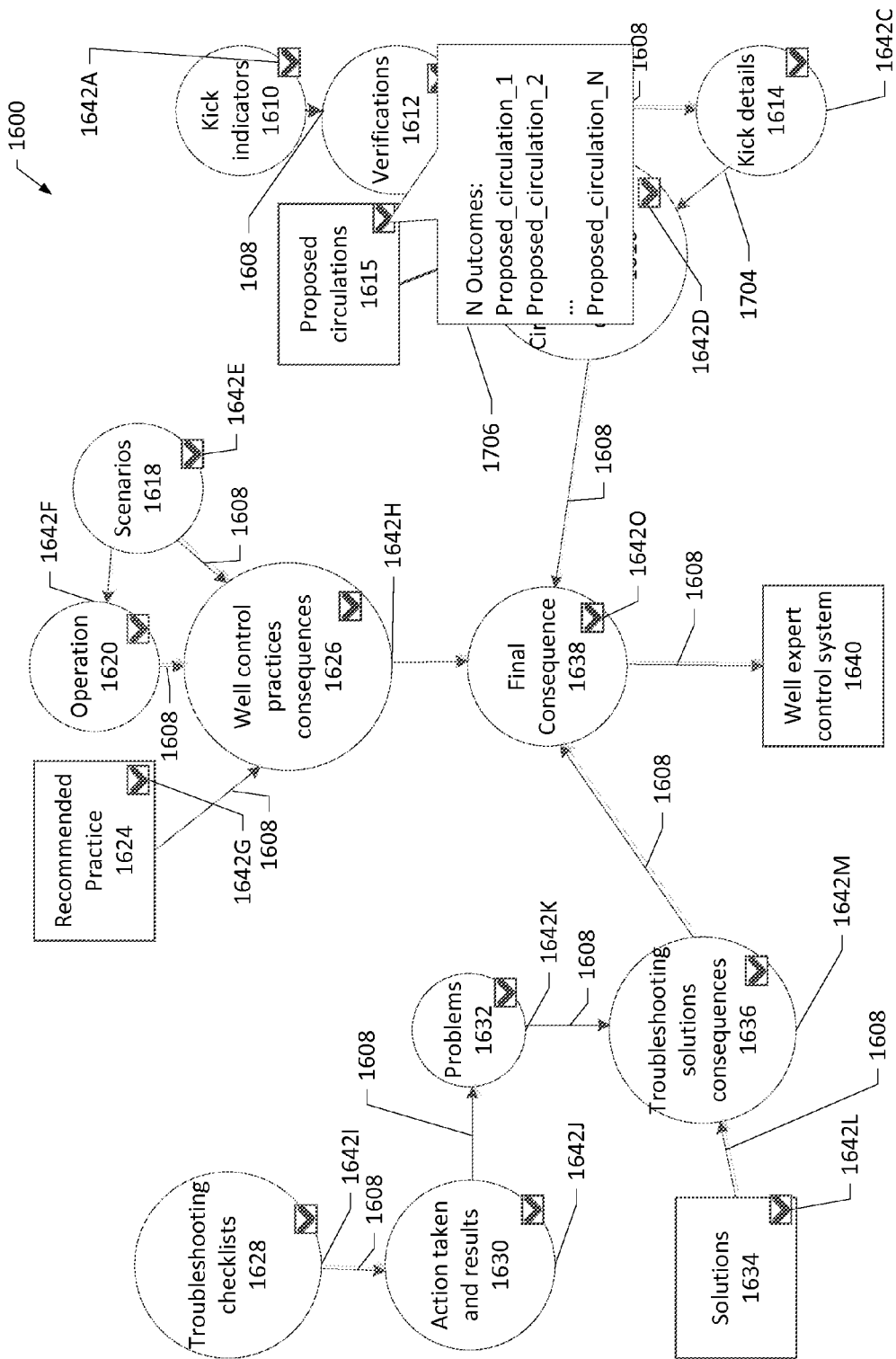

Additionally, inputs may be provided to the well control BDN model 1600 via the circulations decision node 1615. FIG. 17D depicts inputs 1706 for the circulation decision node 1615 in accordance with an embodiment of the present invention. As shown in FIG. 17D, the inputs 1706 may include proposed circulations for well control and may have N number of inputs from "Proposed_circulation_1" to "Proposed_circulation_N." In some embodiments, for example, the inputs 1706 may include "drillers_method," "wait_and_see_method," "circulate_and_wait_method," "bullheading," "dynamic_kill," "volumetric_control," "lubricate_and_bleed_method" and "staging_the_hole_or_top_kill."

After selecting inputs for the nodes of the optimum circulation control section 1602 of the well control BDN model 1600, the selections may be propagated to the circulation control process consequences node 1616. The well control BDN model 1600 may propagate the inputs using the Bayesian probability determinations described above in Equations 1, 2, and 4. By using the probabilities assigned to each of the inputs, the well control BDN model 1600 may then provide recommended circulation control processes or expected utilities based on the inputs from the nodes of the circulation section 1602, such as by assigning a value of 1 to the recommended circulation control process.

In some embodiments, the uncertainty nodes of the well control BDN model 1600 may have inputs with associated probabilities. A user may select an input for one or more uncertainty nodes and view the recommendations based on the propagation of the selected input. For example, a user may select an input for the kick indicators node 1610 and receive a recommended circulation control process at the consequences node 1616 (based on the inputs to the decision node 1615). In another example, a user may also select an input for the kick verifications uncertainty node 1612 and receive a recommended circulation control process at the consequences node 1616 (based on the inputs to the decision node 1615).

Figure 18:
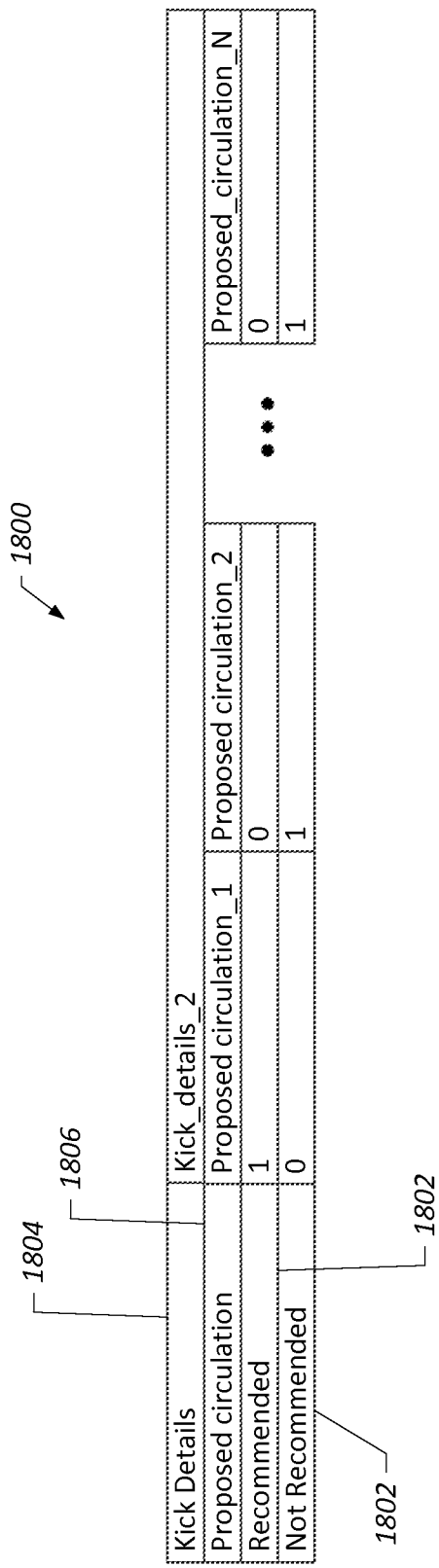
FIG. 18 is a table depicting outputs from the circulation section of the well control BDN model of FIG. 16 in accordance with an embodiment of the present invention.

FIG. 18 depicts an example of the output from the circulation control process consequences node 1616 based on the inputs described above in FIGS. 17A-17D in accordance with an embodiment of the present invention. As shown in FIG. 18, in some embodiments the output may be presented as a table 1800 displaying an expected utility 1802 for a kick detail 1804 and a circulation 1806. The tables 1800 may display a recommended value determined according to the techniques described above and calculated by Equations 1, 2, 4, and 13. For example, the inputs to the circulation decision node 1615 of the well control BDN model 1600 may be used to determine the consequences via the circulation control process consequences node 1616. Based on the results, recommended circulation control processes may be determined and expected utility values may be calculated. As shown in FIG. 18, based on an input to the kick details uncertainty node 1614 ("Kick_details_2"), various proposed circulations may have recommended or not recommended expected utility values of 0 or 1. For example, the circulation of "Proposed_circulation_1" has a recommended expected utility value of 1.

Figure 19A:
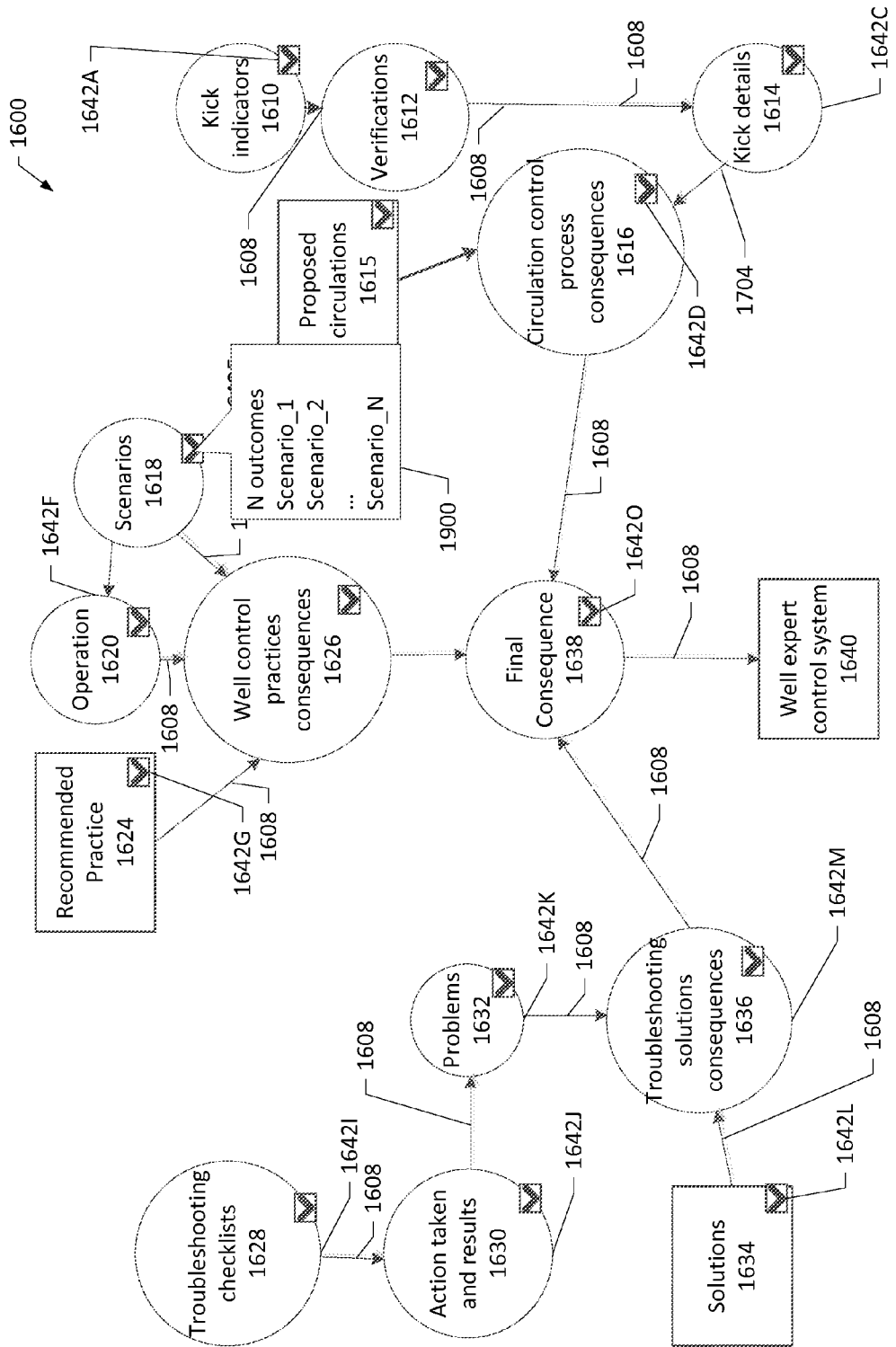
FIGS. 19A-19C are schematic diagrams depicting inputs for a well control practices section of the well control BDN model of FIG. 16 in accordance with an embodiment of the present invention.
Figure 19B:
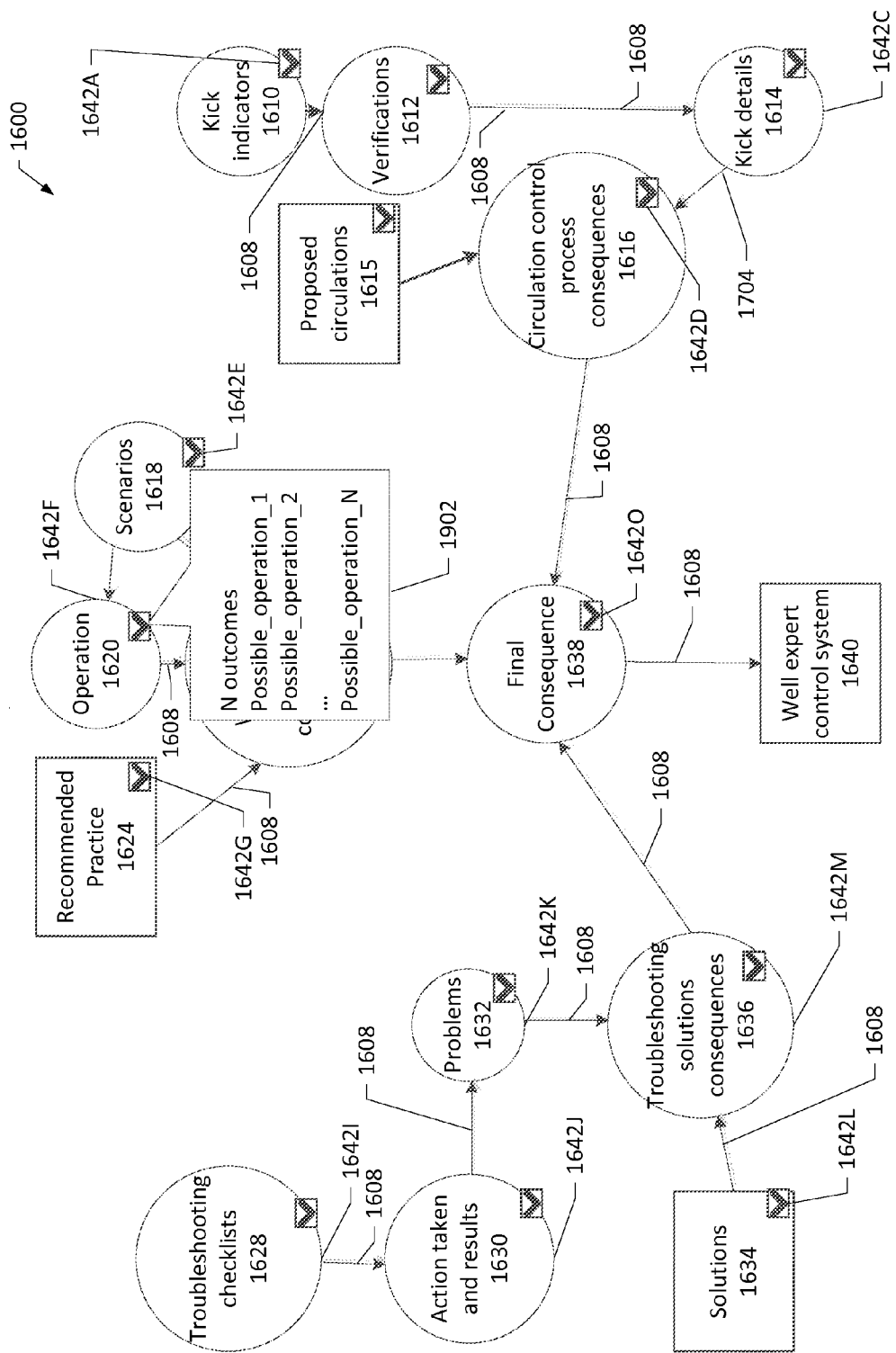
Figure 19C:
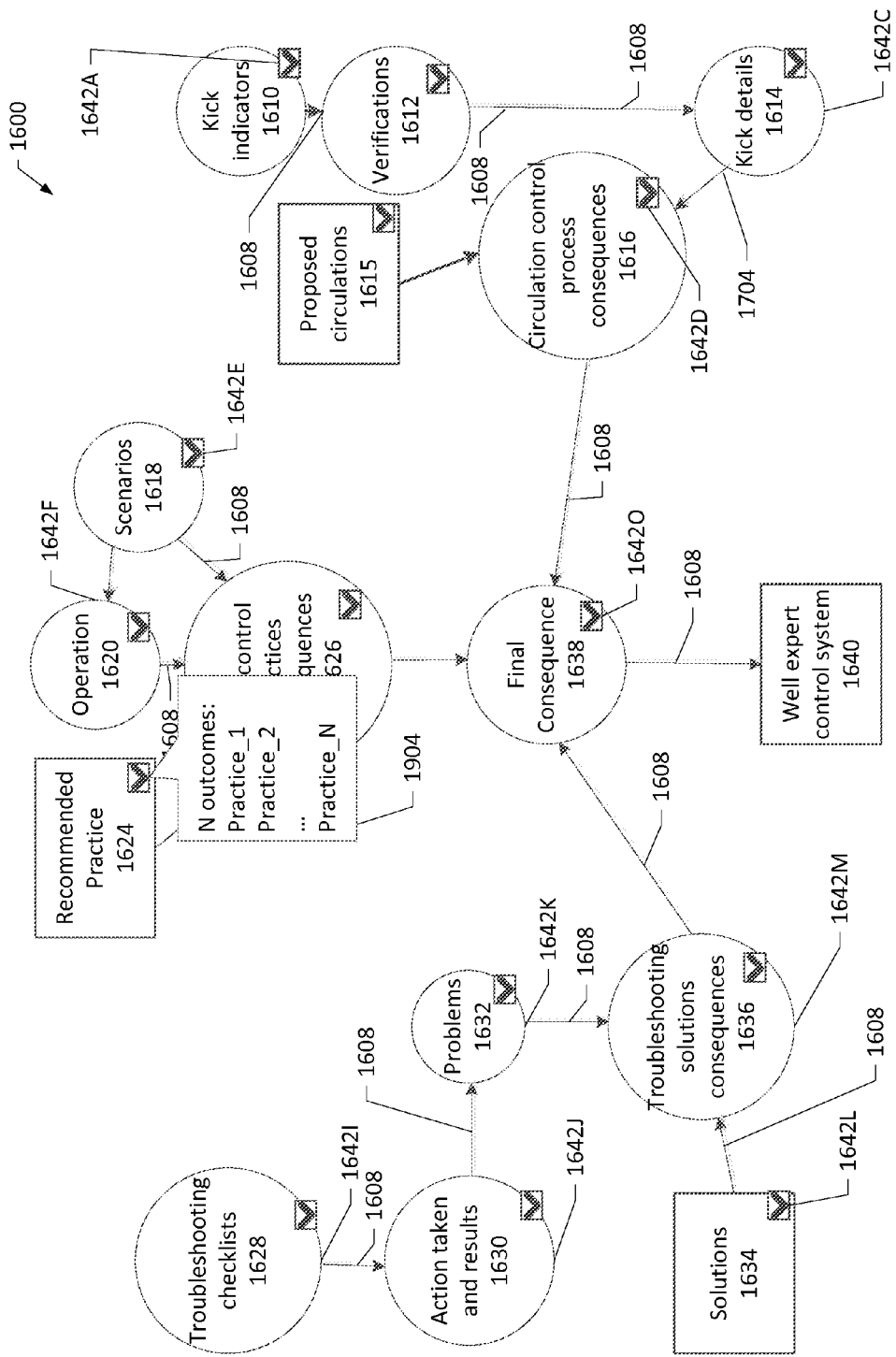

FIGS. 19-19C depict the selectable inputs for each node of the well control practice section 1604 of the well control BDN model 1600 in accordance with an embodiment of the present invention. FIG. 19A depicts inputs 1900 for the well control scenarios uncertainty node 1618 in accordance with an embodiment of the invention. As shown in FIG. 19A, the inputs 1900 may include possible well control scenarios and may have N number of inputs from "scenario_1" through "scenario N." As will be appreciated, in some embodiments the inputs 1900 may include associated probabilities, such as probabilities p_1 through p_N. The inputs 1900 may include to possible well control scenarios that occur in during well control operations in a drilling system. For example, in some embodiments, the inputs 1900 may include the following: "Key_rules_highlight_common_well_control_problems," "Drillers_method," "Pump_troubles_during_kick, "No_pre_recorded_data_is_available," "Concurrent_method," "Killing_deep_well," "Offshore_killing_jackoff_rig," "Kick_in_floating_rig," "Kick_in_deep_water" and "Kick_in_lost_circulation_formulation."

FIG. 19B depicts inputs 1902 for the possible operation uncertainty node 1620 in accordance with an embodiment of the present invention. As shown in FIG. 19B, the inputs 1902 may include possible well control operations and may have N number of input from "selectable_operation_1" through "selectable_operation_N." As will be appreciated, in some embodiments the inputs 1802 may include associated probabilities, such as probabilities p_1 through p_N. The inputs 1902 may correspond to well control operations that may be performed in a drilling system. Accordingly, the inputs 1902 (and associated probability states) are dependent on the possible scenarios uncertainty node 1618.

Additionally, inputs may be provided to the well control BDN model 1600 via the recommended practices decision node 1624. FIG. 19C depicts inputs 1904 for the recommended practice decision node 1624 in accordance with an embodiment of the present invention. As shown in FIG. 19C, the inputs 1904 may include well control practices and may have N number of inputs from "Practice_1" to "Practice N." In some embodiments, for example, the inputs 1904 may include: "Increase_choke_size," "Decrease_choke_size,"

"Increase_pump_rate," "Decrease_pump_rate," "Everything_is_OK_continue," and "Stop_the_pump_and_close the_well."

After selecting inputs for the nodes of the well control practice section 1604 of the well control BDN model 1600, the selections may be propagated to the well control practice consequence node 1626 by using the Bayesian probability determinations described above in Equations 1, 2, and 4. By using the probabilities assigned to each of the inputs, the well control BDN model 1600 may then provide recommended well control practices or expected utilities based on the inputs from the nodes of the well control section 1604, such as by assigning a value of 1 to the recommended well control practices.

In some embodiments, the uncertainty nodes of the well control BDN model 1600 may have inputs with associated probabilities. A user may select an input for one or more uncertainty nodes and view the recommendations based on the propagation of the selected input. For example, a user may select an input for the well control scenarios uncertainty node 1618 and receive a recommended well control practice at the consequences node 1626 (based on the inputs to the decision node 1624). In another example, a user may also select an input for the well control operations uncertainty node 1620 and recommended well control practice at the consequences node 1626 (based on the inputs to the decision node 1624).

Figure 20:
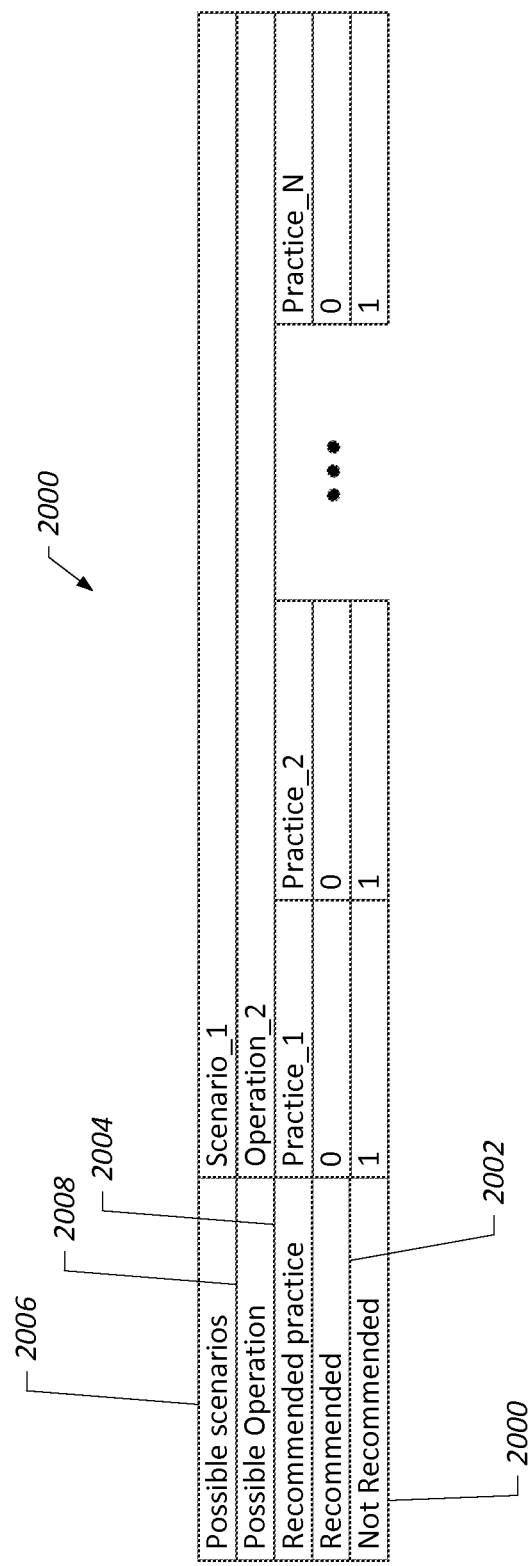
FIG. 20 is a table depicting outputs from the well control practices section of the well control BDN model of FIG. 16 in accordance with an embodiment of the present invention.

FIG. 20 depicts an example of the output from the well control practice consequence node 1626 based on the inputs described above in FIGS. 19A-19C and in accordance with an embodiment of the present invention. As shown in FIG. 20, in some embodiments the output may be presented as a table 2000 displaying an expected utility 2002 for input recommended practices 2004 based on selected possible scenarios 2006 and selected possible operations 2008. The tables 2000 may display a recommendation value determined according to the techniques described above and calculated by Equations 1, 2, 4, and 13. For example, the selected inputs to the well control section 1604 of the well control BDN model 1600 may be used to determine the consequences via the well control practice consequence node 1626. Based on the results, recommended proposed circulations may be determined and expected utility values may be calculated. As shown in FIG. 20, based on the inputs to the well control scenarios uncertainty node 1618 and the well control operation uncertainty node 1620, various recommended practices have values of 0 or 1 for the recommended or not recommended expected utilities. For example, the recommended practice of "recommended_practice_2" has a recommended expected utility value of 1 and a not recommended expected utility value of 0, while the other recommended practices depicted in table 2000 may have a recommended expected utility value of 0 and a not recommended expected utility value of 1. In some embodiments, multiple recommended practices may have a recommended utility value of 1 depending on the expected utility calculations performed by the well control BDN model 1600.

Figure 21A:
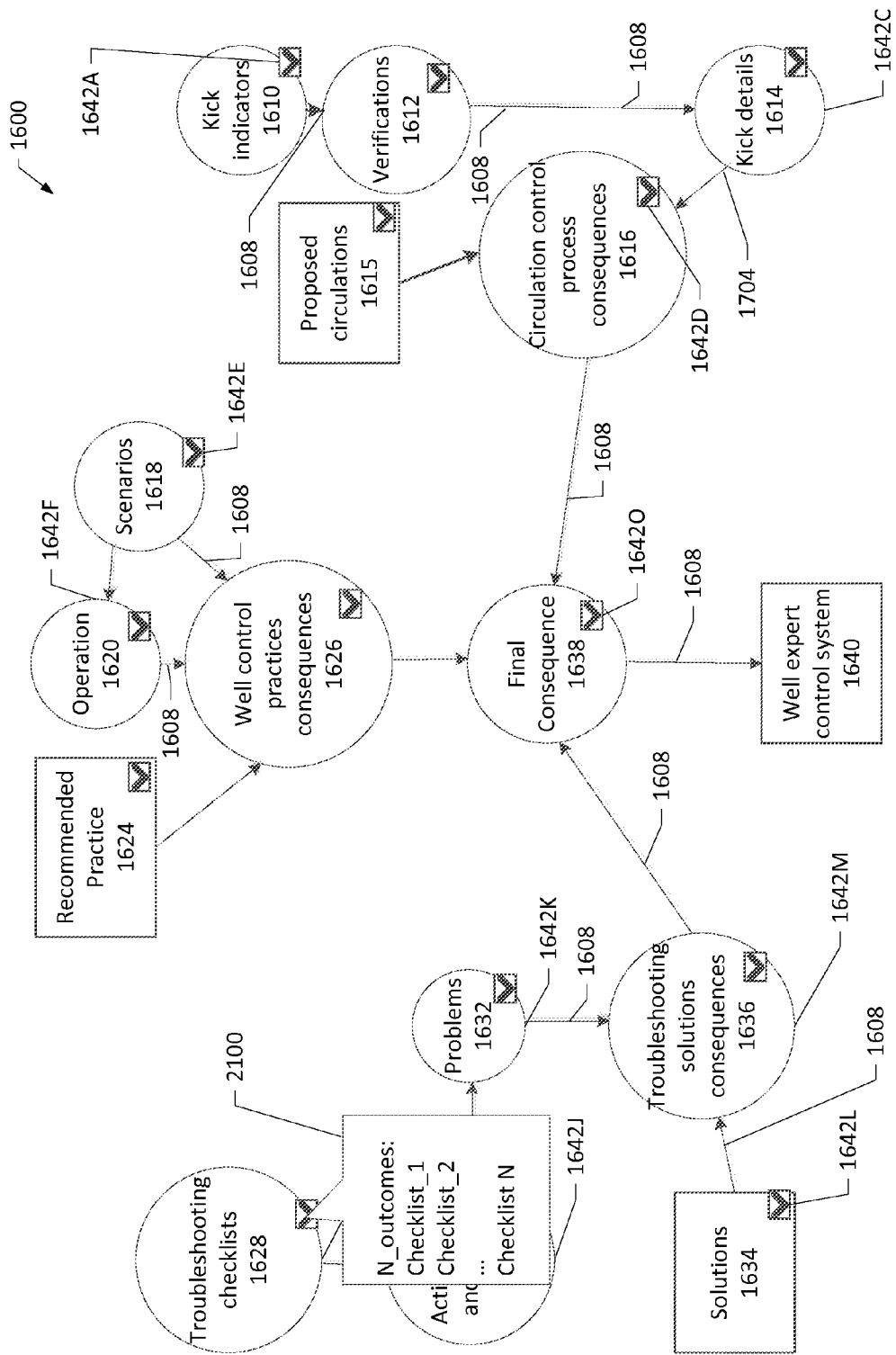
FIGS. 21A-21D are schematic diagrams depicting inputs for a troubleshooting section of the well control BDN model of FIG. 16 in accordance with an embodiment of the present invention.

FIGS. 21A-21D depict the inputs for each node of the troubleshooting section 1606 of the well control BDN model 1600 in accordance with an embodiment of the present invention. FIG. 21A depicts inputs 2100 for the troubleshooting checklists uncertainty node 1628 in accordance with an embodiment of the invention. The inputs 2100 may include troubleshooting checklists and may have N number of inputs from "checklist_1" to "checklist_N." As will be appreciated, in some embodiments the inputs 2100 may include associated probabilities, such as probabilities p_1 through p_N. The troubleshooting checklists include checklists for troubleshooting problems that may occur during well control operations. For example, in some embodiments the inputs 2100 may include: "Drill_pipe_pressure_is_up_and_casing_pressure_up_about_the_same_amount_as_drill_pipe_pressure," "Drill_pipe_pressue_is_up_and_casing_pressure_up_but_not_very_much," "Drill_pipe_pressue_is_up_abrupt_change_and_casing_pressure_is_not_changed," "Drill_pipe_pressure_is_not_changed_and_casing_pressure_is_down_or_no_change," "Drill_pipe_pressure_is_down_and_casing_pressure_down," "Drill_pipe_pressure_is_down_and_casing_pressure_is_not_changed," and "Drill_pipe_pressure_is_down_with_abrupt_change_and_casing_pressure_is_not_changed."

Figure 21B:
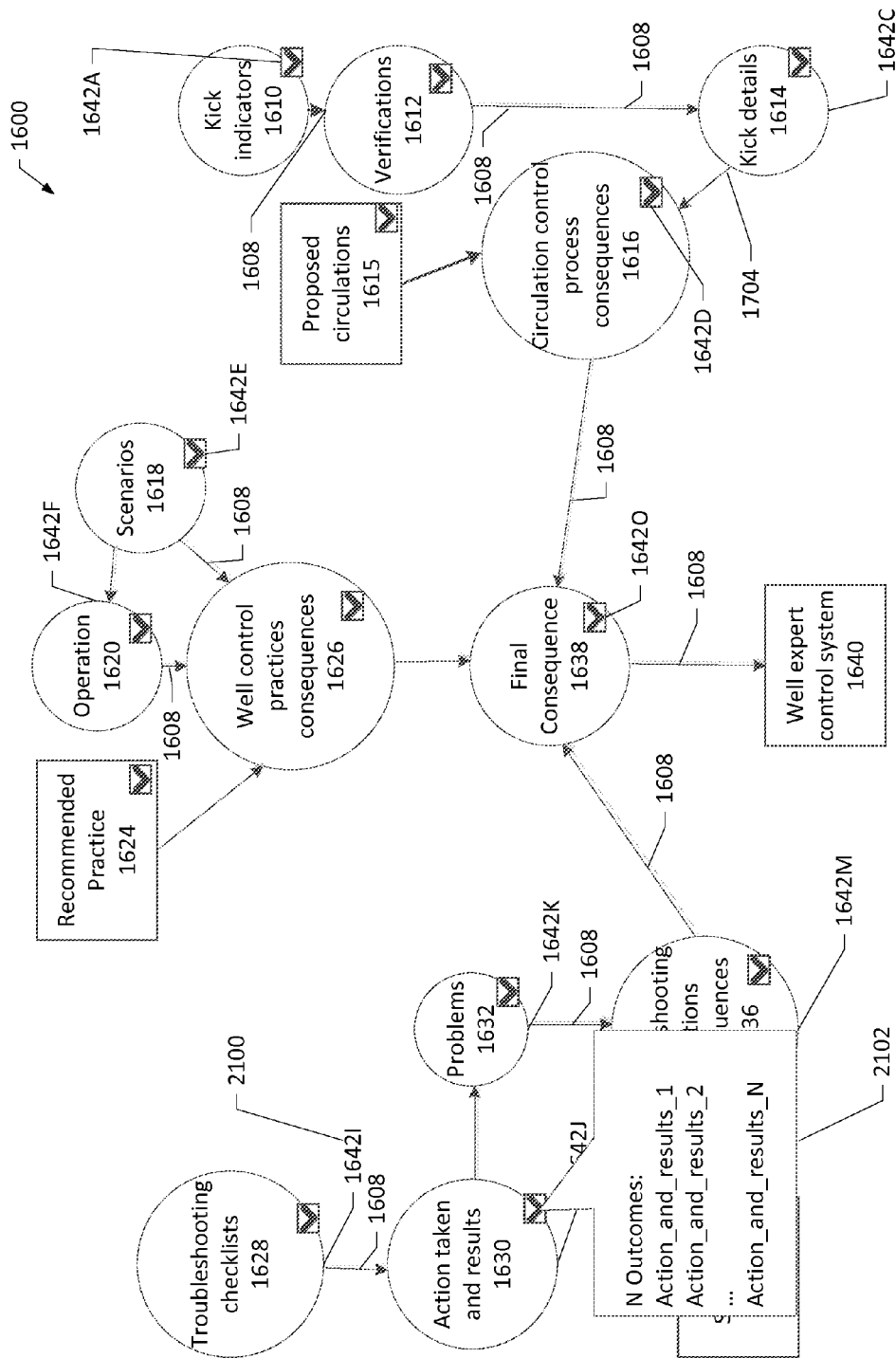

FIG. 21B depicts inputs 2102 for the actions and results uncertainty node 1630 in accordance with an embodiment of the present invention. As shown in FIG. 21B, inputs 2102 may include actions taken and the corresponding results and may have N number of inputs from "actions_and_results_1" through "actions_and_results_N." As shown in well control BDN model 1600, the inputs 1902 (and associated probability states) are dependent on the troubleshooting checklist uncertainty node 1628. As will be appreciated, in some embodiments the inputs 1802 may include associated probabilities, such as probabilities p_1 through p_N. The inputs 1902 may include actions taken during a well control operation and the corresponding results occurring in a drilling system. In some embodiments, the selectable actions and results 2012 may include "Check_pump_rate_and_if_it_is_too_fast", "Increase_choke_size_and_if_drill-pipe_pressure_and_casing_pressure_came_down", "Open_choke_all_the_way_and_if_drill-pipe_pressure_and_casing_pressure_came_down", "Stop_the_pump_and_if_drillpipe_pressure_and_casing_pressure_came_down", "Shut_the_well_in_and_if_pressure_stay_up", "Check_pump_rate_and_if_the_pump_rate_too_fast", "Increase_choke_size_and_if_the_drill-pipe_and_casing_pressure_came_down", "Increase_choke_size_and_if_the_casing_pressure_comes_down_but_not_drillpipe_pressure", "Increase_choke_size_and_if_the_drillpipe_pressure_does_not_come_down", "Check_pump_rate_and_if_pump_rate_too_fast", "Increase_choke_size_and_if_casing_pressure_gets_very_low_before_drill-pipe_pressure_comes_down", "Open_choke_and_drill-pipe_pressure_does_not_come_down", "Increase_or_decrease_in_choke_size_and_if_pressure_do_not_seem_to_respond_to_choke_movement", "Check_pit_volume_and_if_volume_is_Ok", "Check_pump_rate_and_if_pump_rate_is_too_slow", "Decrease_choke_size_and_if_drill-pipe_and_casing_pressure_came_up", "Decrease_choke_size_and_if_no_change_in_drillpipe_and_casing_pressure", and "Check_pump_rate_and_pump_rate_is_too_slow".

Figure 21C:
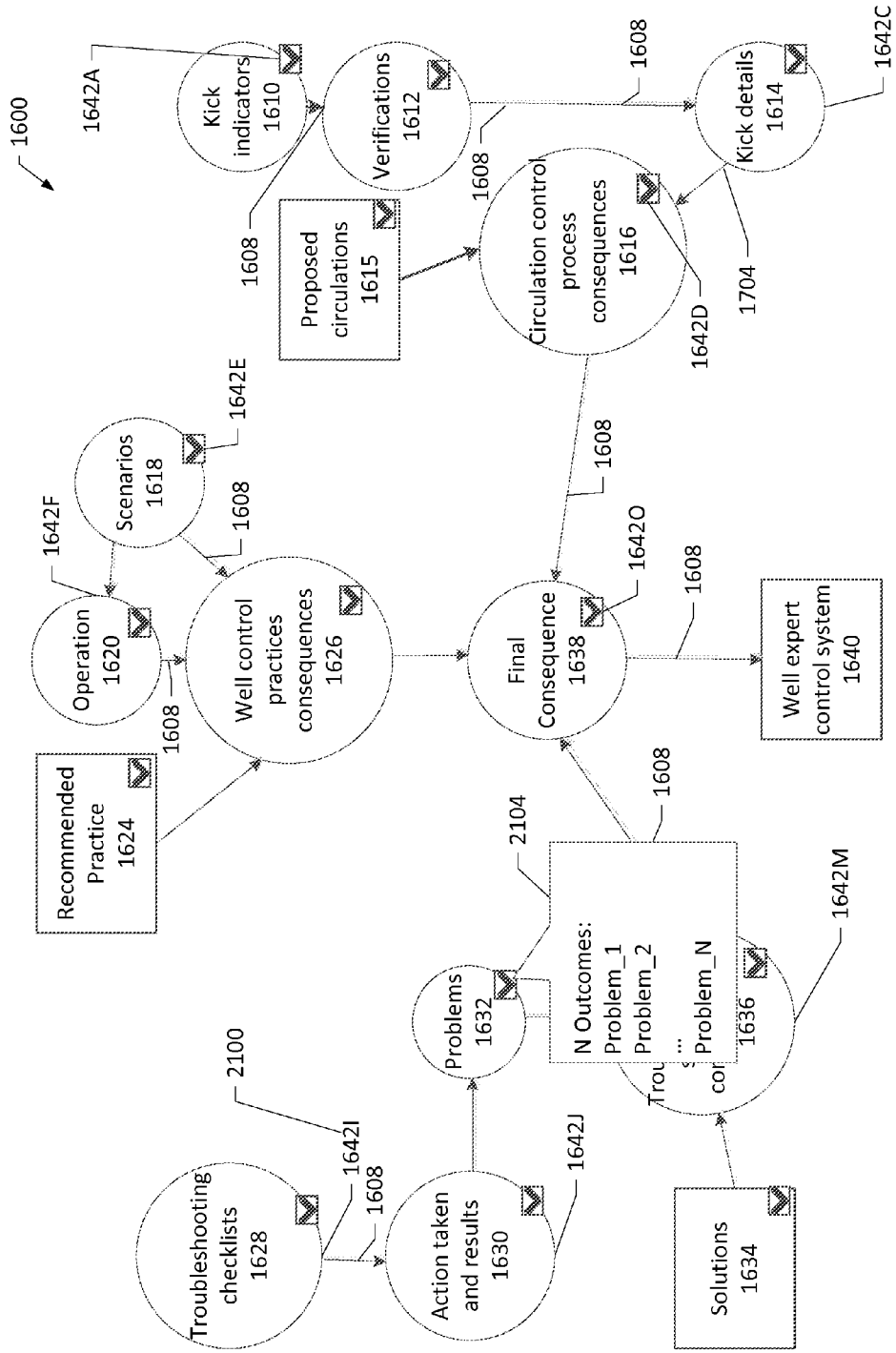

Next, FIG. 21C depicts inputs 2104 for the problems uncertainty node 1632 in accordance with an embodiment of the present invention. The inputs 1704 to this node may include problems encountered in a well control operation and may have N number of inputs from "problem_1" through "problem_N." As will be appreciated, in some embodiments the inputs 2104 may include associated probabilities, such as probabilities p_1 through p_N. The inputs 2104 may include problems identified based on the action and results input to the actions and results uncertainty node 1630. Accordingly, as shown in the well control BDN model 1600, the problems uncertainty node 1632 is dependent on the action and results uncertainty node 1630. In some embodiments the inputs 2104 may include: "Circulation_pressure_is_too_high_because_the_pump_is_running_faster_than_was_planned," "Choke_size_was_too_small," "Either_choke_size_was_too_small_or_the_choke_was_trying_to_plug," "The_choke_manifold_has_started_to_plug," "Manifold_is_plugged," "Manifold_is_plugged_at_or_above_the_T," "Plugged_jet," "On_a_marine_rig_with_subsea_wellhead_and_riser_a_possible_plugged_wellhead_or_riser_line."

Figure 21D:
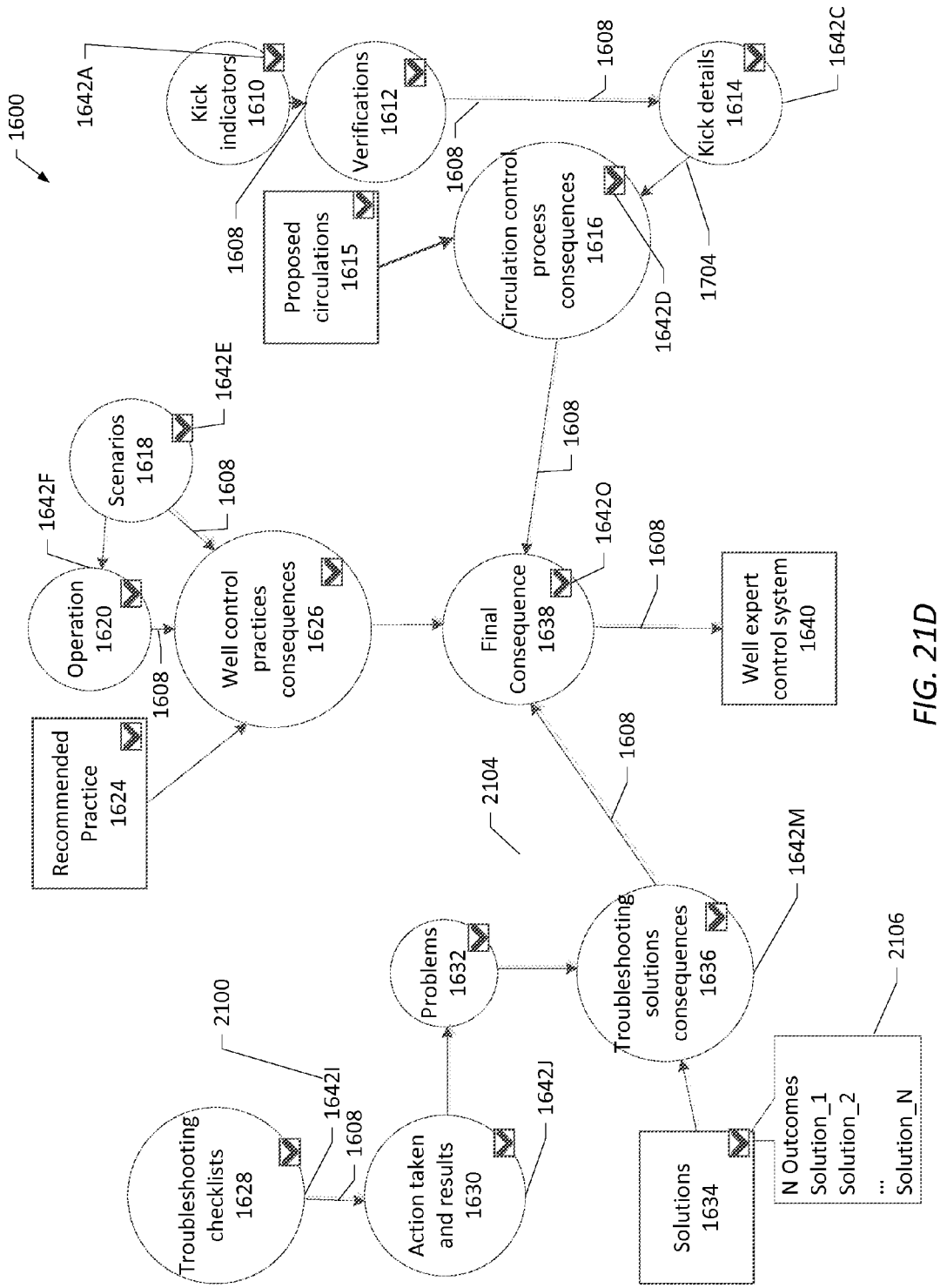

Additionally, inputs may be provided to the well control BDN model 1600 via the solution decision node 1634. FIG. 21D depicts inputs 2106 for the solutions decision node 1634 in accordance with an embodiment of the present invention. As shown in FIG. 21D, the inputs 2106 may include solutions to well control problems and may have N number of inputs from "solution_1" through "solution_N." For example, in some embodiments, the inputs 2106 may include: "Slow_the_pump_rate_down_to_the_planned_rate_if_pressure_down_every_is_OK", "If_the_pressure_come_down_when_the_choke_size_was_increased_everything_is_ok", "If_pressure_come_down_every_thing_is_OK", "Switch_to_the_alternative_choke_line_and_clear_the_manifold", "Switch_to_alternative_choke_line_if_pressure_from_the_manifold_and_clean_it_out", "Close_the_master_valve_on_the_kill_line_release_the_pressure_from_the_manifold_and_clean_it_out", and "Allow_for_long_time_lag_with_big_gas_kicks".

Again, after selecting inputs for the nodes of the troubleshooting section 1606 of the well control BDN model 1600, the selections may be propagated to the troubleshooting solutions consequences node 1626 by performing the Bayesian probability determinations described above in Equation 1, 2, and 4. By using the probabilities assigned to each of the inputs, the well control BDN model 1600 may then provide recommended troubleshooting solutions based on the inputs from the nodes of the well control section 1604, such as by assigning a value of 1 to the recommended consequences output from the node 1636.

As noted above, in some embodiments, the uncertainty nodes of the well control BDN model 1600 may have inputs with associated probabilities. A user may select an input for one or more uncertainty nodes and view the recommendations based on the propagation of the selected input. For example, a user may select an input for the troubleshooting checklists uncertainty node 1628 and receive a recommended troubleshooting solution at the consequences node 1636 (based on the inputs to the decision node 1634). In another example, a user may also select an input for the problems uncertainty node 1632 and receive a recommended troubleshooting solution at the consequences node 1636 (based on the inputs to the decision node 1634).

Figure 22:
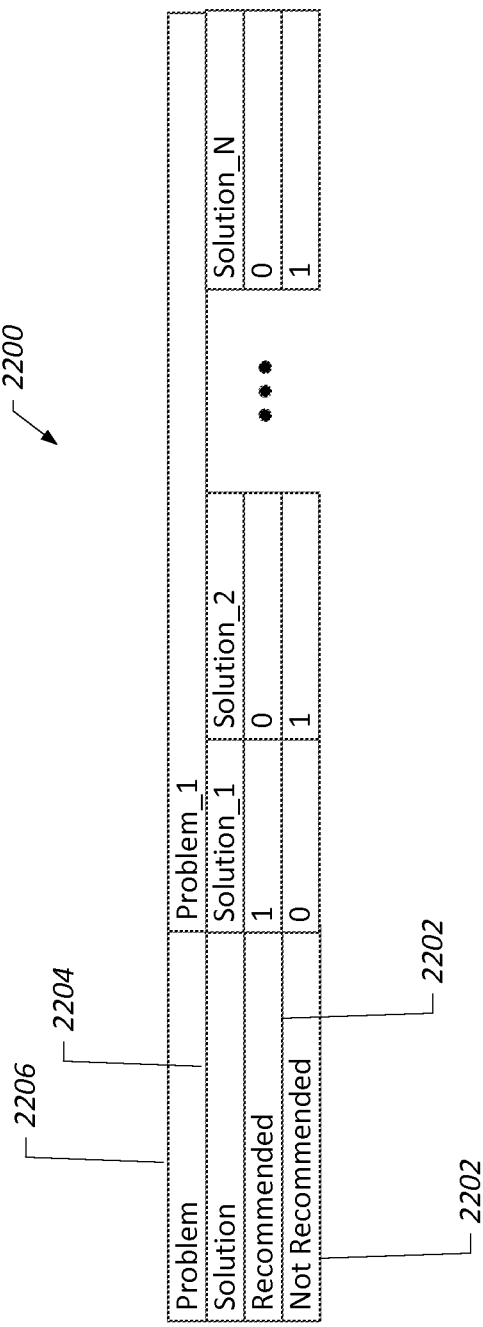
FIG. 22 is a table depicting outputs from the troubleshooting section of the well control BDN model of FIG. 16 in accordance with an embodiment of the present invention.

FIG. 22 depicts an example of the output from the troubleshooting guide consequences node 1626 based on the inputs described above in FIGS. 21A-21D and in accordance with an embodiment of the present invention. Here again, as shown in FIG. 22, in some embodiments the output may be presented as a table 2200 displaying an expected utility 2202 for solutions 2204 based on input problems 2206. The table 2200 may display a recommended value determined according to the techniques described above and calculated by Equations 1, 2, 4, and 13. For example, the selected inputs to the troubleshooting section 1606 of the well control BDN model 1600 may be used to determine the consequences via the troubleshooting guide consequences node 1626. Based on the results, recommended proposed circulations may be determined and expected utility values may be calculated. As shown in FIG. 22, recommended solutions have values of 0 or 1 for the recommended or not recommended expected utilities. For example, the recommended solution of "solution_1" has a recommended expected utility value of 1 and a not recommended expected utility value of 0, while the other solutions depicted in table 2200 have a recommended expected utility value of 0 and a not recommended expected utility value of 1. In some embodiments, multiple solutions may have a recommended utility value of 1 depending on the expected utility calculations performed by the well control BDN model 1600.

Figure 23:
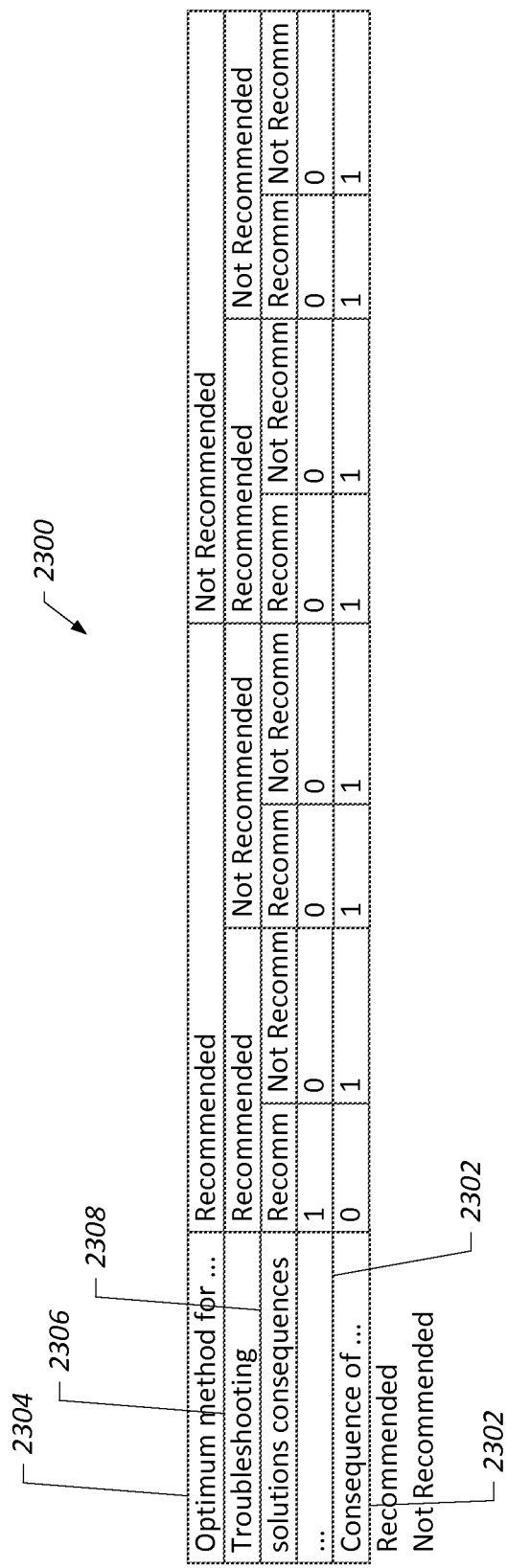
FIG. 23 is a table depicting outputs from a final consequences node of the well control BDN model of FIG. 16 in accordance with an embodiment of the present invention.

In using the a well control expert system using the well control BDN model 1600, one or more sections 1602, 1604, and 1606 may be used; thus a user may use one or more sections of the well control BDN model 1600 but not use the remaining sections of the well control BDN model 1600. Additionally, the well control BDN model 1600 may provide recommendations or expected utilities at the final consequence node 1638 based on the propagated outputs from the consequence nodes 1616, 1626, and 1636. For example, a user may select (e.g., click) the final consequence node 1638 to receive the recommendations from the well control BDN model 1600. FIG. 23 depicts an example of the output from the final consequence node 1638 based on the inputs described above in FIGS. 17-22 in accordance with an embodiment of the present invention. Here again, the output from the consequence node 1638 may be displayed as a table 2300 that includes an expected utility 2302 for input circulation control 2304 (as propagated from the circulation control consequence node 1616), well control practice 2306 (as propagated from the well control practice node 1626), and troubleshooting guide 2308 (as propagated from the troubleshooting guide 1626). The table 2300 may include a recommended and not recommended utility 2302 for the various combinations of inputs and associated expected utilities, as determined by the techniques described above in Equations 1, 2, and 4. For example, as shown in FIG. 23, for the recommended expected utility for circulation_control_1, the recommended expected utility for troubleshooting_guide_2, and the recommended expected utility for well_control_practice_1, the recommended utility value is 1 and the not recommended value is 0. In another example, for the not expected utility for circulation_control_1, the recommended expected utility for troubleshooting_guide_2, and the not recommended expected utility for well control_practice_1, the final consequence recommended utility value is 0 and the not recommended value is 1. Based on these expected utility values, a user may decide to implement various combinations of a circulation control, a well control practice, and a troubleshooting guide. In the example described above and illustrated in table 2300, the combination of circulation_control_1, troubleshooting_guide_2, and well control_practice_1 have a recommended utility value of 1 and may therefore be an optimal combination for the inputs and probability states input into the well control BDN model 1600.

Figure 24A:
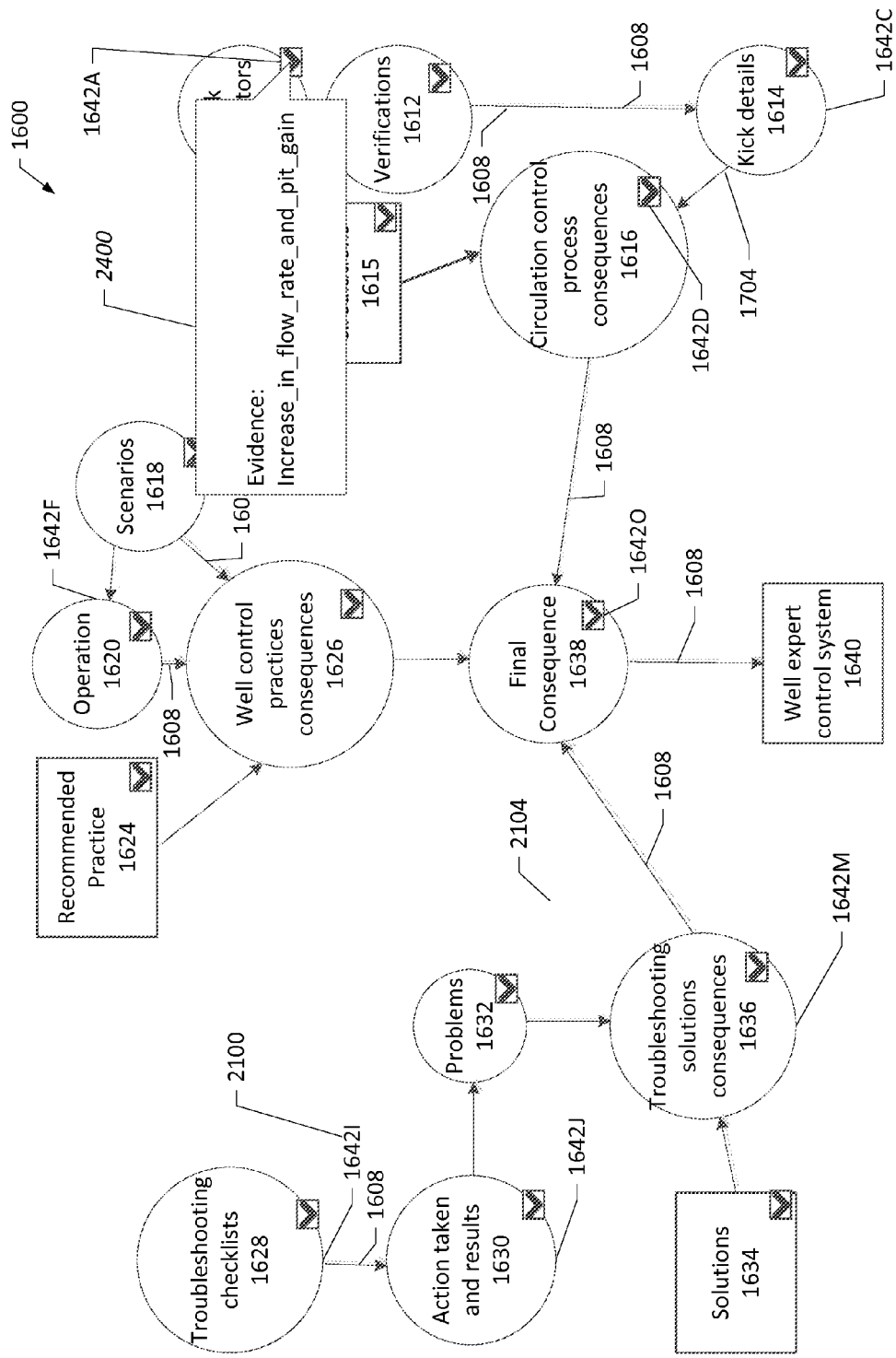
FIGS. 24A-24C are schematic diagrams depicting user selected inputs for a circulation section of the well control BDN model of FIG. 16 in accordance with an embodiment of the present invention.

As described above, a user may interact with the well control BDN model 1600 as part of a well control expert system to enter inputs at uncertainty nodes and receive outputs from consequence nodes, such as recommendations of a circulation control process, a well control practice, and so on. Each uncertainty node may include inputs having an associated probability distribution of probabilities. Additional, a user may select a particular input for an uncertainty node such that a probability state of 1 is assigned to the selected input. Accordingly, the selected input may be the only input to the selected uncertainty node. FIGS. 24-29 depict examples of user selected inputs and corresponding outputs of the well control BDN model 1600 in accordance with an embodiment of the present invention. For example, FIGS. 24A-24C and 25 depict user selected inputs to the circulation section 1602. FIG. 24A depicts an input 2400 for the kick indicator uncertainty node 1610 in accordance with an embodiment of the present invention. The user may select (e.g., click) the button 1642A to display kick indicators for the kick indicator uncertainty node 1610. A user may then select (e.g., click) one of the kick indicators. For example, as shown in FIG. 24A, a user may select the kick indicators "Increase_in_the_flow_rate_and_pit_gain" as the input 2400. The input 2400 may be displayed to indicate the selected input for the uncertainty node 1610.

Figure 24B:
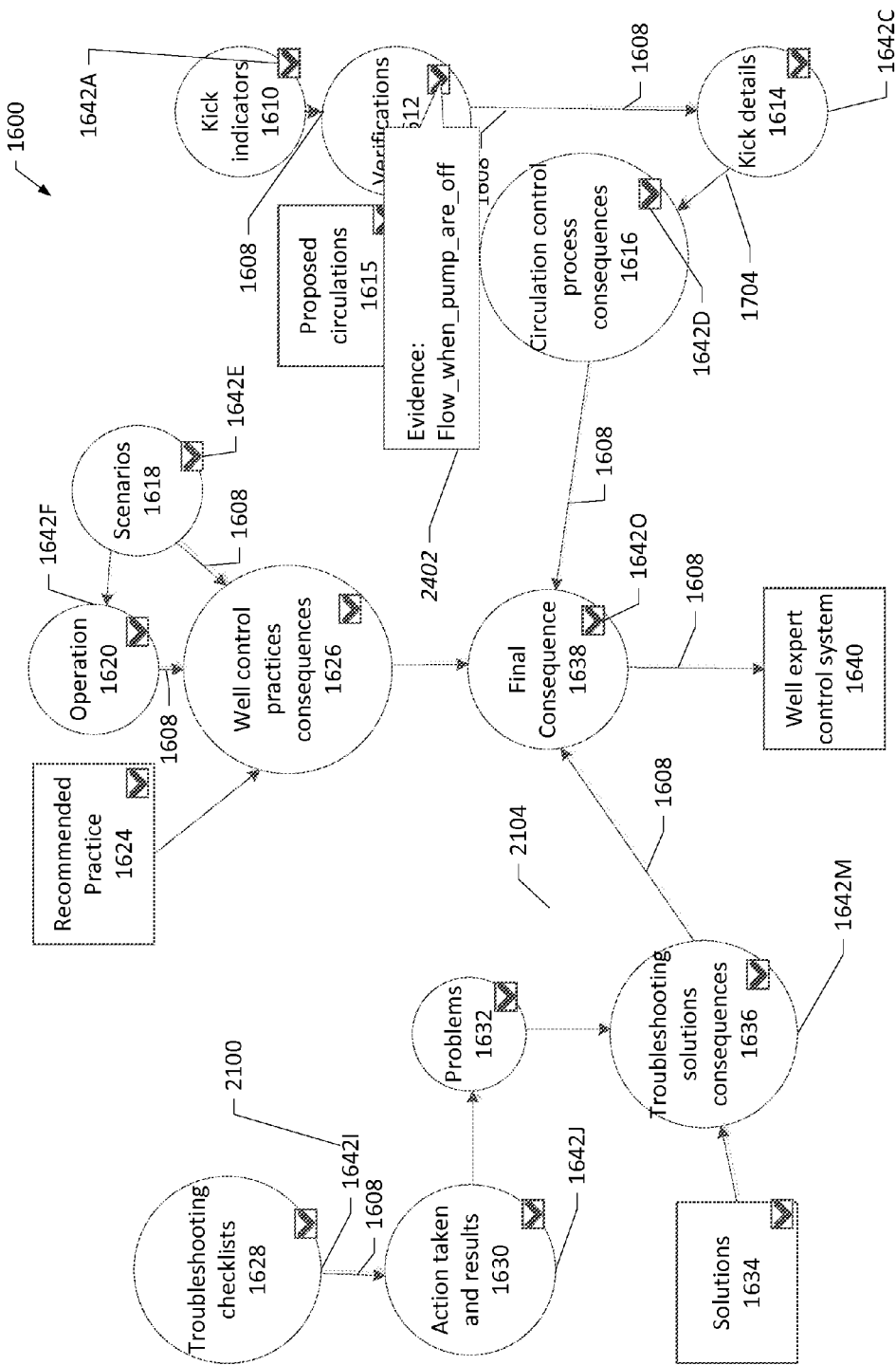
Figure 24C:
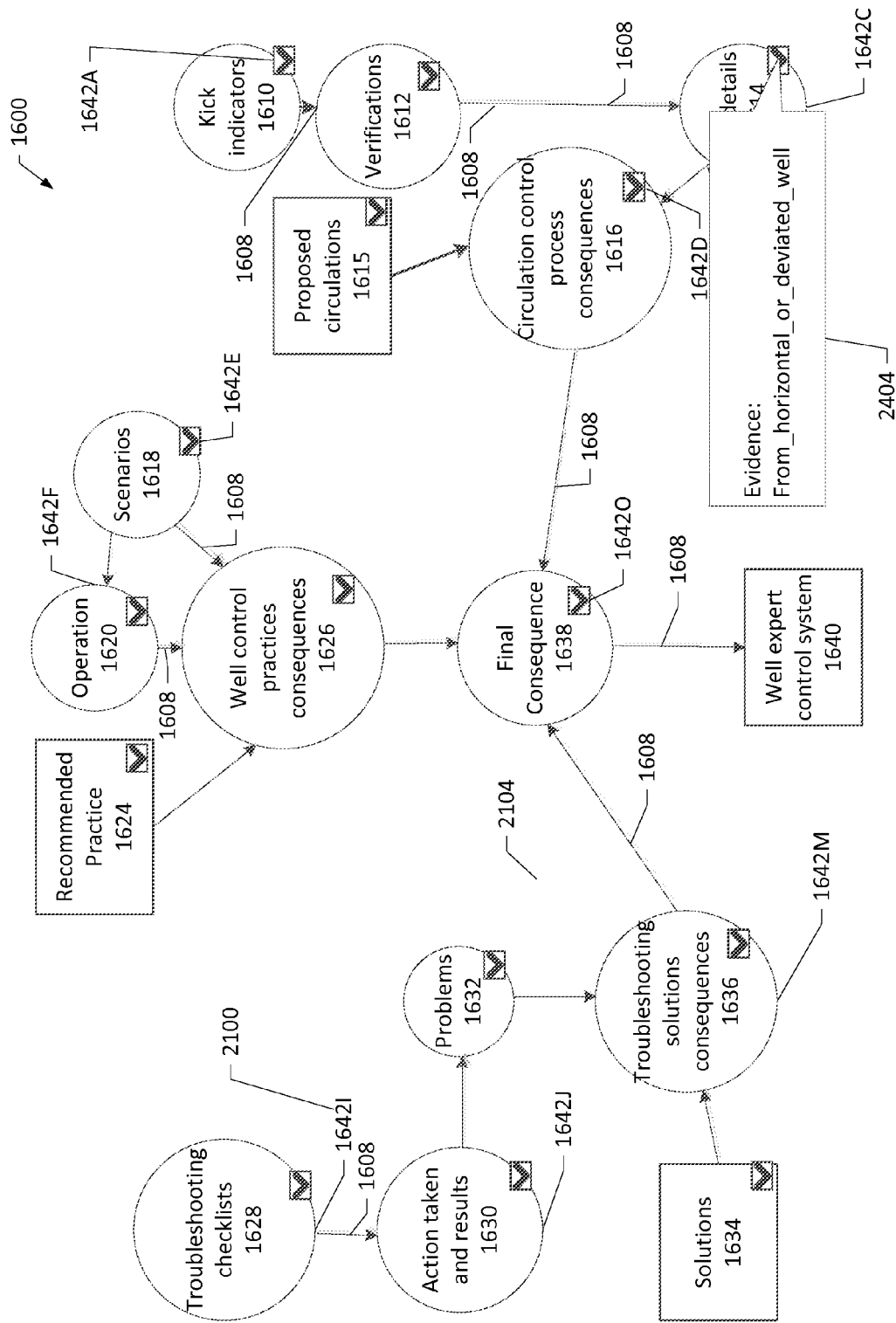

A user may also select inputs for the other uncertainty nodes of the circulation section 1602 of the well control BDN model 1600. For example, FIG. 24B depicts an input 2402 for the kick verifications uncertainty node 1612 in accordance with an embodiment of the present invention. A user may select (e.g., click) the button 1642B to display kick verifications for the verification uncertainty node 1612, and may select (e.g., click) one of the displayed verifications. The selected input 2402 ("Flow_when_pumps_are_shut_off") may be displayed in response to the user selection. Similarly, FIG. 24C depicts an input 2404 for the kick details uncertainty node 1614 in accordance with an embodiment of the present invention. A user may select the button 1642C to display kick details for the kick details uncertainty node 1614 and may select (e.g., click) one of the displayed kick details. For example, as shown in FIG. 24C, the selected input 2406 ("From_horizontal_or_deviated_well) may be displayed.

Figure 25:
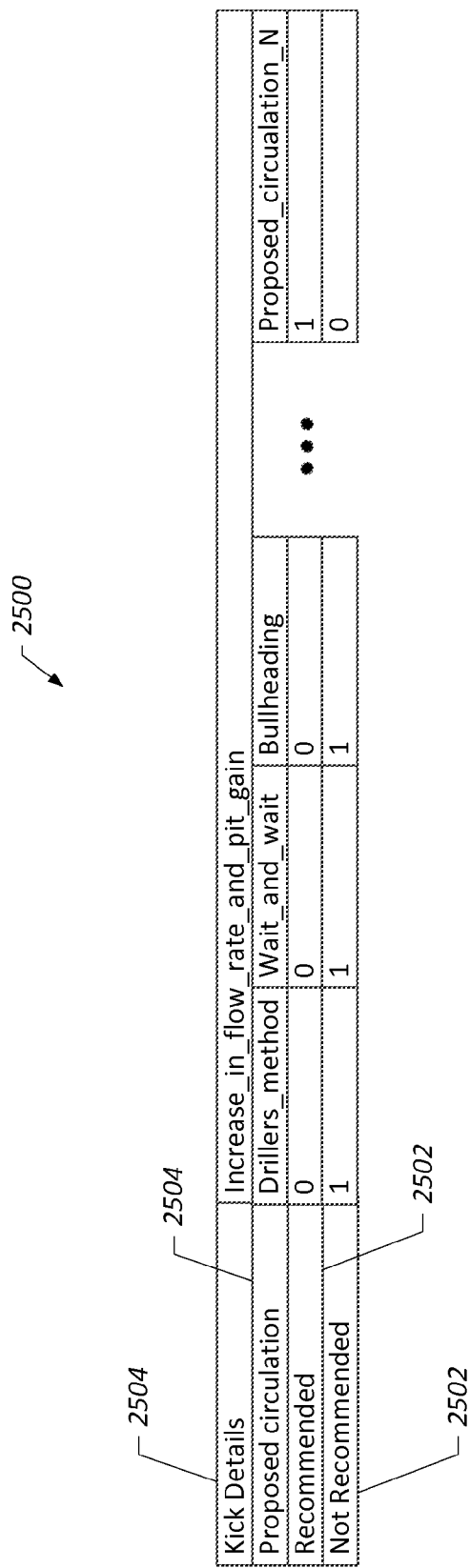
FIG. 25 is a table depicting outputs from the circulation section of the well control BDN model of FIG. 16 in accordance with an embodiment of the present invention.

Based on the inputs described above in FIGS. 24A-24C, a user may select the circulation control process consequence node 1616 to receive the output from the well control BDN model 1600. FIG. 25 depicts the output from the circulation section 1602 of the well control BDN model 1600 based on the selected inputs described above in FIGS. 24A-24C and in accordance with an embodiment of the present invention. As shown in FIG. 25, in some embodiments the output from the well control BDN model 1600 may be presented as a tables 2500 displaying expected utilities 2502 for circulations 2504 (as input to the proposed circulation decision node 1615) and the selected kick detail 2506 (as input to the selected kick detail uncertainty node 1614). For example, as shown in FIG. 25, the proposed circulations may include: "Drillers_method", "Wait_and_wait" and "Bullhead" and may include N number of circulations up to "Proposed_circulation_N". The proposed circulation techniques 2504 may each be associated with a recommended expected utility value and a not recommended expected utility value according to the calculations performed by the well control BDN model 1600. For example, as shown in FIG. 25, the "Drillers_method" circulation has a recommended expected utility of 1 and a not recommended expected utility of 0. As also shown in FIG. 25, the other proposed circulations 2504 have a recommended expected utility of 0 and a not recommended expected utility of 1. Accordingly, based on the selected inputs provided to the BDN model 1600 illustrated in FIGS. 24A-24C, a user may decide to use a "Drillers_method" circulation in well control operation for a drilling system experiencing kicks characterized by the selected inputs.

Figure 26A:
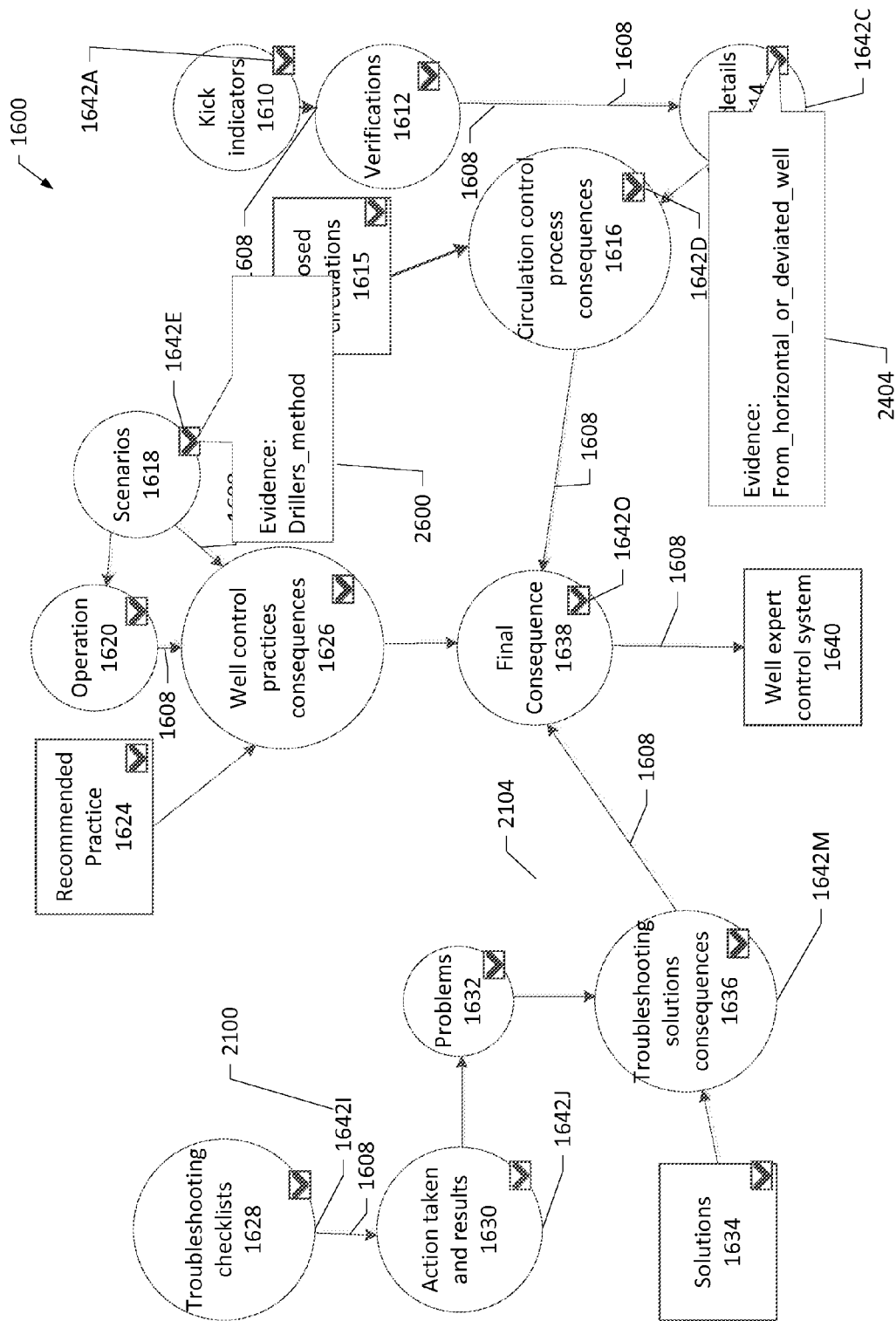
FIGS. 26A and 26B are schematic diagrams depicting user selected inputs for a well control practices section of the well control BDN model of FIG. 16 in accordance with an embodiment of the present invention.
Figure 26B:
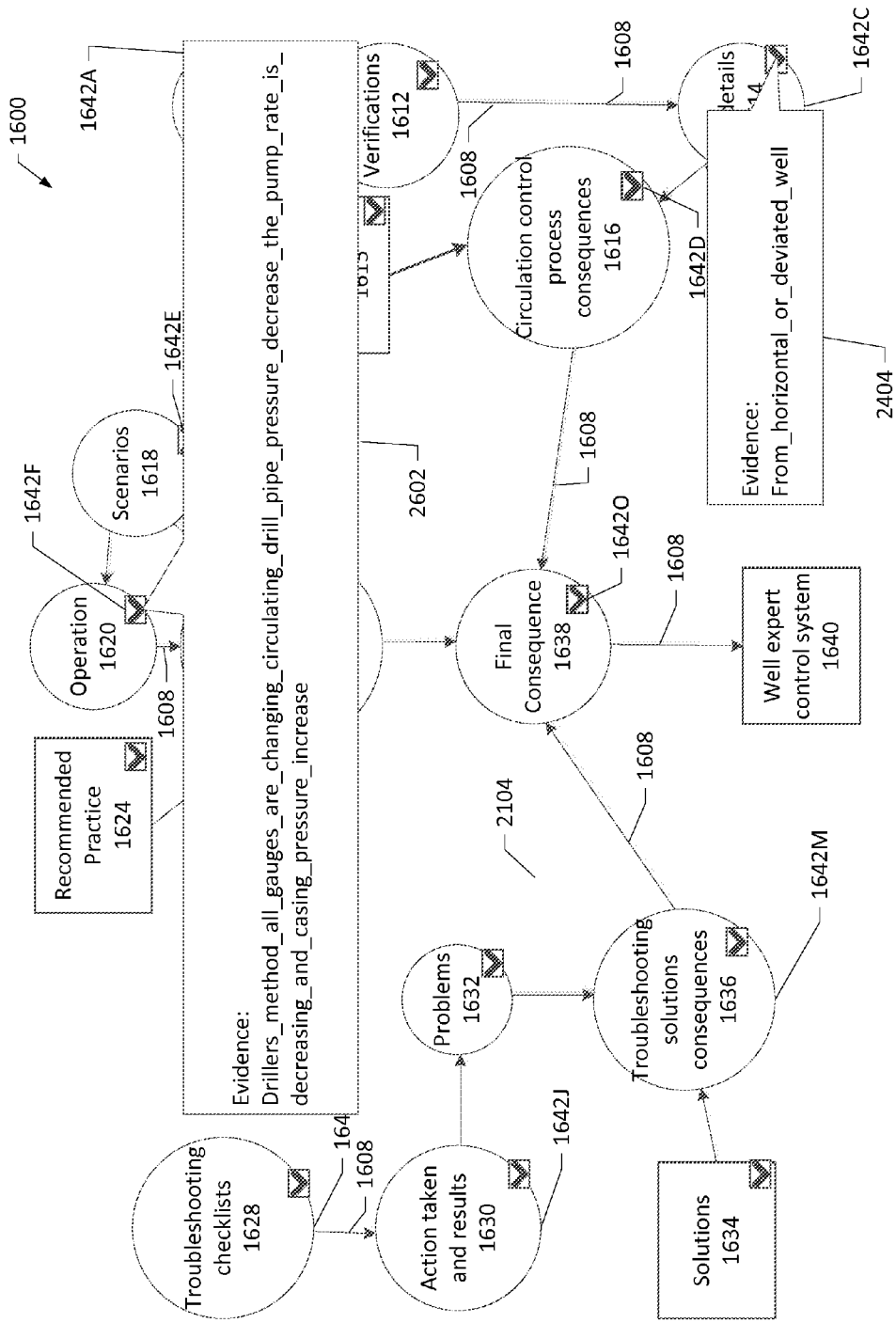
Figure 27:
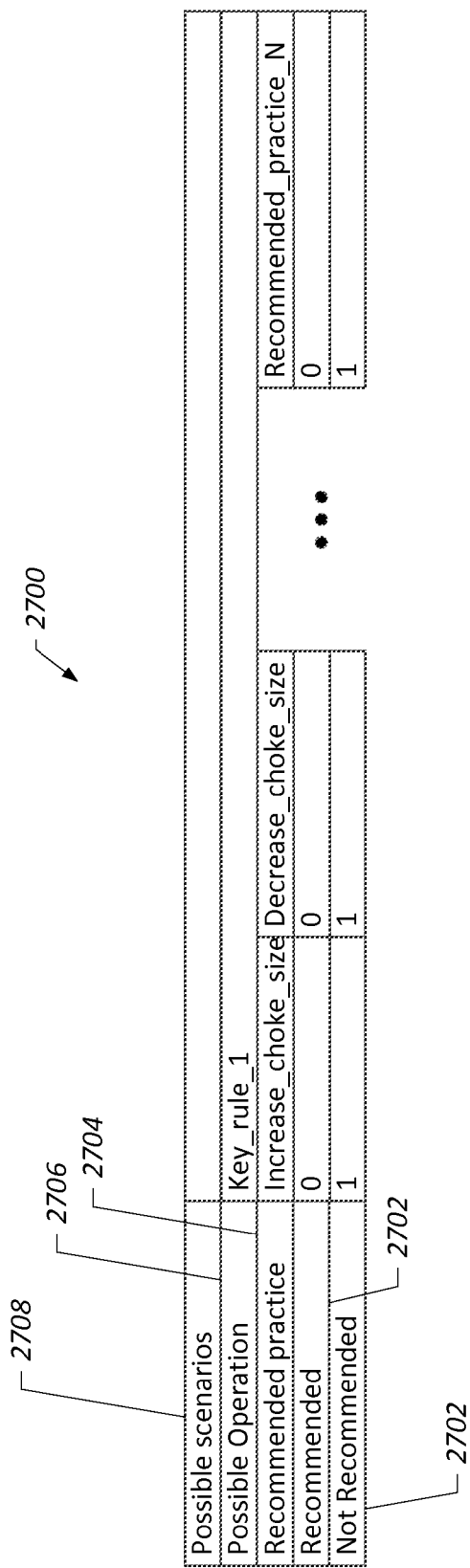
FIG. 27 is a table depicting outputs from the well control practices section of the well control BDN model of FIG. 16 in accordance with an embodiment of the present invention.

FIGS. 26A-26B and 27 depict selected inputs and corresponding outputs for the well control practice section 1604. FIG. 26A depicts a selected input 2600 for the possible scenarios uncertainty node 1618 in accordance with an embodiment of the present invention. To select an input, a user may select (e.g., click) the button 1642E to display the well control scenarios associated with the scenarios uncertainty node 1618. A user may select one of the displayed possible scenarios, and the selected input 2600 ("Drillers_method) may be displayed. Similarly, a user may select an input for the well control operations uncertainty node 1620 by selecting the button 1642F to display possible operations for the uncertainty node 1620. As shown in FIG. 26B, the selected input 2602 ("Drillers_method_all_gauges_are_changing_circulating_drill_pipe_pressure_decrease_the_pump_rate_is_decreasing_and_casing_pressure_increase") may be displayed to indicate the input to the possible operation uncertainty node 1620.

Based on the inputs described above in FIGS. 26A and 26B, a user may select the well control practice consequence node 1616 to receive the output from the well control BDN model 1600. FIG. 27 depicts the output from the well control practice section 1604 of the well control BDN model 1600 based on the selected inputs described above in FIGS. 26A and 26B in accordance with an embodiment of the present invention. In some embodiments, as shown in FIG. 27, the output from the well control BDN model 1600 may be presented as a table 2700. The table 2700 may include expected utilities 2702 for multiple well control practices 2704 (as input from the recommended well control practices decision node 1624) based on a possible scenario 2708 (as input to the well control scenarios uncertainty node 1618) and a possible operation 2706 (as input for the possible operation uncertainty node 1620). For example, as shown in FIG. 27, the recommended well control practices may include: "Increase_choke_size" and, "Decrease_choke_size" and may include N number of practices up to "Recommended_practices_N".

The well control practices 2704 may each be associated with a recommended expected utility value and a not recommended expected utility value according to the calculations performed by the well control BDN model 1600. For example, as shown in FIG. 27, the "Increase_choke_size" well control practice technique has a recommended expected utility of 1 and a not recommended expected utility of 0. The other well control practices 2704 have a recommended expected utility of 0 and a not recommended expected utility of 1. Accordingly, based on the selected inputs provided to the BDN model 1600 illustrated in FIGS. 26A and 26B, a user may decide to implement an "Increase_choke_size" well control practice in a well control operation characterized by the selected inputs.

Figure 28A:
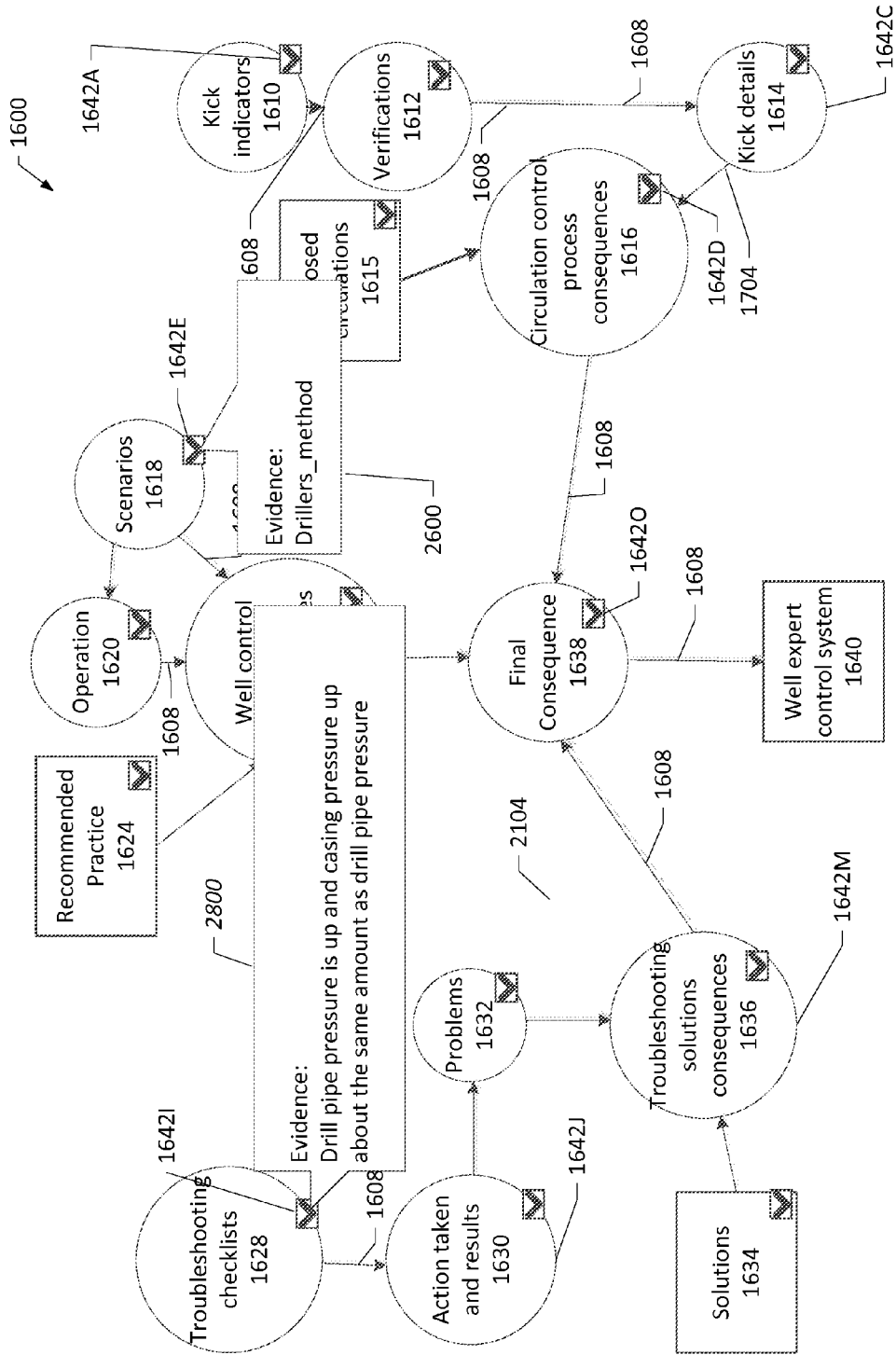
FIGS. 28A-28D are schematic diagrams depicting user selected inputs for a troubleshooting section of the well control BDN model of FIG. 16 in accordance with an embodiment of the present invention.

Additionally, as noted above, a user may enter inputs for the troubleshooting section 1606 of the well control BDN model 1600. FIGS. 28A-28C and 29 depict user inputs for the troubleshooting section 1606 of the well control BDN model 1600. FIG. 28A depicts a user selected input 2800 for the troubleshooting checklists uncertainty node 1628 in accordance with an embodiment of the present invention. To select an input for this node, a user may select (e.g., click) the button 1642I to display the checklists associated with the troubleshooting checklists uncertainty node 1628. A user may select one of the troubleshooting checklists, and the selected input 2800 ("Drill_pipe_pressure_is_up_and_casing_pressure_up_about_the_same_amount_as_drill_pipe_pressure) may be displayed, as shown in FIG. 28A.

Figure 28B:
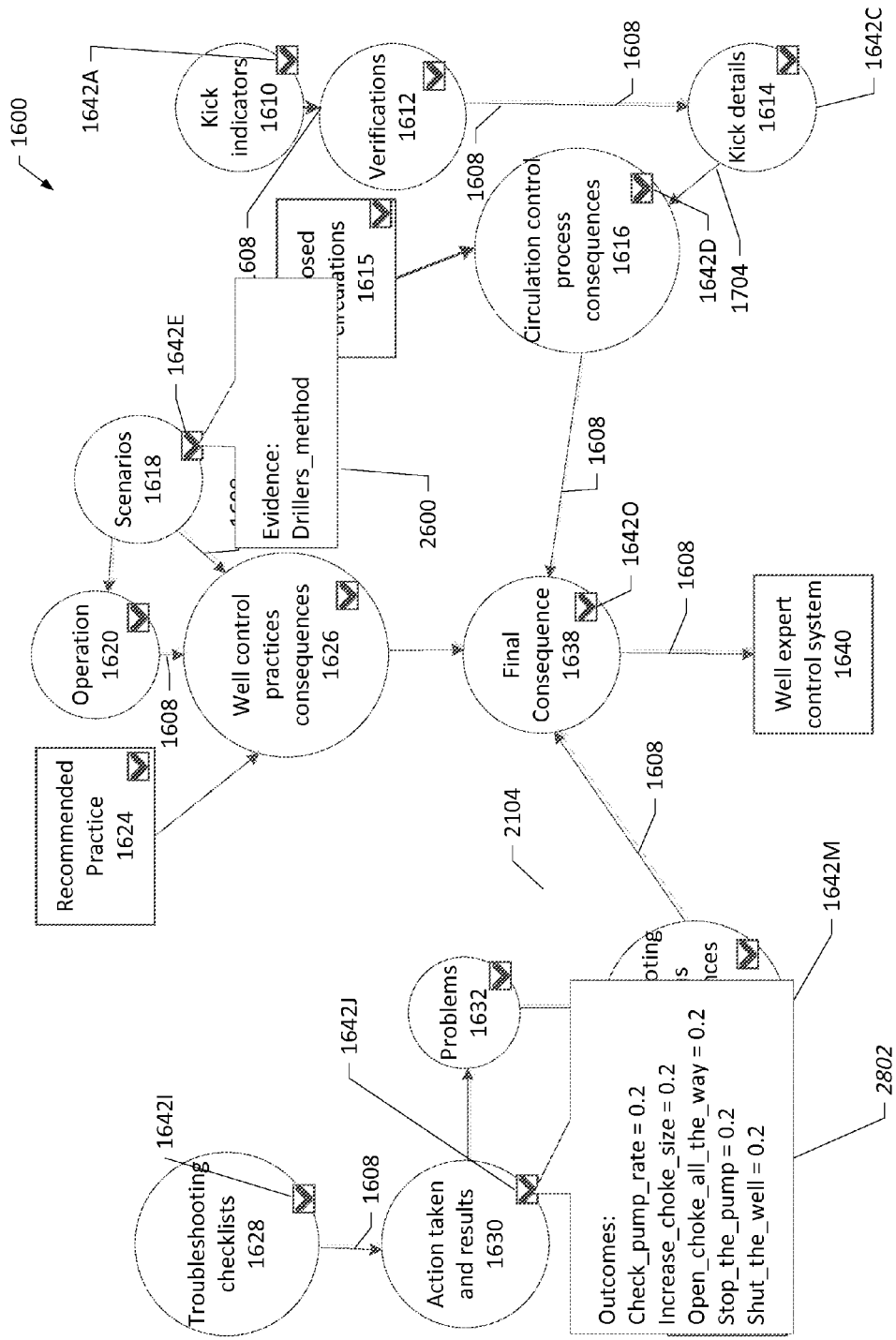

Additionally, a user may select an input for the actions and results uncertainty node 1630 by selecting the button 1642J to display selectable inputs for the node 1630. For example, as shown in FIG. 28B, the inputs 2802 may be displayed indicating the inputs to the action and results uncertainty node

Figure 28C:
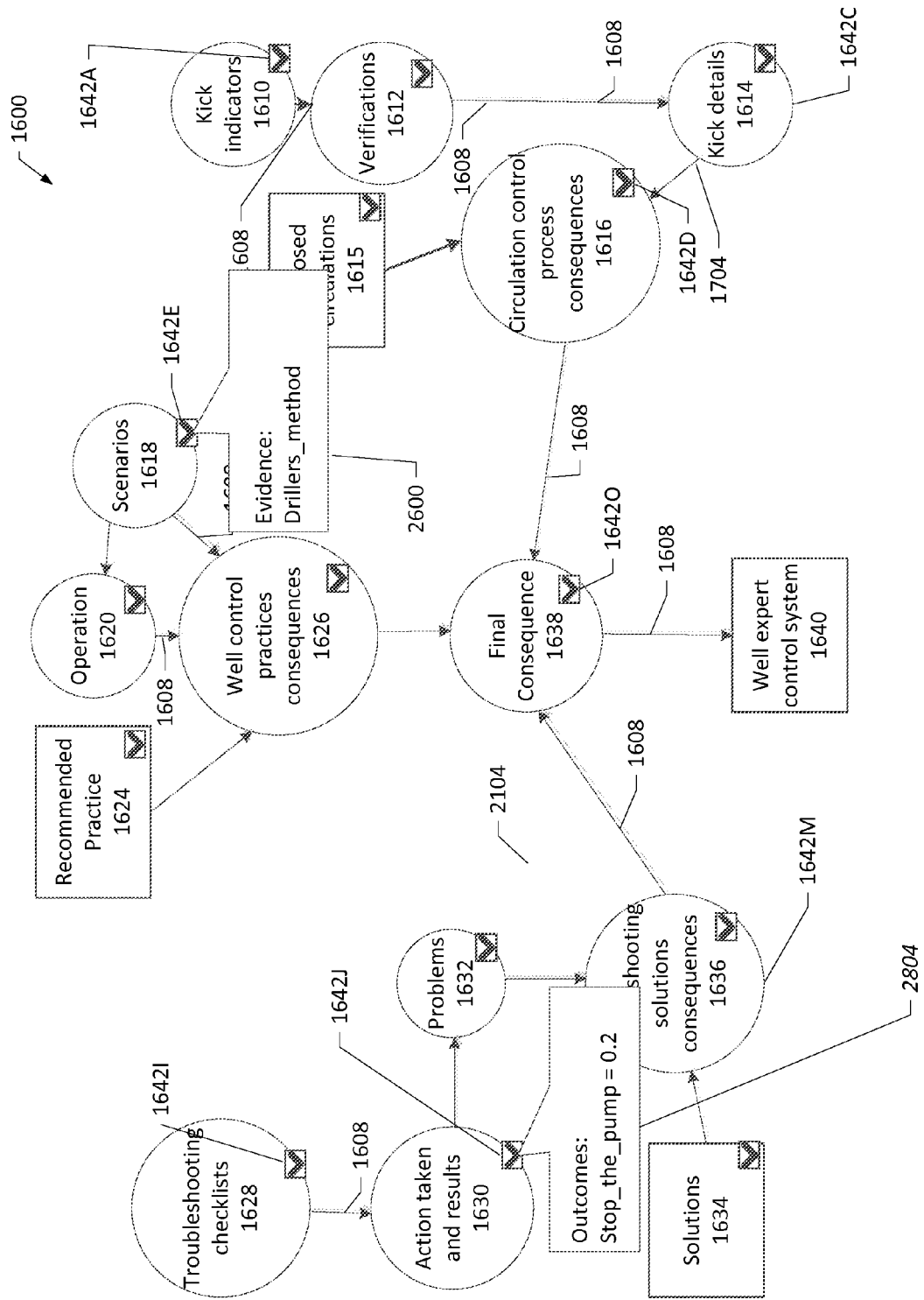

1630. Additionally, the probabilities for each actions and results input 2802 are displayed. The probabilities for the inputs 2802 are based on the input to the troubleshooting checklist node 1628. The inputs 2802 and associated probability states may include, for example, "Check_pump_rate=0.2," "Increase_choke_size=0.2, "Open_choke_all_the_way=0.2," "Stop_the_pump=0.2," and "Shut_the_well=0.2." A user may then select one of the input 2802 for the input to the actions taken and results uncertainty node 1630. For example, if a user is aware of a specific action taken during a well control operation in a drilling system and the corresponding results, the appropriate action and result may be selected from the inputs 2802. Consequently, as shown in FIG. 28C, a user has selected "Stop_the_pump" as the input 2804 to the actions and results uncertainty node 1630. Thus, the selected input 2804 has a probability state of 1. The selected input 2804 may be displayed to indicate the input to the actions and results uncertainty node 1630.

Figure 28D:
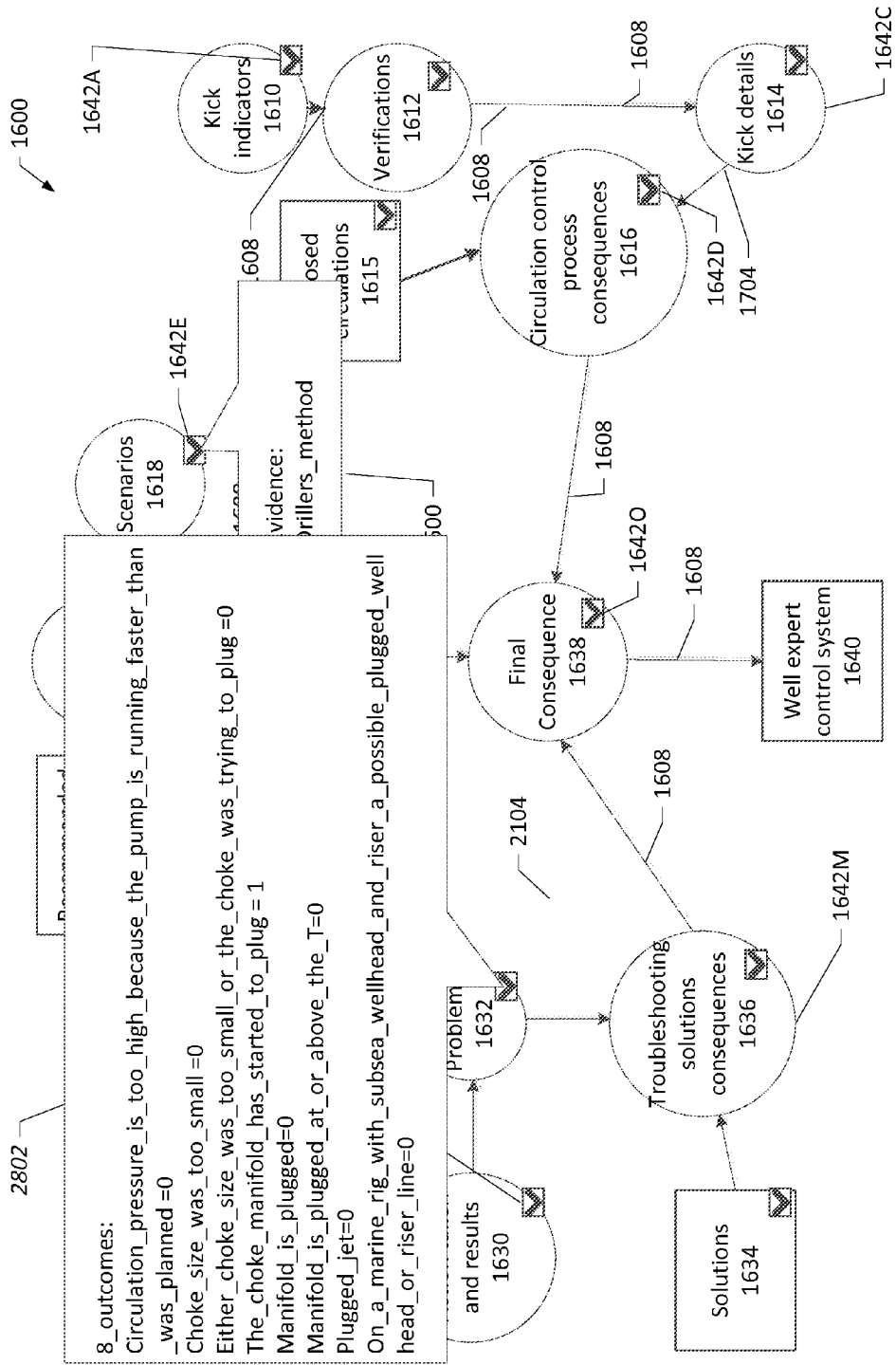

Based on this selection, inputs for the problem uncertainty node 1632 may be determined. FIG. 28D depicts inputs 2806 for the problem uncertainty node 1632 based on the selections described above in FIGS. 28A and 28B and in accordance with an embodiment of the present invention. The inputs 2806 include associated probability states resulting from the inputs to the actions and results uncertainty node 1630. The inputs 2806 and associated probability states may include, for example: "Circulation_pressure_is_too_high_because_the_pump_is_running_faster_than_was_planned=0", "Choke_size_was_too_small=0", "Either_choke_size_was_too_small_or_the_choke_was_trying_to_plug=0", "The_choke_manifold_has_started_to_plug=1", "Manifold_is_plugged=0", "Manifold_is_plugged_at_or_above_the_T=0", "Plugged_jet=0", and "On_a_marine_rig_with_subsea_wellhead_and_riser_a_possible_plugged_wellhead_or_riser_line=0". A user may rely on the probability states determined by the well control BDN model 1600 as inputs to the problem uncertainty node 1632 or a user may select one of the selectable problems 2806 as an input for the problem uncertainty node. For example, as shown in FIG. 28D, a user may rely on the identification of the problem "The_choke_manifold_has_started_to_plug" having a probability state of 1 as a proper identification of the problem that is based on the selected input to the actions and taken results node 1630.

Figure 29:
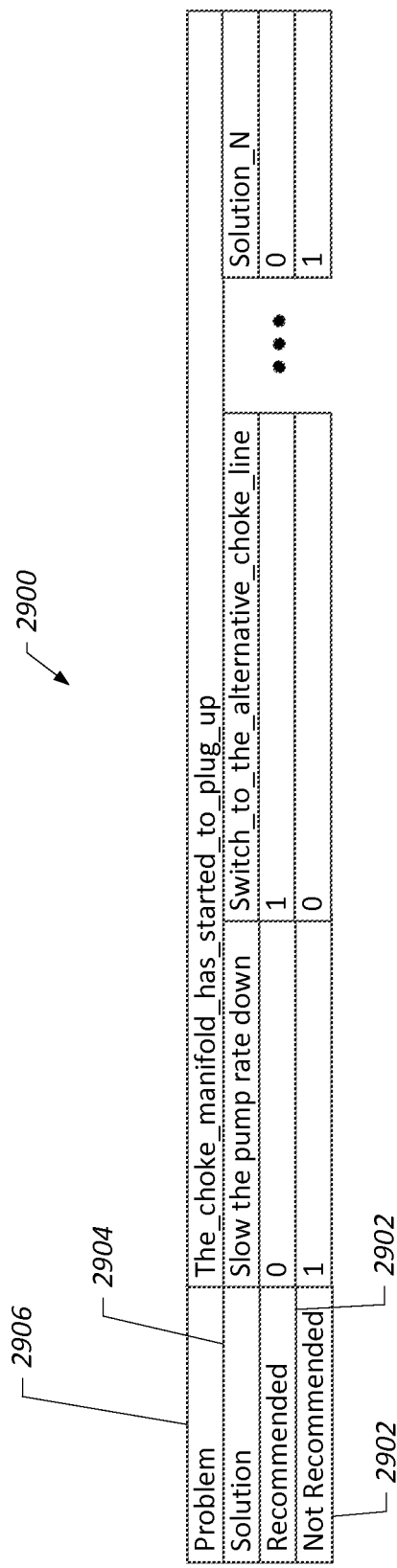
FIG. 29 is a table depicting outputs from the well control practices section of the well control BDN model of FIG. 16 in accordance with an embodiment of the present invention.

Accordingly, based on the inputs described above in FIGS. 28A-28D, a user may select the troubleshooting solutions consequence node 1636 to receive the output from the well control BDN model 1600. FIG. 29 depicts the output from the troubleshooting section 1606 of the well control BDN model 1600 based on the selected inputs described above in FIGS. 28A-28D in accordance with an embodiment of the present invention. As shown in FIG. 29, in some embodiments the output from the well control BDN model 1600 may be presented as a table 2900 displaying expected utilities 2902. The table may display the expected utilities 2902 for multiple solutions 2904 (as input to the solutions decision node 1634) based on a problem 2906 (as input to the problem uncertainty node 1632). For example, as shown in FIG. 29, the solutions may include: "Slow_the_pump_rate_down" and "Switch_to_the_alternative_choke_line" and may include N number of solutions up to "Solution_N".

The solutions 2904 may each be associated with a recommended expected utility value and a not recommended expected utility value according to the calculations performed by the well control BDN model 1600. For example, as shown in FIG. 29, the "Switch_to_the_alternative_choke_line" solution has a recommended expected utility of 1 and a not recommended expected utility of 0. As also shown in FIG. 29, the other solutions 2904 have a recommended expected utility of 0 and a not recommended expected utility of 1. Accordingly, based on the selected inputs provided to the BDN model 1600 illustrated in FIGS. 28A-28D, a user may decide to use a "Switch_to_the_alternative_choke_line" solution in a drilling system characterized by the selected inputs.

Figure 30:
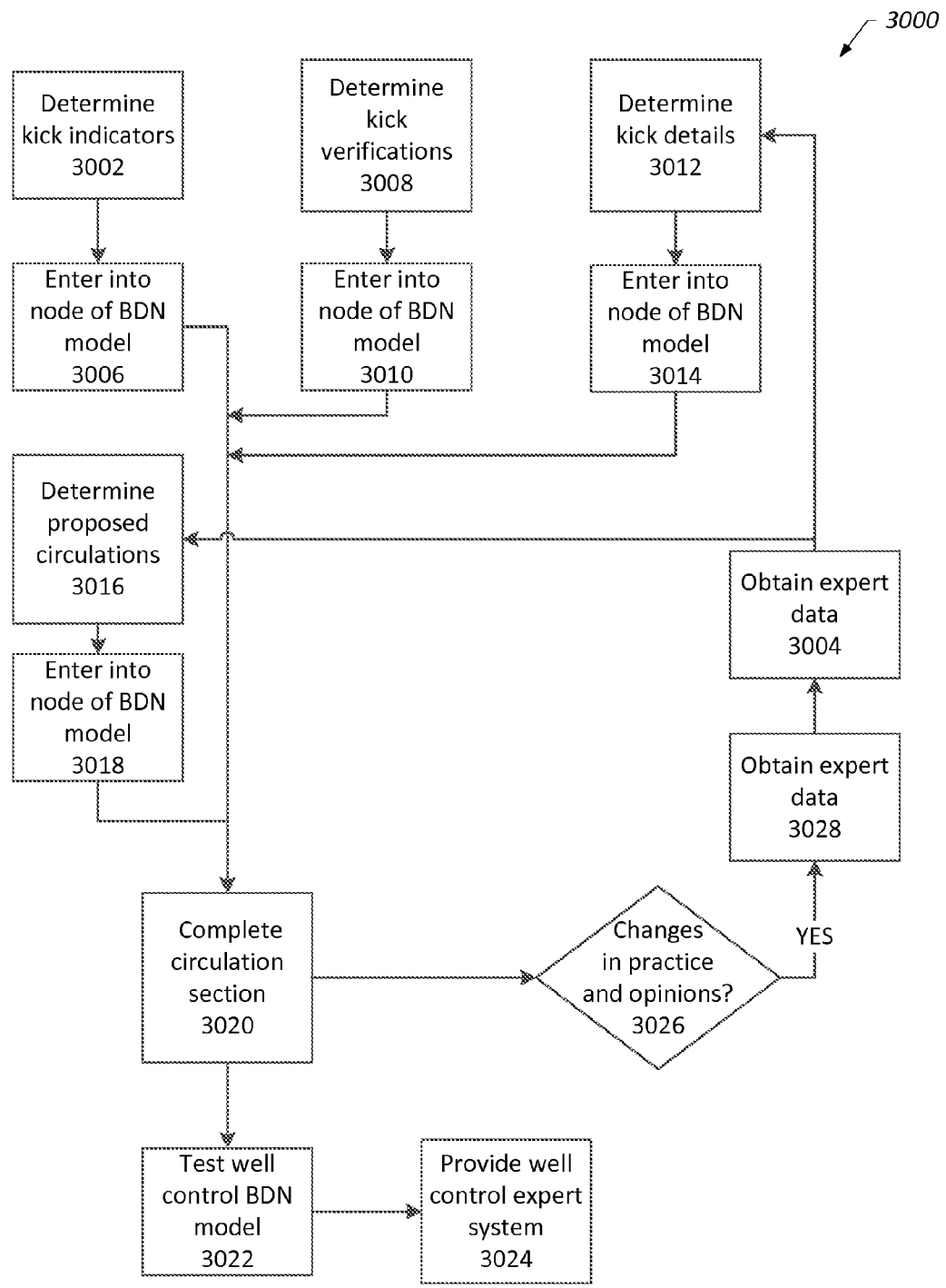
FIG. 30 is a block diagram that depicts a process for constructing a circulation section of a well control BDN model in accordance with an embodiment of the present invention.

The well control BDN model 1600 described herein may be constructed based on the inputs described above, such as kick indicators, kick details, well control scenarios, well control operations, troubleshooting checklists, actions and results, solutions, and so on. The construction of each section of the well control BDN model 1600 is described below in FIGS. 30-32. FIG. 30 depicts a process 3000 illustrating the construction of the circulation section 1602 of the well control BDN model 1600 in accordance with an embodiment of the present invention. For example, kick indicators for use with the well control BDN model 1600 may be determined (block 3002). The kick indicators may be determined from expert data 3004 and may be based on possible kick indicators for kicks that may occur in a drilling system. For example, expert data 3004 may be obtained from various sources, such as consultations with experts, scientific literature, expert reports, and the like. The determined kick indicators may be entered into an uncertainty node in the well control BDN model (block 3006).

Additionally, kick verifications for use with the well control BDN model 1600 may be determined (block 3008). The kick verifications may include possible verifications and associated probability states for the determined kick indicator. The kick verifications and associated probability states may also be determined from the expert data 3004. For example, as described above, the kick verifications and associated probability states are dependent on the selected kick indicators used in the well control BDN model 1600. Thus, the various probability states for the kick verifications may be determined from the expert data 3004. As described above, in some embodiments, the expert data 3004 may be used to generate probability data stored in a database. The determined kick verifications and associated probability states may then be entered into an uncertainty node of the well control BDN model 1600. As also shown in FIG. 29, possible kick details for verified kicks may also be determined (block 3012) from the expert data 3004. The determined kick details may be entered into a node of the well control BDN model 1600.

Finally, proposed circulations may be determined (block 3016). Here again, the proposed circulations and associated probability states may be determined from the expert data 3012. For example, for each combination of determined kick details and proposed circulations, probability states may be assigned as determined from the expert data 3012. The proposed circulations may be entered into a decision node of the well control BDN model 1600. Next, the circulation techniques section 1602 of the well control BDN model 1600 may be completed, such as by entering any relationships between the nodes and confirming the entered inputs and probability states. In some embodiments, after completing the circulation section 1602 of the well control BDN model 1600 the, the completed model may be tested (block 3022). For example, inputs to the circulation section 1602 of the well control BDN model 1600 may be selected and the outputs, i.e., circulation techniques and expected utility values, may be tested against manual determinations based on the expert data forming the basis for the well control BDN model 1600. Finally, if the model is complete and tested, the well control expert system incorporating the well control BDN model 1600 may be provided (block 3024).

Advantageously, in the case of new and changed practices, expert opinions, etc., the well control BDN model may be updated by changing the probability states for the appropriate nodes. For example, practices, expert opinions, and the like may be reviewed to determine if there are changes (decision block 3026). If there are new or changed practices, expert opinions, and the like (line 3028), then additional expert data may be obtained (block 2630) and used to determine kick indicators (block 3010), kick verifications (block 3016), and so on. Any new and changed determinations may be entered into the appropriate nodes and an updated well control BDN model may be completed (block 3020).

Figure 31:
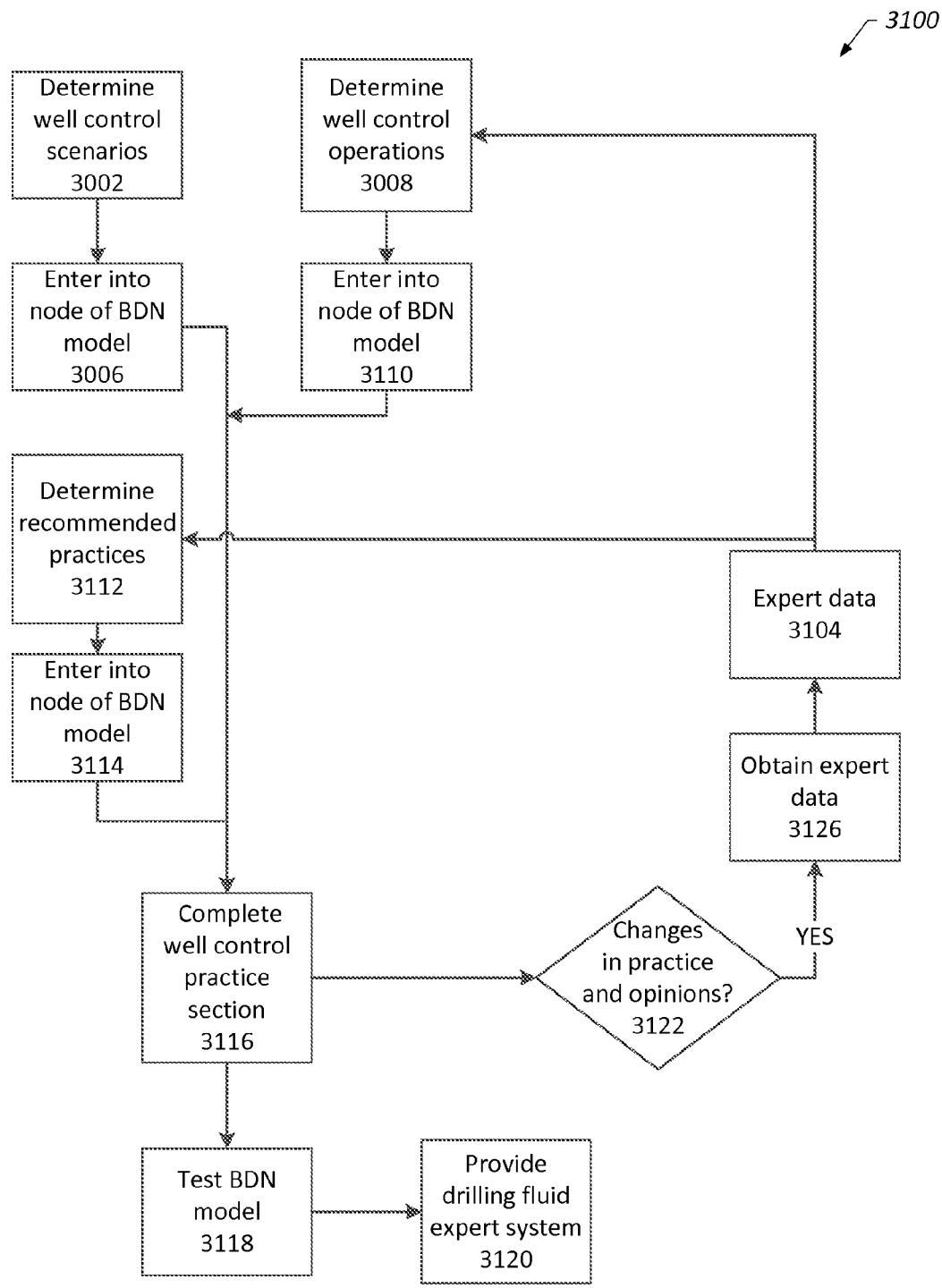
FIG. 31 is a block diagram that depicts a process for constructing a well control practices section of a well control BDN model in accordance with an embodiment of the present invention.

The other sections of the well control BDN model 1600 may also be constructed in a similar manner. FIG. 31 depicts a process 3100 illustrating the construction of the well control practices section 1604 of the well control BDN model 1600 in accordance with an embodiment of the present invention. For example, well control scenarios for use with the well control BDN model 1600 may be determined (block 3102). The well control scenarios may be determined from expert data 3104 and may include potential well control scenarios that may be encountered in a drilling system. For example, expert data 3104 may be obtained from various sources, such as consultations with experts, scientific literature, expert reports, and the like. The determined possible scenarios may be entered into an uncertainty node in the well control BDN model (block 3106).

Additionally, well control operations for use with the well control BDN model 1600 may be determined (block 3108). The well control operations may include possible operations and associated probability states determined from the expert data 3104 and may be based on the possible scenarios input into the well control BDN model 1600. For example, as described above, the well control operations and associated probability states are dependent on the possible scenarios used in the well control BDN model 1600. Accordingly, the various probability states for the well control operations may be determined from the expert data 3104. As described above, in some embodiments, the expert data 3104 may be used to generate probability data stored in a database. The determined possible operations and associated probability states may then be entered into an uncertainty node of the well control BDN model 1600.

Finally, recommended well control practices may be determined (block 3112). Here again, the recommended well control practices and associated probability states may be determined from the expert data 3104. For example, for each combination of determined well control scenarios, well control operations, and recommended well control practices, probability states may be assigned as determined from the expert data 3104. The recommended well control practices may be entered into a decision node of the well control BDN model 1600 (block 3114). Next, the well control practice section 1604 of the well control BDN model 1600 may be completed, such as by entering the relationships between the nodes and confirming the entered inputs and probability states. In some embodiments, after completing the section 1604 of the well control BDN model 1600, the completed model may be tested (block 3116). For example, inputs to the well control practice section 1604 of the well control BDN model 1600 may be selected and the outputs, i.e., well control practices and expected utility values, may be tested against manual determinations based on the expert data forming the basis for the well control BDN model 1600. Finally, if the model is complete and tested, the well control expert system incorporating the well control BDN model 1600 may be provided (block 3120).

Here again, in the case of new and changed practices, expert opinions, etc., the well control BDN model 1600 may be updated by changing the probability states for the appropriate nodes. For example, practices, expert opinions, and the like may be reviewed to determine if there are changes (decision block 3122). If there are new or changed practices, expert opinions, and other sources of expert data (line 3124), then additional expert data may be obtained (block 3126) and used to determine kick indicators (block 3110), kick verifications (block 3116), and so on. Any new and changed determinations may be entered into the appropriate nodes and an updated well control practice section 1604 may be completed (block 3116).

Figure 32:
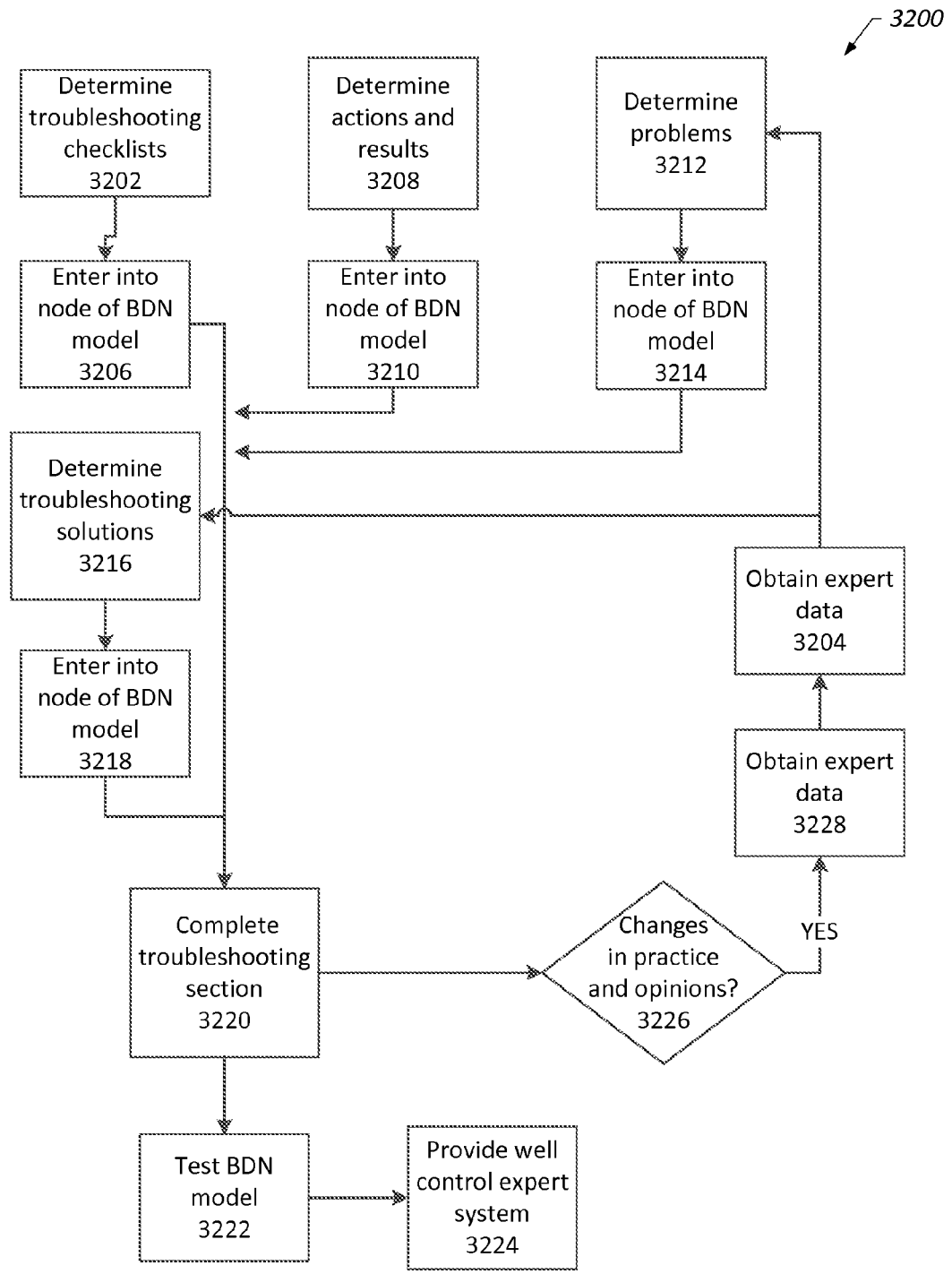
FIG. 32 is a block diagram that depicts a process for constructing a troubleshooting section of a well control BDN model in accordance with an embodiment of the present invention.

Finally, the troubleshooting section 1606 of the well control BDN model 1600 may be constructed, as shown in FIG. 32. FIG. 32 depicts a process 3200 illustrating the construction of the troubleshooting section 1606 of the well control BDN model 1600 in accordance with an embodiment of the present invention. Initially, for example, troubleshooting checklists for use with the well control BDN model 1600 may be determined (block 3202). The troubleshooting checklists may be generated from expert data 3204 and may include steps and other items in a checklist usable for troubleshooting well control problems. As noted above, for example, expert data 3204 may be obtained from various sources, such as consultations with experts, scientific literature, expert reports, and the like. The determined possible scenarios may be entered into an uncertainty node in the well control BDN model (block 3206).

Additionally, actions and results for use with the well control BDN model 1600 may be determined (block 3208). The actions and results may include actions taken during a well control operation and the corresponding results. The actions and results may include associated probability states determined from the expert data 3204 and may be based on the troubleshooting checklists input into the well control BDN model 1600. As illustrated in the well control BDN model 1600, the actions and results and associated probability states are dependent on the troubleshooting checklists inputs for the troubleshooting uncertainty node 1628. Accordingly, the various probability states for the actions and results may be determined from the expert data 3204, and as described above, in some embodiments, the expert data 3204 may be used to generate probability data stored in a database. The determined actions and results and associated probability states may then be entered into an uncertainty node of the well control BDN model 1600 (block 3210). Further, problems for use in the troubleshooting section of the well control BDN model may also be determined (block 3212). The problems may include problems encountered based on the actions taken and results input into the BDN model 1600. Here again, problems and associated probability states may be determined from expert data 3204. The determined problems and associated probability states may be entered into an uncertainty node of the troubleshooting section 1606 of the well control BDN model 1600 (block 3214).

Finally, solutions to the identified problems may be determined (block 3216). Here again, the solutions and associated probability states may be determined from the expert data 3204 and the other inputs to the well control BDN model 1600. For example, for each combination of problems and solutions, probability states may be assigned as determined from the expert data 3204. The determined solutions may be entered into a decision node of the well control BDN model 1600 (block 3218). Next, the troubleshooting section 1606 of the well control BDN model 1600 may be completed (block 3220), such as by entering the relationships between the nodes and confirming the entered inputs and probability states for the combinations in a consequence node. In some embodiments, after completing the section 1606, the completed section of the BDN model 1600 may be tested (block 3222). As noted above, for example, inputs to the troubleshooting section 1606 of the well control BDN model 1600 may be selected and the outputs, i.e., troubleshooting solutions and expected utility values, may be tested against manual determinations based on the expert data forming the basis for the well control BDN model 1600. Finally, if the model is complete and tested, the well control expert system incorporating the well control BDN model 1600 may be provided (block 3224).

As described above, in the case of new and changed practices, expert opinions, etc., the well control BDN model 1600 may be updated by changing the probability states for the appropriate nodes. For example, practices, expert opinions, and the like may be reviewed to determine if there are changes (decision block 3226). If there are new or changed practices, expert opinions, and other sources of expert data (line 3228), then additional expert data may be obtained (block 3230) and used to determine troubleshooting checklists (block 3202), actions and results (block 3208), and other inputs of the nodes of the well control BDN model 1600. Any new and changed determinations may be entered into the appropriate nodes and an updated troubleshooting section 1606 of the well control BDN model 1600 may be completed (block 3230).

Figure 33:
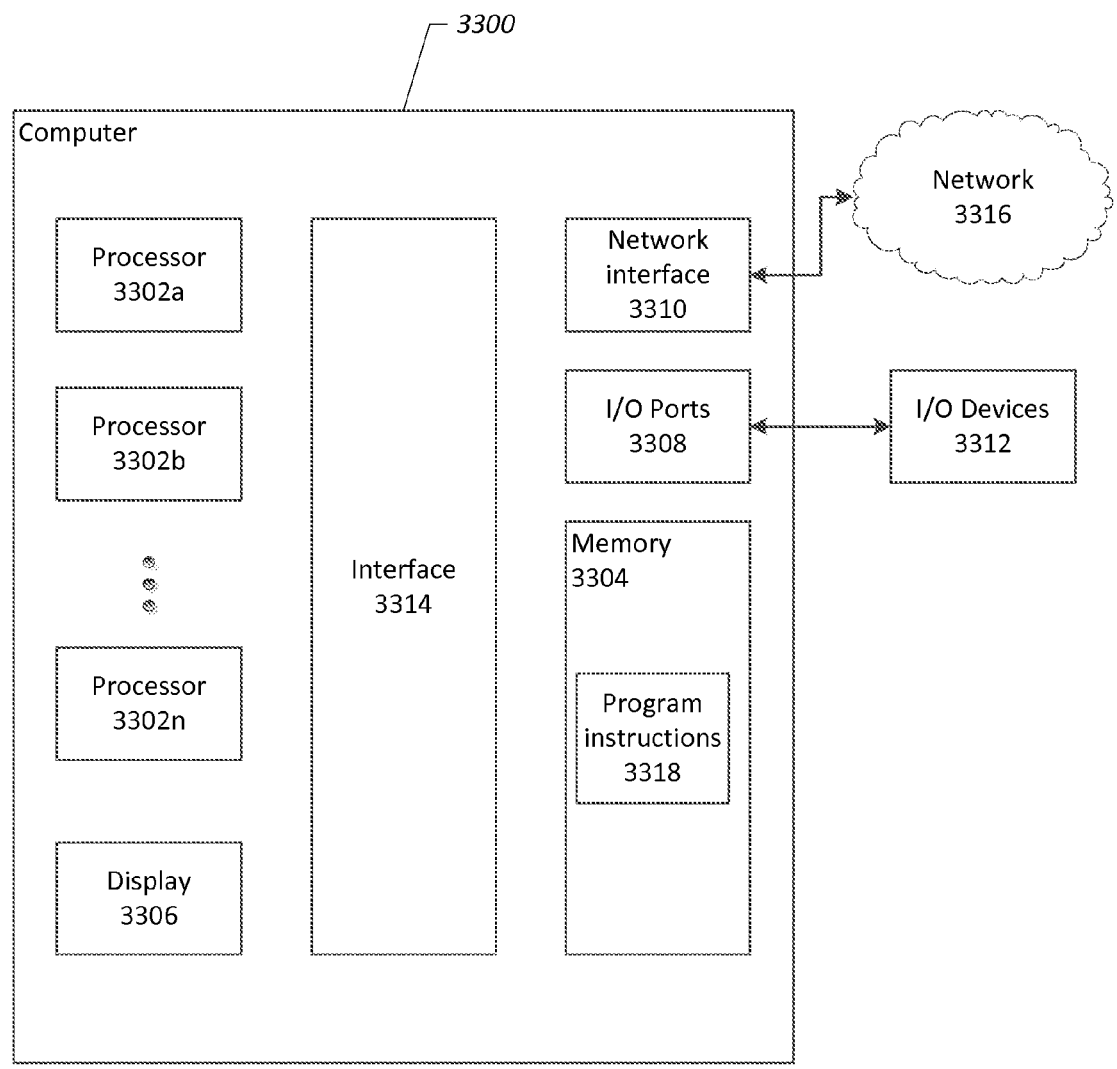
FIG. 33 is a block diagram of a computer in accordance with an embodiment of the present invention.

FIG. 33 depicts a computer 3300 in accordance with an embodiment of the present invention. Various portions or sections of systems and methods described herein include or are executed on one or more computers similar to computer 3300 and programmed as special-purpose machines executing some or all steps of methods described above as executable computer code. Further, processes and modules described herein may be executed by one or more processing systems similar to that of computer 3300. For example, the well control expert system 108 described may be implemented on one or more computers similar to computer 3300 and programmed to execute the Bayesian decision network model described above.

As will be understood by those skilled in the art, the computer 3300 may include various internal and external components that contribute to the function of the device and which may allow the computer 3300 to function in accordance with the techniques discussed herein. As will be appreciated, various components of computer 3300 may be provided as internal or integral components of the computer 3300 or may be provided as external or connectable components. It should further be noted that FIG. 33 depicts merely one example of a particular implementation and is intended to illustrate the types of components and functionalities that may be present in computer 3300. As shown in FIG. 33, the computer 3300 may include one or more processors (e.g., processors 3302a-3302n) coupled to a memory 3304, a display 3306, I/O ports 3308 and a network interface 3310, via an interface 3314.

Computer 3300 may include any combination of devices or software that may perform or otherwise provide for the performance of the techniques described herein. For example, the computer 3300 may be representative of the client computer 200 or a server implementing some or all portions of the well control expert system 108 or other components of the systems described above. Accordingly, the computer 3300 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 3300 may be a unified device providing any one of or a combination of the functionality of a media player, a cellular phone, a personal data organizer, a game console, and so forth. Computer 3300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 3300 may allow a user to connect to and communicate through a network 3316 (e.g., the Internet, a local area network, a wide area network, etc.) and to acquire data from a satellite-based positioning system (e.g., GPS). For example, the computer 3300 may allow a user to communicate using the World Wide Web (WWW), e-mail, text messaging, instant messaging, or using other forms of electronic communication, and may allow a user to obtain the location of the device from the satellite-based positioning system, such as the location on an interactive map.

In one embodiment, the display 3306 may include a liquid crystal display (LCD) or an organic light emitting diode (OLED) display, although other display technologies may be used in other embodiments. The display 3306 may display a user interface (e.g., a graphical user interface), such a user interface for a Bayesian decision network. In accordance with some embodiments, the display 3306 may include or be provided in conjunction with touch sensitive elements through which a user may interact with the user interface. Such a touch-sensitive display may be referred to as a "touch screen" and may also be known as or called a touch-sensitive display system.

The processor 3302 may provide the processing capability required to execute the operating system, programs, user interface, and any functions of the computer 3300. The processor 3302 may receive instructions and data from a memory (e.g., system memory 3304). The processor 3302 may include one or more processors, such as "general-purpose" microprocessors, and special purpose microprocessors, such as ASICs. For example, the processor 3302 may include one or more reduced instruction set (RISC) processors, such as those implementing the Advanced RISC Machine (ARM) instruction set. Additionally, the processor 3302 may include single-core processors and multicore processors and may include graphics processors, video processors, and related chip sets. Accordingly, computer 3300 may be a uni-processor system including one processor (e.g., processor 3302a), or a multi-processor system including any number of suitable processors (e.g., 3302a-3302n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

As will be understood by those skilled in the art, the memory 3304 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 3304 may be accessible by the processor 3302 and other components of the computer 3300. The memory 3304 may store a variety of information and may be used for a variety of purposes. The memory 3304 may store executable computer code, such as the firmware for the computer 3300, an operating system for the computer 3300, and any other programs or other executable code necessary for the computer 3300 to function. The executable computer code may include program instructions 3318 executable by a processor (e.g., one or more of processors 3302a-3302n) to implement one or more embodiments of the present invention. Instructions 3318 may include modules of computer program instructions for implementing one or more techniques described. Program instructions 3318 may define a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 3304 may be used for buffering or caching during operation of the computer 3300. The memory 3304 may also store data files such as media (e.g., music and video files), software (e.g., for implementing functions on computer 3300), preference information (e.g., media playback preferences), wireless connection information (e.g., information that may enable media device to establish a wireless connection), telephone information (e.g., telephone numbers), and any other suitable data.

As mentioned above, the memory 3304 may include volatile memory, such as random access memory (RAM). The memory 3304 may also include non-volatile memory, such as ROM, flash memory, a hard drive, any other suitable optical, magnetic, or solid-state storage medium, or a combination thereof. The interface 3314 may include multiple interfaces and may couple various components of the computer 3300 to the processor 3302 and memory 3304. In some embodiments, the interface 3314, the processor 3302, memory 3304, and one or more other components of the computer 3300 may be implemented on a single chip, such as a system-on-a-chip (SOC). In other embodiments, these components, their functionalities, or both may be implemented on separate chips. The interface 3314 may be configured to coordinate I/O traffic between processors 3302a-3302n, system memory 3304, network interface 1330, I/O devices 1412, other peripheral devices, or a combination thereof. The interface 3314 may perform protocol, timing or other data transformations to convert data signals from one component (e.g., system memory 3304) into a format suitable for use by another component (e.g., processors 3302a-3302n). The interface 3314 may include support for devices attached through various types of peripheral buses, such as a variant of the Peripheral Component Interconnect (PCI) bus standard or the Universal Serial Bus (USB) standard.

The computer 3300 may also include an input and output port 3308 to allow connection of additional devices, such as I/O devices 3312. Embodiments of the present invention may include any number of input and output ports 3308, including headphone and headset jacks, universal serial bus (USB) ports, Firewire or IEEE-1394 ports, and AC and DC power connectors. Further, the computer 3300 may use the input and output ports to connect to and send or receive data with any other device, such as other portable computers, personal computers, printers, etc.

The computer 3300 depicted in FIG. 33 also includes a network interface 3310, such as a wired network interface card (NIC), wireless (e.g., radio frequency) receivers, etc. For example, the network interface 3310 may receive and send electromagnetic signals and communicate with communications networks and other communications devices via the electromagnetic signals. The network interface 3310 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 1330 may communicate with networks (e.g., network 3316), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP), or any other suitable communication protocol.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A system, comprising:
one or more processors;
a non-transitory tangible computer-readable memory, the memory comprising:
a well control expert system executable by the one or more processors and configured to provide one or more well control recommendations based on one or more inputs, the well control expert system comprising a well control Bayesian decision network (BDN) model, the well control BDN model comprising:
a kick indicators uncertainty node configured to receive one or more kick indicators from the one or more inputs;
a kick verifications uncertainty node dependent on the kick indicators uncertainty node and configured to receive one or more kick verifications from the one or more inputs;
a kick details uncertainty node dependent on the kick verifications uncertainty node and configured to receive one or more kick details from the one or more inputs;
a circulations decision node configured to receive one or more circulations from the one or more inputs;
a circulations consequences node dependent on the kick details uncertainty node and the circulations decision node and configured to output the one or more well control recommendations based on one or more Bayesian probabilities calculated from one or more kick details and the one or more circulations; and
a well control practices consequences node dependent on (a) a well control scenarios uncertainty node, (b) a well control operations uncertainty node, and (c) a recommended practices decision node, the well control practices consequences node being configured to output the one or more well control recommendations based on one or more Bayesian probabilities calculated from:
one or more well control scenarios input to the well control uncertainty node,
one or more well control operations input to the well control operations uncertainty node, and
one or more recommended practices input to the recommended practices decision node.

2. The system of claim 1, further comprising a user interface configured to display the well control BDN model and receive user selections of the one or more inputs.

3. The system of claim 1, wherein the one or more kick indicators, the one or more kick verifications phases, and the one or more kick details are each associated with a respective plurality of probabilities.

4. The system of claim 1, wherein the well control BDN model comprises:
a troubleshooting solutions consequences node dependent on a well control problems uncertainty node and a troubleshooting solutions decision node, wherein the troubleshooting solutions consequences node is configured to output the one or more well control recommendations based on one or more Bayesian probabilities calculated from one or more well control problems input to the well control problems uncertainty node and one or more troubleshooting solutions input to the troubleshooting decisions node.

5. A method for a well control expert system having a well control Bayesian decision network (BDN) model, the method comprising:
receiving one or more inputs;
providing the one or more inputs to one or more nodes of a well control BDN model, the one or more nodes comprising:
a kick indicators uncertainty node;
a kick verifications uncertainty node dependent on the kick indicators uncertainty node;
a kick details uncertainty node dependent on the kick verifications uncertainty node; and
a circulations decision node;
determining one or more well control recommendations at a second consequences node of the well control BDN model, the determination comprising a calculation of one or more Bayesian probabilities based on the one or more inputs, the one or more inputs provided to: (a) a well control scenarios uncertainty node, (b) a well control operations uncertainty node dependent on the well control scenarios uncertainty node, and (c) a recommended practices decisions node; and
providing the one or more well control recommendations to a user.

6. The method of claim 5, wherein providing the one or more well control recommendations to a user comprises displaying the one or more well control recommendations in a user interface element of a user interface configured to display the well control BDN model.

7. The method of claim 5, comprising determining the one or more well control recommendations at a third consequences node of the well control BDN model, the determination comprising a calculation of one or more Bayesian probabilities based on the one or more inputs, wherein the one or inputs are provided to a troubleshooting checklists uncertainty node, an actions and results uncertainty node dependent on the troubleshooting checklists uncertainty node, a well control problems uncertainty node dependent on the actions and results uncertainty node, and a troubleshooting solutions decision node.

8. A system, comprising:
one or more processors;
a non-transitory tangible computer-readable memory, the memory comprising:
a well control expert system executable by the one or more processors and configured to provide one or more well control recommendations based on one or more inputs, the well control expert system comprising a well control Bayesian decision network (BDN) model, the well control BDN model comprising:
a well control scenarios uncertainty node configured to receive one or more well control scenarios from the one or more inputs;
a well control operations uncertainty node dependent on the well control scenarios uncertainty node and configured to receive one or more well control operations from the one or more inputs;
a recommended practices decision node configured to receive one or more recommended practices from the one or more inputs;
a circulations consequences node dependent on a kick details uncertainty node and a circulations decision node and configured to output the one or more well control recommendations based on one or more Bayesian probabilities calculated from one or more kick details input to the kick details uncertainty node and one or more circulations input to the circulations decision node;
a troubleshooting solutions consequences node dependent on a well control problems uncertainty node and a troubleshooting solutions decision node, the troubleshooting solutions consequences node being configured to output the one or more well control recommendations based on one or more Bayesian probabilities calculated from one or more well control problems input to the well control problems uncertainty node and one or more troubleshooting solutions input to the troubleshooting decisions node; and
a well control practices consequences node dependent on (a) the well control scenarios uncertainty node, (b) the well control operations uncertainty node, and (c) the recommended practices decision node and configured to output the one or more well control recommendations based on one or more Bayesian probabilities calculated from:
the one or more well control scenarios,
the one or more well control operations, and
the one or more recommended practices.

9. The system of claim 8, comprising a user interface configured to display the well control BDN model and receive user selections of the one or more inputs.

10. The system of claim 8, wherein the one or more well control scenarios and the one or more well control operations are each associated with a respective plurality of probabilities.

11. A method for a well control expert system having a well control Bayesian decision network (BDN) model, the method comprising:
receiving one or more inputs;
providing the one or more inputs to one or more nodes of a well control BDN model, the one or more nodes comprising:
a well control scenarios uncertainty node;
a well control operations uncertainty node dependent on the well control scenarios uncertainty node;
a kick details uncertainty node dependent on the kick verifications uncertainty node; and
a recommended practices decision node;
determining one or more well control recommendations at a second consequences node of the well control BDN model, the determination comprising a calculation of one or more Bayesian probabilities based on the one or more inputs, the one or more inputs being provided to: (a) a kick indicators uncertainty node, (b) a kick verifications uncertainty node dependent on the kick indicators uncertainty node, (c) a kick details uncertainty node dependent on the kick verifications uncertainty node, and (d) a circulations decision node; and
providing the one or more well control recommendations to a user.

12. The method of claim 11, wherein providing the one or more well control recommendations to a user comprises displaying the one or more well control recommendations in a user interface element of a user interface configured to display the well control BDN model.

13. The method of claim 11, comprising determining the one or more well control recommendations at a third consequences node of the well control BDN model, the determination comprising a calculation of one or more Bayesian probabilities based on the one or more inputs, wherein the one or inputs are provided to a troubleshooting checklists uncertainty node, an actions and results uncertainty node dependent on the troubleshooting checklists uncertainty node, a well control problems uncertainty node dependent on the actions and results uncertainty node, and a troubleshooting solutions decision node.

14. A system, comprising:
one or more processors;
a non-transitory tangible computer-readable memory, the memory comprising:
a well control expert system executable by the one or more processors and configured to provide one or more well control recommendations based on one or more inputs, the well control expert system comprising a well control Bayesian decision network (BDN) model, the well control BDN model comprising:
a troubleshooting checklists uncertainty node configured to receive one or more troubleshooting checklists from the one or more inputs;
an actions and results uncertainty node dependent on the troubleshooting checklists uncertainty node and configured to receive one or more actions and results from the one or more inputs;
a well control problems uncertainty node dependent on the actions and results uncertainty node and configured to receive one or more well control problems from the one or more inputs;
a troubleshooting solutions decision node configured to receive one or more troubleshooting solutions from the one or more inputs;
a troubleshooting solutions consequences node dependent on the well control problems uncertainty node and the troubleshooting solutions decision node and configured to output the one or more well control recommendations based on one or more Bayesian probabilities calculated from the one or more well control problems and the one or more troubleshooting solutions; and
a circulations consequences node dependent on (i) a kick details uncertainty node and (ii) a circulations decision node, and configured to output the one or more well control recommendations based on one or more Bayesian probabilities calculated from:
one or more kick details input to the kick details uncertainty node, and
one or more circulations input to the circulations decision node.

15. The system of claim 14, comprising a user interface configured to display the well control BDN model and receive user selections of the one or more inputs.

16. The system of claim 14, wherein the one or more troubleshooting checklists, the one or more actions and results, and the one or more well control problems are each associated with a respective plurality of probabilities.

17. The system of claim 14, wherein the well control BDN model comprises:
 a well control practices consequences node dependent on a well control scenarios uncertainty node, a well control operations uncertainty node, and a recommended practices decision node, wherein the well control practices consequences node is configured to output the one or more well control recommendations based on one or more Bayesian probabilities calculated from one or more well control scenarios input to the well control uncertainty node, one or more well control operations input to the well control operations uncertainty node, and one or more recommended practices input to the recommended practices decision node.

18. A method for a well control expert system having a well control Bayesian decision network (BDN) model, the method comprising:
 receiving one or more inputs;
 providing the one or more inputs to one or more nodes of a well control BDN model, the one or more nodes comprising:
  a troubleshooting checklists uncertainty node;
  an actions and results uncertainty node dependent on the troubleshooting checklists uncertainty node;
  a well control problems uncertainty node dependent on the actions and results uncertainty node; and
  a troubleshooting solutions decision node;
 determining one or more well control recommendations at a second consequences node of the well control BDN model, the determination comprising a calculation of one or more Bayesian probabilities based on the one or more inputs, the one or more inputs being provided to: (a) a well control scenarios uncertainty node, (b) a well control operations uncertainty node dependent on the well control scenarios uncertainty node, and (c) a recommended practices decision node; and
 providing the one or more well control recommendations to a user.

19. The method of claim 18, wherein providing the one or more well control recommendations to a user comprises displaying the one or more well control recommendations in a user interface element of a user interface configured to display the well control BDN model.

20. The method of claim 18, comprising determining the one or more well control recommendations at a third consequences node of the well control BDN model, the determination comprising a calculation of one or more Bayesian probabilities based on the one or more inputs, wherein the one or inputs are provided to a troubleshooting checklists uncertainty node, an actions and results uncertainty node dependent on the troubleshooting checklists uncertainty node, a well control problems uncertainty node dependent on the actions and results uncertainty node, and a troubleshooting solutions decision node.

* * * * *